United States Patent
Li et al.

(10) Patent No.: US 11,937,290 B2
(45) Date of Patent: *Mar. 19, 2024

(54) MECHANISMS FOR EFFICIENT ACCESS AND TRANSMISSION IN NR

(71) Applicant: InterDigital Patent Holdings, Inc., Wilmington, DE (US)

(72) Inventors: Qing Li, Princeton Junction, NJ (US); Lakshmi R. Iyer, King of Prussia, PA (US); Allan Y. Tsai, Boonton, NJ (US); Guodong Zhang, Woodbury, NY (US); Tianyi Xu, San Jose, CA (US); Wei Chen, San Diego, CA (US); Pascal M. Adjakple, Great Neck, NY (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,624

(22) Filed: May 20, 2021

(65) Prior Publication Data

US 2021/0289517 A1 Sep. 16, 2021

Related U.S. Application Data

(63) Continuation of application No. 16/475,700, filed as application No. PCT/US2018/012585 on Jan. 5, 2018, now Pat. No. 11,044,739.
(Continued)

(51) Int. Cl.
*H04W 72/04* (2023.01)
*H04L 1/1812* (2023.01)
(Continued)

(52) U.S. Cl.
CPC ........ *H04W 72/569* (2023.01); *H04L 1/1812* (2013.01); *H04L 1/1861* (2013.01);
(Continued)

(58) Field of Classification Search
CPC .. H04B 7/0617; H04B 7/0695; H04B 7/0456; H04W 72/1242; H04W 72/12;
(Continued)

(56) References Cited

U.S. PATENT DOCUMENTS 9,161,254 B2   10/2015 Han et al.
2007/0009053 A1   1/2007 Laroia et al.
(Continued)

FOREIGN PATENT DOCUMENTS

EP   2887558 A1   6/2015
JP   2019-531643 A   10/2019
(Continued)

OTHER PUBLICATIONS

NPL-3GPP TSG RAN WG1 Meeting #87, Fujitsu: 'DL control channel related to multiplexing eMBB and URLLC', R1-1611465, Date Nov. 4, 2016 (Year: 2016).*
(Continued)

*Primary Examiner* — Lan-Huong Truong
(74) *Attorney, Agent, or Firm* — BakerHostetler

(57) ABSTRACT

Methods, systems, and apparatuses are described herein for beamforming based initial access, beam management, and beam based mobility designs for NR systems. Issues are identified and addressed related to, for example, initial access, control channel design, eMBB and URLLC mixing, and beam training.

18 Claims, 53 Drawing Sheets

Related U.S. Application Data

(60) Provisional application No. 62/443,497, filed on Jan. 6, 2017, provisional application No. 62/453,855, filed on Feb. 2, 2017.

(51) Int. Cl.
*H04L 1/1829* (2023.01)
*H04L 5/00* (2006.01)
*H04W 72/566* (2023.01)
*H04B 7/06* (2006.01)
*H04L 27/26* (2006.01)

(52) U.S. Cl.
CPC .......... *H04L 5/0055* (2013.01); *H04B 7/0617* (2013.01); *H04B 7/0695* (2013.01); *H04L 5/0051* (2013.01); *H04L 27/2656* (2013.01); *H04L 27/2666* (2013.01); *H04L 27/2675* (2013.01)

(58) Field of Classification Search
CPC ... H04L 1/1812; H04L 1/1861; H04L 5/0055; H04L 5/0051; H04L 27/2656; H04L 27/2666; H04L 27/2675; H04L 27/2613; H04L 27/2692; H04L 5/0007
See application file for complete search history.

(56) References Cited

U.S. PATENT DOCUMENTS

| | | | |
|---|---|---|---|
| 2014/0314040 A1 | 10/2014 | Wang | |
| 2016/0113008 A1* | 4/2016 | Damnjanovic | H04W 76/27 370/336 |
| 2016/0135146 A1* | 5/2016 | Schier | H04W 72/23 370/312 |
| 2016/0234857 A1 | 8/2016 | Chen et al. | |
| 2017/0105198 A1* | 4/2017 | Fu | H04L 5/14 |
| 2018/0063865 A1 | 3/2018 | Islam et al. | |
| 2018/0070341 A1* | 3/2018 | Islam | H04L 5/0064 |
| 2018/0103485 A1* | 4/2018 | Jiang | H04L 1/0003 |
| 2019/0327757 A1* | 10/2019 | Oteri | H04W 72/0406 |

FOREIGN PATENT DOCUMENTS

| | | |
|---|---|---|
| KR | 10-2014-0093273 A | 7/2014 |
| KR | 10-2016-0041048 A | 4/2016 |
| WO | 2017/177083 A1 | 10/2017 |
| WO | 2018/036560 A1 | 3/2018 |

OTHER PUBLICATIONS

3GPP TSG RAN WG1 Meeting #87, Fujitsu: 'DL control channel related to multiplexing eMBB and URLLC', R1-1611465, Date Nov. 4, 2016 (Year: 2016).*
3GPP TR 22.863 V0.3.1, "3rd Generation Partnership Project; Technical Specification Group Services and System Aspects; Feasibility Study on New Services and Markets Technology Enablers—Enhanced Mobile Broadband; Stage 1 (Release 14)", Feb. 2016, 13 pages.
3GPP TR 38.913 V0.2.0, "3rd Generation Partnership Project; Technical Specification Group Radio Access Network; Study on Scenarios and Requirements for Next Generation Access Technologies; (Release 14)", Feb. 2016, 19 pages.
3GPP TS 36.211 V13.1.0, "3rd Generation Partnership Project; Technical Specification Group Radio Access Network; Evolved Universal Terrestrial Radio Access (E-UTRA); Physical Channels and Modulation (Release 13)", Mar. 2016, 155 pages.
3GPP TSG RAN WG1 #85 R1-164013, Samsung, "Framework for Beamformed Access", May 2016, 4 pages.
3GPP TSG RAN WG1 #85 R1-165669, "Way Forward on Frame Structure", May 2016, 2 pages.
3GPP TSG RAN WG1 #90 R1-1714544, Convida Wireless, "Discussion on SS Block Timing Indication", Aug. 2017, 3 pages.
3GPP TSG RAN WG1 AH-NR Meeting R1-1701139, Convida Wireless, "Discussion on eMBB and URLLC Mixing", Jan. 2017, 3 pages.
3GPP TSG RAN WG1 AH-NR Meeting R1-1701140, Convida Wireless, "Control Channel Design with Mini-slot", Jan. 2017, 3 pages.
3GPP TSG RAN WG1 AH-NR Meeting R1-1701270, NTT Docomo, et al., "WF on NR-SS structure", Jan. 2017, 3 pages.
3GPP TSG RAN WG1 Meeting #88 R1-1702579, Convida Wireless, "Design Consideration on SS Burst Set", Feb. 2017, 4 pages.
3GPP TSG RAN WG1 Meeting #88 R1-1702583, Convida Wireless, "Discussion on Paging for NR", Feb. 2017, 4 pages.
3GPP TSG RAN WG1 Meeting #88bis R1-1705831, Convida Wireless, "Discussion on SS Block Design", Apr. 2017, 4 pages.
3GPP TSG RAN Wg1 Meeting #88bis R1-1709052, Convida Wireless, "Discussion on SS Block and SS Burst Set Design", Apr. 2017, 4 pages.
3GPP TSG RAN WG1 Meeting #89 R1-1709053, Convida Wireless, "Discussion on Paging Burst Design", May 2017, 3 pages.
3GPP TSG RAN WG1 Meeting #89, R1-1709059, Convida Wireless, "Discussion on DL Preemption Indication", May 2017, 4 pages.
3GPP TSG RAN WG1 NR Ad-Hoc #2 R1-1711394, Convida Wireless, "Discussion on SS Burst Set Design", Jun. 2017, 5 pages.
3GPP TSG RAN WG1 NR-AH Meeting R1-1701372, "Samsung et al., WF on RN-PBCH Contents", Jan. 2017, 3 pages.
3GPP TSG RAN1 #88 R1-1703740, Samsung et al., "WF on CB or CB-Group Based Retransmission", Feb. 2017, 3 pages.
3GPP TSG RAN1 NR_AH R1-1701207, Zte et al., Way Forward— Mini-Slot Design, Jan. 2017, 2 pages.
3GPP TSG RANWG1 Meeting #88bis, R1-1705835, Convida Wireless, "Design Considerations for Preemptive Transmission", Apr. 2017, 5 pages.
3GPP TSG-RAN WG1 #85 R1-164694, Qualcomm Incorporated, Frame Structure Requirements, May 2016, 5 pages.
3GPP TSG-RAN WG1 #88 R1-1703849, Zte et al., "Way Forward on Puncturing Indication", Feb. 2017, 4 pages.
3GPP TSG-RAN WG1 #88 R1-1704034, Zte et al., "Way Forward on Puncturing Indication", Feb. 2017, 4 pages.
CATT: "NR Initial Access Procedure with multi-stage synchronization signals", 3GPP TSG RAN WG1 Meeting #87, R1-1611374, Nov. 14-18, 2016, Nov. 14, 2016-Nov. 18, 2016.
CATT: "QCL assumption of NR Synchronization Signals and DM RS of Broadcast Channel", 3GPP TSG RAN WG1 Meeting #87, R1-1611371, Nov. 14-18, 2016, Nov. 14, 2016-Nov. 18, 2016.
International Telecommunication Union ITU-R Radiocommunication Sector of ITU, Recommendation ITU-R M.2083-0, "IMT Vision—Framework and Overall Objectives of the Future Development of IMT for 2020 and Beyond" M Series, Sep. 2015, 21 pages.
KT Corp: "Structure of DL Sync Signal for Multi-Beam Based Approaches", 3GPP TSG RAN WG1 Meeting #87, R1-1611862, Nov. 14lh-18lh, 2016, Nov. 14, 2016-Nov. 18, 2016.
Convida Wireless, Synchronizatoin Signal Burst Design for Initial Access[online], 3GPP TSG RAN WG1 #87 R!-1613007, Internet<URL:http:www.3gpp.org/ftp/tsg_ran/WG1_RL1/TSGR1_87/Docs/R1-1613007.zip>, Nov. 14, 2016.
Huawei, HiSilicon Samsung, MediaTek, WF on Multi-Beam paging [online], 3GPP TSG RAN WG1 #87 R!-1613271, Internet<URL:http://www.3gpp.org/ftp/tsg_ran/WG1_RL1/TSGR1_87/Docs/R1-1613271/ zip> Nov. 14, 2016.
Huawei, HiSilicon, Design of Broadcast Signal/Channel[oline], 3GPP TSG RAN WG1 #87 R1-1611695, Internet <URL:http://www.3gpp.org/ftp/tsg_ran/WG1_RL1/TSGR_187/Docs/R1-1611695. zip>.
Samsung: "eMBB and URLLC multiplexing in DL", 3GPP Draft; R1-1612540, Nov. 2016, pp. 5.
Samsung et al., "WF on Multiplexing eMBB and URLLC in DL", 3GPP TSG RAN WG1 Meeting #87, R1-1613743, Nov. 2016, pp. 5.

(56) References Cited

OTHER PUBLICATIONS

Wilus Inc., "Discussion on Multiplexing between eMBB and URLLC in DL", R1-1701067, 3GPP TSG RAN WG1 NR Ad-Hoc Meeting, Jan. 2017, pp. 3.

* cited by examiner

MECHANISMS FOR EFFICIENT ACCESS AND TRANSMISSION IN NR

CROSS-REFERENCE TO RELATED APPLICATIONS

This application is a continuation of U.S. patent application Ser. No. 16/475,700 filed Jul. 3, 2019 which is the National Stage Application of International Patent Application No. PCT/US2018/012585 filed Jan. 5 2018 which claims the benefit of U.S. Provisional Application No. 62/443,497 filed Jan. 6, 2017 and U.S. Provisional Patent Application No. 62/453,855 filed Feb. 2, 2017, the disclosures of which are hereby incorporated by reference.

BACKGROUND

3GPP TR 38.913 "Study on Scenarios and Requirements for Next Generation Access Technologies" (Release 14, V0.2.0) defines scenarios and requirements for New Radio (NR) technologies. Key Performance Indicators (KPIs) for enhanced Mobile Broadband (eMBB), Ultra-Reliable Low Latency Communication (URLLC), and massive Machine-Type Communication (mMTC) devices are summarized in Table 1, by way of example:

TABLE 1

KPIs

| Device | KPI | Description | Requirement |
|---|---|---|---|
| URLLC | Control Plane Latency | Control plane latency refers to the time to move from a battery efficient state (e.g., IDLE) to start of continuous data transfer (e.g., ACTIVE). | 10 ms |
|  | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
|  | Reliability | Reliability can be evaluated by the success probability of transmitting X bytes within 1 ms, which is the time it takes to deliver a small data packet from the radio protocol layer 2/3 SDU ingress point to the radio protocol layer 2/3 SDU egress point of the radio interface, at a certain channel quality (e.g., coverage-edge). | $1\text{-}10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
|  | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |
|  | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x% probability. | $10^6$ devices/km$^2$ |

SUMMARY

This summary is provided to introduce a selection of concepts in a simplified form that are further described below in the Detailed Description. This summary is not intended to limit the scope of the claimed subject matter. The foregoing needs are met, to a great extent, by the present application directed methods, systems, and apparatuses described herein for beamforming based initial access, beam management, and beam based mobility designs for NR systems. Issues are identified and addressed related to, for example, initial access, mini-slot and control channel design, enhanced Mobile Broadband (eMBB), and Ultra-Reliable Low Latency Communication (URLLC) mixing, and beam training and recovery.

With respect to initial access issues, in accordance with various example embodiments, synchronization signals (SS) are multiplexed and timing-index methods for secondary synchronization signals (SSS) are described herein. In one embodiment, an SSS can use message-based aspects, instead of using a training sequence, and a CRC can be masked with a timing-index. In another embodiment, an SS can have a different setup at the connected-mode (e.g., on-demand or configured by DCI/SIB or RRC). Discovery signals for NR and a paging channel associated with SS are also described herein.

In one aspect of the application related to initial access, a SS burst design method for UE is described that does not need knowledge of the SS block distribution. In an example, an apparatus, for instance a UE, can monitor a synchronization signal block burst that comprises a plurality of synchronization signal blocks. Based on the monitoring, the apparatus may select a synchronization signal block from the synchronization signal block burst. The apparatus may obtain a timing index from the selected synchronization signal block. Based on the timing index, the apparatus may determine initial access information, and communicate with the network in accordance with the initial access information. The synchronization signal block may include at least one primary synchronization signal and secondary synchronization signal, and the timing index may be embedded in the secondary synchronization signal. In another example, the timing index is embedded in a reference signal of the synchronization signal block. For example, the apparatus may communicate with a cell of the network having an identity, and receive the reference signal that is a function of the identity of the cell and timing information associated with the synchronization signal block. In another example, the synchronization signal block has a position within the SS block burst, and the timing index is based on the position within the SS block burst. Further, the apparatus may receive a paging occasion with a paging indication associated with the synchronization signal block.

In another embodiment, support of multi-beam transmissions in a beam sweeping SS block reduces the beam sweeping time for initial access. If multi-beams are used in a sweeping block, the explicit beam ID signaling may be required. In an embodiment of this aspect, a method for carrying system information via NR-PBCH and other channels is described. System information is carried by a broadcast channel. The broadcast channel includes resource allocation and demodulation reference signal (DMRS) design. In another step, system information may be carried by a NR-PDSCH. Further, system information may be carried by a NR-PDCCH. In another embodiment of this aspect, NR-PBCH timing indication methods are employed. In another embodiment of this aspect, PRACH power boosting and beam reselection methods, when RAR is not received, are employed.

With respect to control channel design issues, in accordance with various embodiments, mini-slot types, indications of mini-slot configurations, and example mini-slot structures are described herein. With respect to eMBB and URLLC mixing, in various example embodiments, issues related to the URLLC transmission being super-positioned on top of the eMBB transmission are addressed. In some cases, the URLLC transmission may alone be transmitted, and no eMBB transmission may occur on those resources. In various examples, the eMBB UE may have timely knowledge, delayed knowledge, or no knowledge of a pre-emptive URLLC transmission.

Yet even another aspect of the application is directed to control signaling and HARQ mechanisms. In one embodiment, downlink (DL) control signaling is employed for resource allocation for group common PDCCH in NR. In another embodiment, uplink (UL) control signaling is employed for resource allocation of short and long PUCCH. In yet another embodiment, a HARQ mechanism is employed for richer A/N transmission and UE capabilities. In a further embodiment, URLLC transmissions are employed for compact PDCCH for URLLC.

With respect to beam training, new beamforming training methods are disclosed herein. For example, the latency for the beamforming training processing time may be reduced in accordance with various embodiments. In one example, the beamforming training only requires performing a single stage/phase (beam sweeping) instead of two phases (sector level sweeping and beam refinement phase) in the beam training process. An example beamforming training sequence design is also described herein, which may be used not only to mitigate neighbor training beams from the same or different TRPs, but also to identify the transmit beamforming vector associated with a predefined beamforming codebook. In accordance with another example embodiment, a mechanism is described to estimate the direction of departure (DoD) and the direction of arrival (DoA) from the received directional training beams, where the estimated DoD can be used as the feedback instead of using finer beam sweeping in the beam refinement stage.

Yet another aspect of the application is directed to beam management, wherein a beam recovery process minimizes the radio link failure declaration for multi-beam based NR networks. In an example, a first level recovers current serving beams. In another example, current serving beams are replaced with alternative beams. Mechanisms are employed to measure and evaluate the serving beams and other alternative beams. Various events and threshold values may trigger the beam recovery process. Transition rules between different phases of the beam and link recovery process are described. In another embodiment of this aspect, a beam diversity transmission scheme for PDCCH is envisaged. Here, the UE may monitor multiple beams including active and non-active beams. The active beams may be selected by the gNB from a subset of monitored beams. In an example, the beam candidate set is updated and new beam sweeping and beam refining is initiated when most of the monitored beams are downgraded. A UE-specific search space design and blinding decoding mechanisms are also described.

Yet another aspect is directed to preemption. In an example, an apparatus sends a first transmission and a second transmission, and the apparatus may assign resources of the first transmission to the second transmission, so as to preempt the first transmission with the second transmission. The apparatus may send control information so as to explicitly indicate that the second transmission should preempt the first transmission, and the control information may further indicate at least one resource for preemption. Alternatively, the apparatus may transmit a reference signal that indicates preemption information, so as to implicitly indicate that the second transmission should pre-empt the first transmission. The first transmission may be overwritten by the second transmission at select resource locations of the first transmission. In some cases, the first transmission skips resources selected for preemption by the second transmission. Further, the apparatus may transmit a control signal that indicates that the first transmission should be preempted by the second transmission. The control signal can be transmitted in a mini-slot that also carries the second transmission. Alternatively, the control signal may be transmitted in subsequent slot to the mini-slot that carries the second transmission.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Currently 3GPP standardization's efforts are underway to design the framework for beamformed access. The characteristics of the wireless channel at higher frequencies are significantly different from the sub-6 GHz channel that LTE is currently deployed on. It is recognized herein that a key challenge of designing the new Radio Access Technology (RAT) for higher frequencies will be overcoming the larger path-loss at higher frequency bands. In addition to this larger path-loss, the higher frequencies are subject to an unfavorable scattering environment due to blockage caused by poor diffraction. Therefore, MIMO/beamforming may be essential in guaranteeing sufficient signal level at the receiver end.

Relying solely on MIMO digital precoding used by digital BF to compensate for the additional path-loss in higher frequencies might not be enough to provide similar coverage as below 6 GHz. Thus, the use of analog beamforming for achieving additional gain can be an alternative in conjunction with digital beamforming. A sufficiently narrow beam may be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include, for example, the cost and complexity of the transceiver architecture.

Figure 1:
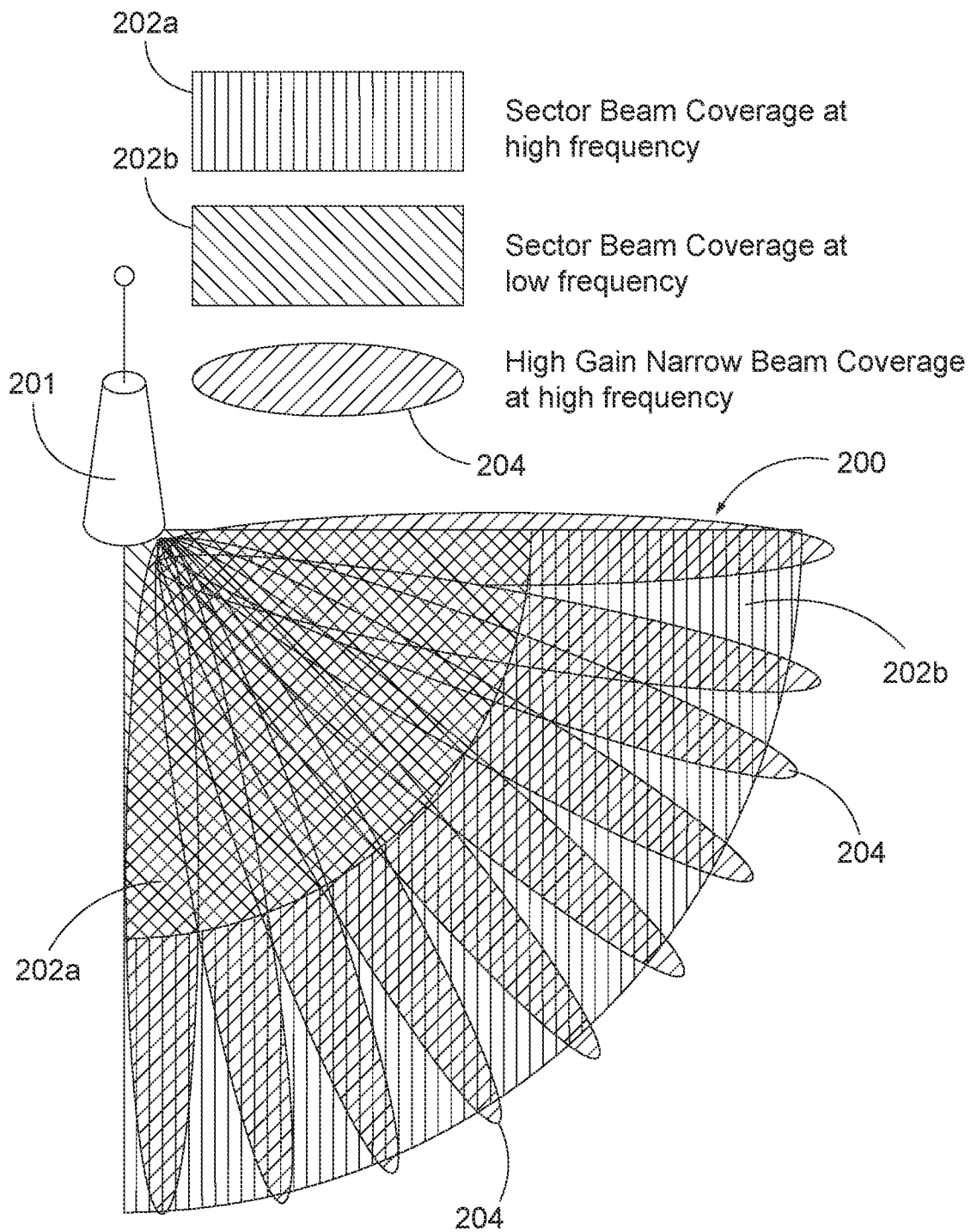
FIG. 1 depicts an example of cell coverage with sector beams and multiple high gain narrow beams.

From the observations above, multiple transmissions in the time domain with narrow coverage beams steered to cover different serving areas might be necessary, in some cases. Inherently, the analog beam of a subarray can be steered toward a single direction at the time resolution of a OFDM symbol, or at any appropriate time interval unit defined for the purpose of beam steering across different serving areas within the cell, and hence the number of subarrays may determine the number of beam directions and the corresponding coverage on each OFDM symbol or time interval unit defined for the purpose of beams steering. In some cases, the provision of multiple narrow coverage beams for this purpose has been called "beam sweeping." For analog and hybrid beamforming, in some cases, the beam sweeping may be essential to provide the basic coverage in NR. This concept is illustrated in FIG. 1, where the coverage of a sector level cell 200 is achieved with sector beams 202a and 202b and multiple high gain narrow beams 204. Also, for analog and hybrid beamforming with massive MIMO, multiple transmissions in the time domain with narrow coverage beams steered to cover different serving areas might be essential to cover the whole coverage areas within a serving cell in NR, in some cases.

One concept closely related to beam sweeping is the concept of beam pairing, which is used to select the best beam pair between a UE and its serving cell, which can be used for control signaling or data transmission. For the downlink transmission, a beam pair may consist of a user equipment (UE) receive (RX) beam and a new radio node (NR-Node) transmit (TX) beam. With respect to uplink transmission, a beam pair may consist of an UE TX beam and an NR-Node RX beam.

Another related concept is the concept of beam training, which is used for beam refinement. For example, as illustrated in FIG. 1, a coarser sector beamforming may be applied during the beam sweeping and sector beam pairing procedure. A beam training may then follow, where for example the antenna weights vector are refined, followed by the pairing of high gain narrow beams between the UE and NR-Node 201.

Issues regarding initial access are identified and addressed herein. In NR, the initial access channel, such as synchronization signal (SS) for example, may have different setup for a UE that is in the idle-mode or connect-mode. For a beamforming system, different SS signal setup involves multiple design parameters, such as number of training beams, number of SS symbols, and SS burst periodicity, etc. In addition, it is recognized herein that SS for the discovery reference signal (DRS) in NR should be addressed because there is no training beam structure and support for different numerologies in the current long term evolution (LTE) systems.

Issues regarding control channel design are identified and addressed herein. To support different numerologies in a subframe structure, the mini-slot design may be essential. How to optimize the mini-slot design for efficient resource usage is an example problem that is addressed herein.

Issues regarding enhanced mobile broadband (eMMB) and ultra-reliable low latency communication mixing are identified and addressed herein. In order to meet the latency requirements for URLLC, URLLC may be scheduled over an ongoing eMBB transmission. Disclosed herein are techniques to provide resources to URLLC while impacting the eMBB performance minimally—this may impact design of eMBB code blocks, eMBB, and URLLC resources scheduling, and eMBB hybrid automatic repeat request (HARQ) processes. In some cases, the URLLC transmission can be transparent to the eMBB user; if not, it is recognized herein that techniques may be required to indicate the URLLC transmission to the eMBB UE.

Issues regarding beam training are identified and addressed herein. In the 5G system, it is recognized herein that a challenge of designing the new radio access technology for higher frequencies will be overcoming the larger path-loss at higher frequency bands. In addition to this larger path-loss, the higher frequencies are subject to unfavorable scattering environment due to blockage caused by poor diffraction. Hence, it is recognized herein that beamforming may be essential in guaranteeing sufficient signal level at the receiver end. The beam training procedure can be essential to a beamforming system. In general, the beam training procedure may involve two stages. The first stage in the beam training is using coarse beam sweeping, it also called as Sector Level Sweep (SLS). In the SLS stage, coarse beams are applied for a receiver to identify which sweep sector is the strongest sector (coarse beam). Once a strongest coarse beam has been identified by the receiver, then it can enter the beam refinement phase (BRP). In the beam refinement phase, the receiver can refine the beamforming quality by iteratively receiving the refined beams from the transmitter and those refined beams can be derived from the identified coarse beam at the SLS phase. However, this method may require several trails and beam searching between the transmitter and receiver during the beam refinement phase. It may potentially lead to increasing the beam training latency in the beam training procedure. Therefore, it is recognized herein that a new mechanism may be desired to improve the beam training latency and enhance the beam training quality.

As initial matter, it is noted that, unless otherwise specified, the mechanisms described herein may be conducted at an NR-node, Transmission and Reception Point (TRP), or Remote Radio Head (RRH). Therefore NR-node, TRP, and RRH can be used interchangeably herein, without limitation, though an NR-node is used most often for simplicity. Further, unless otherwise specified, the time intervals that contains downlink (DL) and/or uplink (UL) transmissions are flexible for different numerologies and radio access network (RAN) slices, and may be statically or semi-statically configured. Such time interval structures may be used for a slot or a mini-slot within a subframe. The mechanisms proposed for this time interval structure may be applicable to slot and/or mini-slot, though the descriptions and/or illustrations use slot or mini-slot for exemplary purposes.

Turning now to embodiments related to initial access, NR initial access design is now addressed. The initial access synchronization signal includes PSS and SSS (hereafter we refer to primary synchronization signals (PSS) and secondary synchronization (SSS) as synchronization signals (SS) for simplicity) with or without a physical broadcast channel. The PSS may contain a sequence for a UE to first conduct time and frequency synchronization. The PSS may also contain a time boundary, such as a frame, subframe or slot boundary. The SSS may contain the identification of a cell for a UE to select or reselect. In addition, in some cases, the combination of the PSS and the SSS may indicate an OFDM symbol boundary in time. In the following section, we discuss example details of an SS design.

Figure 2:
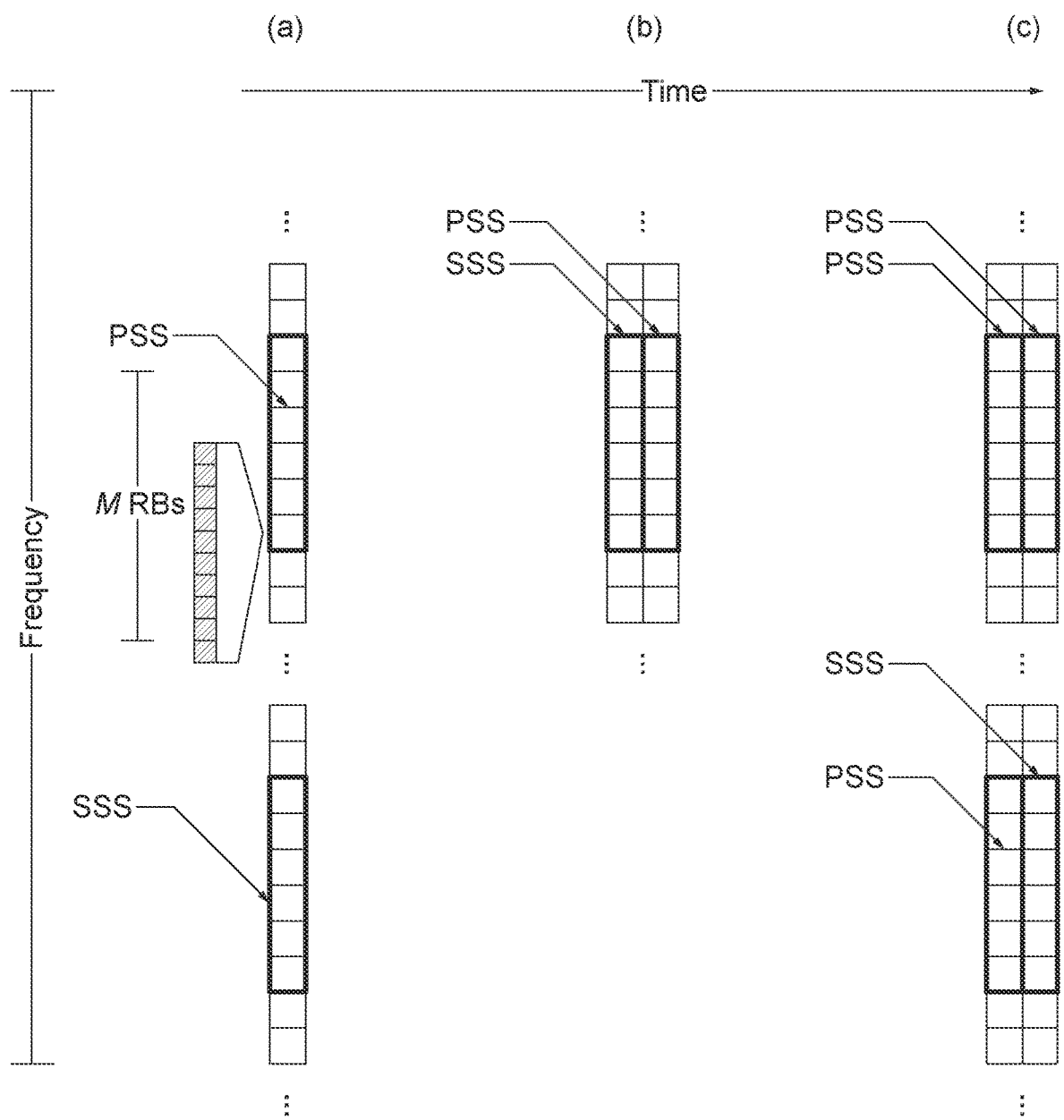
FIG. 2 depicts example multiplexing methods for synchronization signals (SS): (A) frequency division multiplexing (FDM), (B) time division multiplexing (TDM), and (C) Hybrid.
Figure 3:
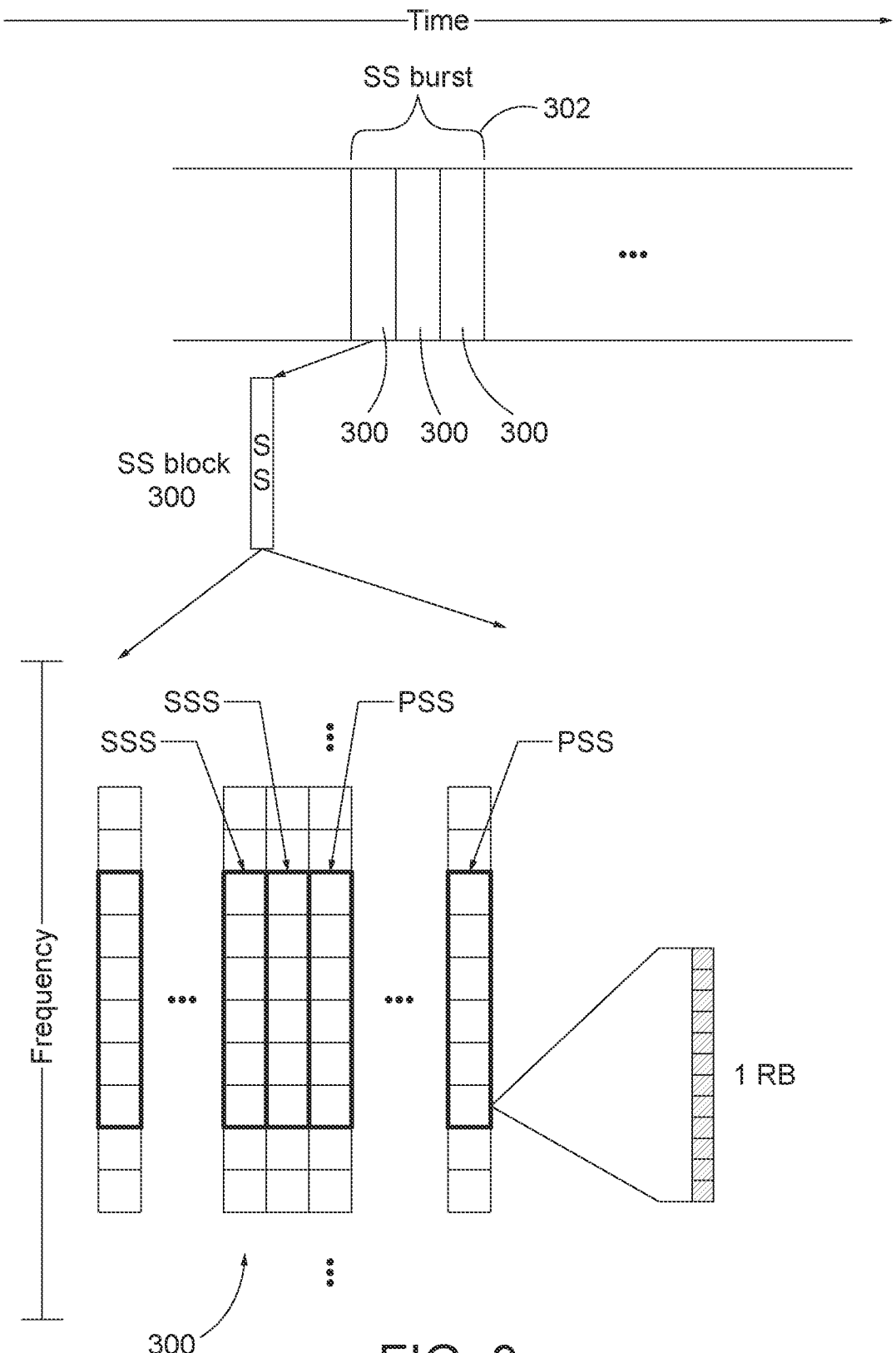
FIG. 3 depicts an example of repeated or multiple primary synchronization signals (PSS) and secondary synchronization signals (SSS) symbols in an SS block.

The PSS and SSS can various multiplexing methods, such as, for example, frequency division multiplexing (FDM), time division multiplexing (TDM) or hybrid FDM/TDM. If PSS and SSS are multiplexed in the same orthogonal frequency division multiplexing (OFDM) symbol, then the PSS and SSS are multiplexed using FDM. If PSS and SSS are multiplexed in different OFDM symbols, then PSS and SSS are multiplexed using TDM. If PSS and SSS are multiplexed in both time and frequency domain (i.e. mixed into different OFDM symbols), then PSS and SSS can be multiplexed using hybrid FDM/TDM. These multiplexing SS methods are depicted in FIG. 2. In a beamforming system, SS symbols are transmitted with different beams and each SS may be associated with a single beam or multiple beams in a beam sweeping block. Each beam sweeping SS block contains a single OFDM or multiple OFDM symbols, and multiple SS blocks form a SS block beam sweeping burst. The periodicity of the SS block burst might have different periodicities. Those supported periodicities can be varied with frequency bands or different numerologies. To enhance the detection probability of an SS in one SS block, the PSS and SSS may be repeated or use multiple PSS and SSS, and span into multiple OFDM symbols. An example of the repetition of PSS and SSS in an example SS block 300 is depicted in FIG. 3. The repetition of PSS and SSS can improve the frequency offset estimation at the initial access stage. In addition, the SSS sequence can carry a timing index to explicitly signal the timing difference of the symbol to subframe boundary.

For example, if there are M SS blocks in a SS burst 302 or SS burst block burst 302 and each SS block 300 is composed of N OFDM symbols, when the SSS sequence is detected and the timing index from the SSS sequence is obtained, then it can calculate the symbol to the subframe boundary. The timing index can be signaled in various ways. In one example, the timing index represents the number of symbols to the subframe boundary or the symbol index within a subframe. In another example, the timing index represents the SS block index within a SS burst. In some cases, the SS block index represents a position of the respective SS block within the first (e.g., first, second, third, etc.). Thus, the SS block can have a position within the SS burst, and the timing index can be based on the position within the burst. In the first example, once the timing index is obtained from the SSS sequence, then the timing index can be directly used for the indication of the symbol to subframe boundary. In the second example, it may have to convert the SS block index (timing) to the symbol timing index. Consider an example case where the first OFDM symbol in a SS block is the SSS signal (symbol). If a UE detects that the value m as the timing index carried in the SSS sequence, then the symbol to subframe index can be calculated as m×N, $0 \le m \le M-1$ (where N is the number of OFDM symbols within a SS block 300).

Thus, as described with reference to FIG. 3, an apparatus, for instance a UE, can monitor a synchronization signal block burst that comprises a plurality of synchronization signal blocks. Based on the monitoring, the apparatus may select a synchronization signal block from the synchronization signal block burst. The apparatus may obtain a timing index from the selected synchronization signal block. Based on the timing index, the apparatus may determine initial access information, and may communicate with the network in accordance with the initial access information. The synchronization signal block may include at least one primary synchronization signal and secondary synchronization signal, and the timing index may be embedded in the secondary synchronization signal. In another example, the timing index is embedded in a reference signal of the synchronization signal block. For example, the apparatus may communicate with a cell of the network having an identity, and receive the reference signal that is a function of the identity of the cell and timing information associated with the synchronization signal block. In another example, the synchronization signal block has a position within the burst, and the timing index is based on the position within the burst.

In some cases, the SSS might use the coding method to construct SSS instead of using SSS sequences. The message based SSS can be constructed by the following, presented by way of example and without limitation:

The payload of SSS can be expressed as $d_{sss}=\{d_0, d_1, \ldots d_N\}$ where N is the SSS payload length and $d_1$ is the SSS data bit.

The coded SSS can be expressed as $C_{sss}=\{c_0, c_1, \ldots c_M\}$, the coding method can choose reed-muller or polar coding, where M is the channel coder output length.

The coded SSS bits $C_{sss}$ may perform rate matching: $R_{sss}=\{r_0, r_1, \ldots r_O\}$ where O is the rate-matching output bits.

The SSS rate matching bits $R_{sss}$ then undergo bit interleaver to form $I_{sss}=\{i_0, i_1, \ldots i_O\}$ and attach with Q bits CRC to from the transmit bit $D_{sss}=\{i_0, i_1, \ldots i_O, e_0, e_1, \ldots, e_{Q-1}\}$ The $D_{sss}$ and demodulation reference signal are mapped to one or several OFDM symbols.

In an example, the attached Q bits CRC can be masked with a timing index bits such it can implicitly signal the timing index to subframe boundary in a SS block. If the Q bits CRC for each SSS message is masked with a timing index sequence, then this masked timing index bits can be used for implicit indication of symbol to subframe index. This masking timing index may have various designs. In accordance with one example, the timing-index represents the number of symbols to the subframe boundary. Hence, the timing index can be directly used for the indication of the symbol to subframe boundary. In accordance with another example, the timing index indicates which SS block in a SS burst. Then, in this example, the UE may have to convert the block timing index to the symbol timing index, and UE is required to know the SSS OFDM symbol location in a SS block.

Figure 4:
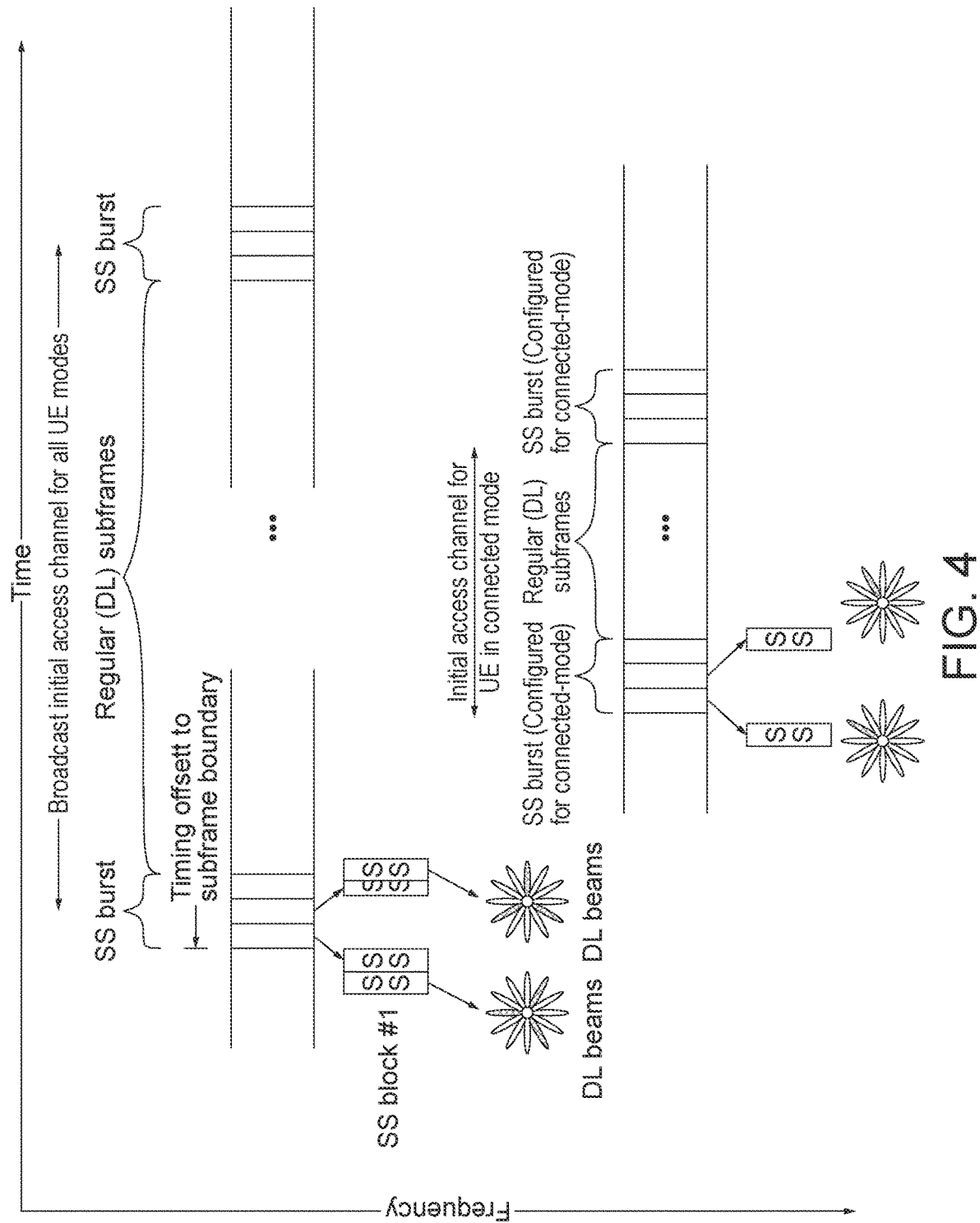
FIG. 4 shows configured SS transmission in the connected-mode and the broadcast SS in the idle-mode in accordance with an example.

Turning now to example when a UE is in the connected-mode, with reference to FIG. 4, the NR-node may configure different types of SSs as compared to the SS in the idle-mode. There are several differences between idle-mode and connected-mode SS. For example, when a UE is in the connected-mode, an eNB might allocate some physical resource blocks (PRBs), and those allocated PRBs might be farther away than the SS broadcast for the idle-mode. Hence, UE can perform measurement without monitoring at least two far away distinct PRBs at the same time. By way of another example, in a beamforming network, the number of configured training beams, SS burst periodicity and number of PSS, SSS symbols in a SS block might be different than the training beams broadcast for UE monitoring in the idle-mode. By way of yet another example, the SS in the connected-mode can be transmitted on-demand (for example, upon receiving synchronization request from a UE). This on-demand SS can be configured in accordance with the example depicted in FIG. 5.

Figure 5:
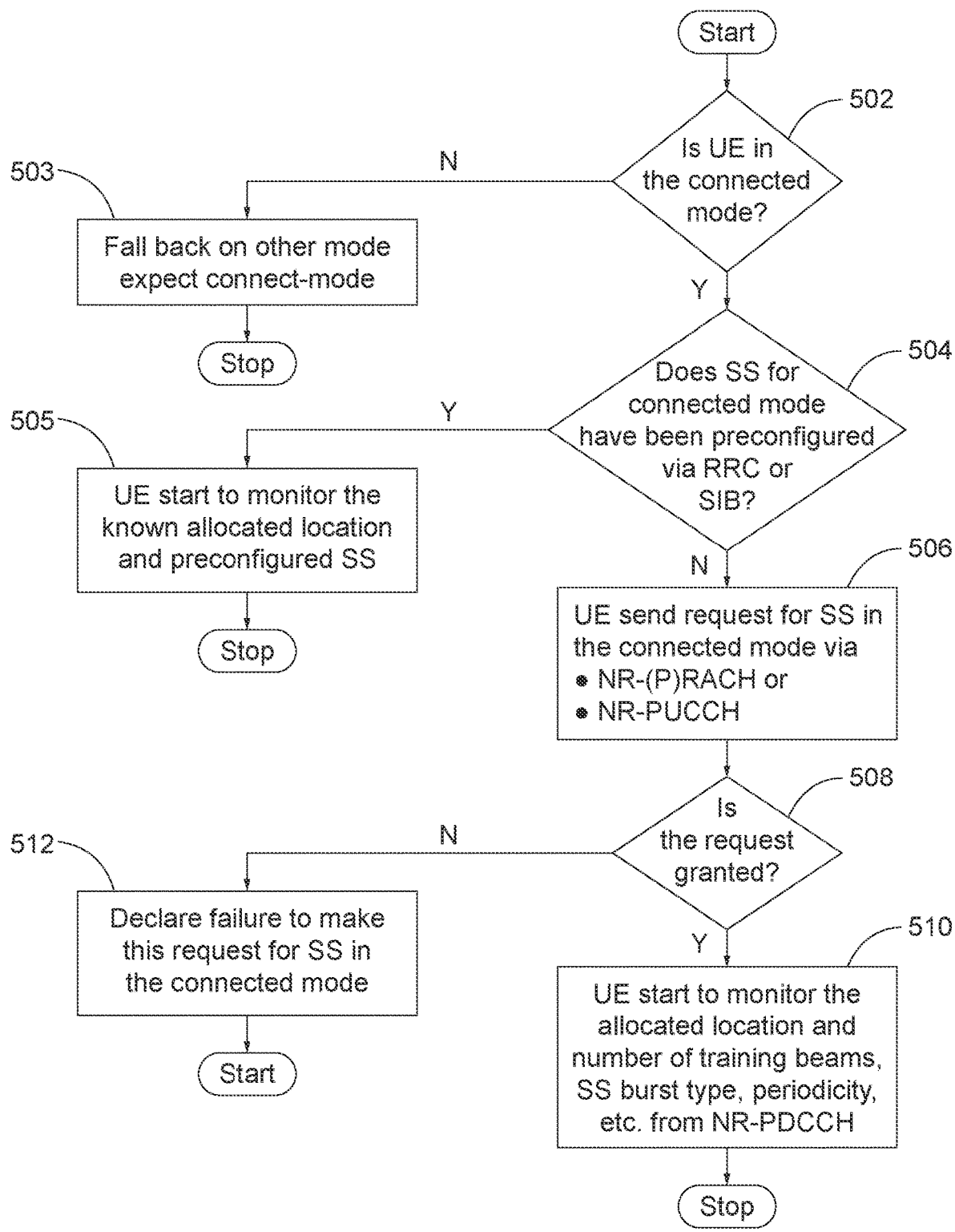
FIG. 5 shows a user equipment (UE) method for an on-demand SS transmission in connected-mode in accordance with an example embodiment.

Referring to FIG. 5, in accordance with the example, a given UE determines whether it is in connected-mode, at 502. If the UE is in the connected-mode, the process can proceed to 504, where the UE determines whether the SS for the connected-mode has been preconfigured, for instance via radio resource control (RRC) signaling or a system information block (SIB). If the SS has been preconfigured, the process can proceed to 505, where the UE monitors the preconfigured SS at the allocated location. If the SS has not been preconfigured, the process can proceed to 506, where the UE can send a request, using a random access channel or a NR physical uplink control channel (NR-PUCCH) for example, to an eNB or the like for an SS broadcast. At 508, once the eNB receives the UE request, the eNB may grant or decline the request. At 510, if the eNB grants the request for the SS transmission in the connected-mode, the UE may monitor the SS. The transmission of SS may be granted via a new radio physical downlink control channel (NR-PDCCH). The content of the configured SS information may include various information such as allocated PRBs, number of training beams, SS burst configuration, SS burst periodicity, etc. The SS parameters can be either configured via semi-static or dynamic methods. If the request is not granted at 510, the UE can receive, at 512, a message indicating that there was a failure to satisfy the request. If it is determined (at 502) that the UE is not in the connected-mode, process can proceed to 503, where the UE falls back mechanism in other modes that are not connected-mode.

In some cases, a UE can monitor bursts, for instance both the SS in the connected-mode and the broadcast SS in the idle-mode. The monitoring may depend on the UE capabilities or UE categories. In some cases, the UE can monitor the connected-mode SS only when the UE is in the connected mode. An example of monitoring SS in connected-mode and idle-mode is depicted in FIG. 4, wherein there are different time intervals between SS bursts. As shown there is a different time interval in the idle mode (shown on top) as compared to the connected mode (shown in bottom).

Turning now to a discovery signal (DS), in accordance with an example embodiment, an NR Discovery signal (NR-DS) may be used in the NR system to enhance energy-efficient cell discovery of small cell, D2D and operation in unlicensed band (LAA) and other occasions. An example NR-DS occasion for a cell consists of a period with a duration of $K_1$ to $K_2$ consecutive subframes for licensed band operation (e.g., frame structure types 1 and 2); and $K_{n1}$ OFDM symbols within one non-empty subframe for frame structure type 3. The UE in the downlink subframes may assume the presence of a discovery signal. The discovery signal may consist of cell-specific reference signals (denoted as X-RS here) on one or more antenna ports sweeping through different beams (single-beam or multiple beams). The antenna ports can be pre-defined or defined by a parameter configured by higher layer signaling. The number of beams to sweep through can be a system parameter configured by higher layers. Cell-specific reference signals can include a reference signal for phase tracking, a reference signal for time/frequency tracking, a reference signal for radio link monitoring, a reference signal for RRM measurement, or the like. Cell-specific reference signals may also include Synchronization signals (SS) sweeping through different beams (e.g., single-beam or multiple beams). In some cases, the SS in the discovery signal transmitted in each beam direction may consist of PSS, SSS and TSS. For each beam direction, PSS, SSS, and TSS may be mapped to the same OFDM symbols (but different subcarriers), or mapped to different OFDM symbols.

Cell-specific reference signals may also include non-zero-power channel state information (CSI)-reference signals (CSI-RS) transmitted on one or more antenna ports sweeping through different beams (single-beam or multiple beams) in zero or more subframes in the period of a discovery signal burst. In some cases, up to $K_{CSI}$ reserved CSI-RS resources as part of the discovery signal is configured by higher layer signaling. The CSI-RS may carry information such as the TP index implicitly. The antenna ports can be either pre-defined or be a parameter configured by higher layer signaling. The X-RS, SS and CSI-RS (if present) in the discovery signal will sweep through the same beam directions. The X-RS, SS and CSI-RS (if present) transmitted on the same beam direction can be placed/mapped to the same OFDM symbol or different (adjacent) OFDM symbols.

Figure 6:
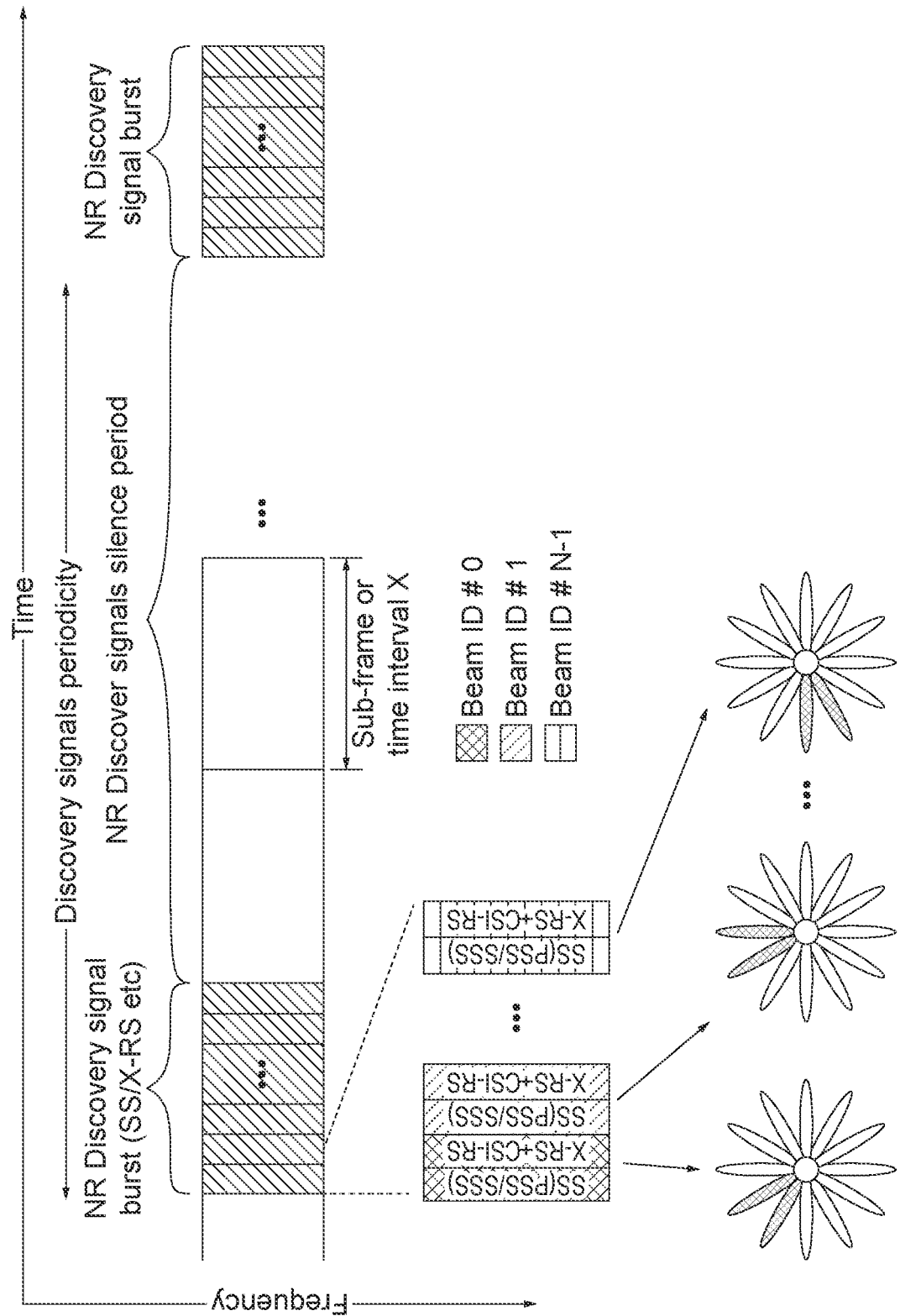
FIG. 6 shows an example of a periodic discovery signal (DS) in new radio (NR) (NR-DS).

For licensed band operation, the NR-DS may be transmitted with a higher layer configured periodicity. Alternatively, the NR-DS can be transmitted by the gNB on-demand (for example, upon receiving synchronization request from a UE). For unlicensed band operation, in an example, the UE may assume that a NR-DS is transmitted in any subframe within the discovery signals measurement timing configuration. An example of periodic NR-DS is shown in FIG. 6. In the example, the UE may search the NR-DS for cell search or cell reselection, for example, based on the periodicity of the NR-DS burst that is specified or configured by the gNB.

In an example scenario where the NR-DS is used for a small cell discontinuous transmission feature, the UE may perform small cell measurement by detecting NR-DS transmitted by small cells according to pre-configured timing and resources locations. After detecting a cell (with valid cell ID), the UE may measure the signal strength based on the cell specific reference signals (X-RS) used for discovery. The UE may obtain the measured reference signal power (RSRP) or received signal strength indicator (RSSI) from the X-RS. The measurement values can be reported to the gNB for its mobility handling, or may be used by the UE for its autonomous mobility handling, or any other purpose as desired.

Figure 7:
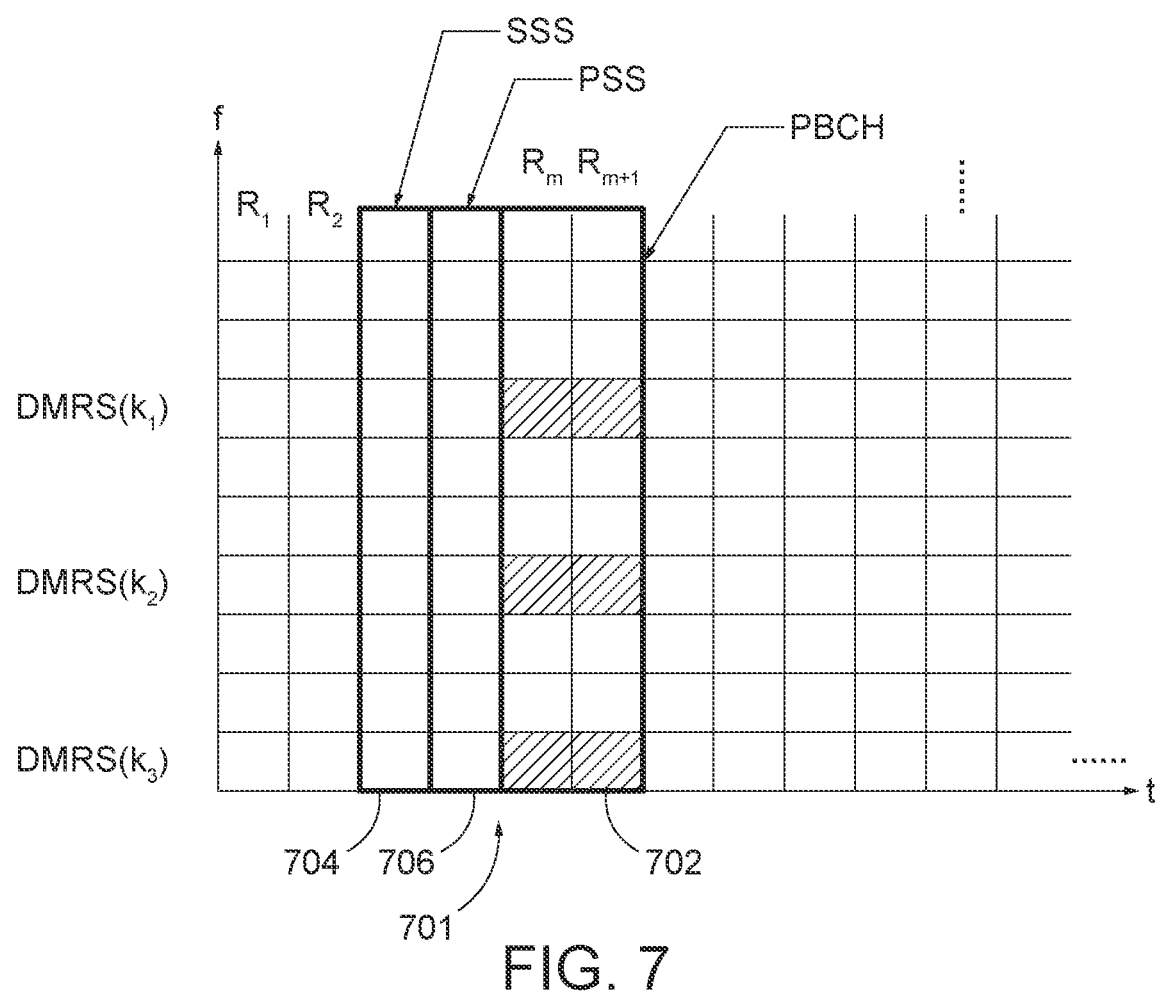
FIG. 7 shows an example of a repeated physical broadcast channel (PBCH) and demodulation reference signal (DMRS) design in an SS block.

Turning now to physical broadcast channel (PBCH) design, with reference to FIG. 7, a PBCH 702 may multiplex with the SS, for instance an SSS 704 and a PSS 706, in a SS block 701. In addition, the PBCH 702 may multiplex with SS within a same OFDM symbol as well. If a demodulation reference signal (DMRS) is used for PBCH demodulation, then the DMRS sequence may be generated by combining the two PN sequences, and the initialized seed for the PN sequences can be a function of cell ID. If UE is in the connected mode, for example, then the PBCH may not be transmit/multiplex within a SS block. The capability to turn on/off PBCH transmission with SS in the connected mode can be configured via RRC signaling or be dynamically configured via NR-PDCCH. In some cases, PBCH symbols may be repeated to enhance the detection probability in a SS block. If DMRS and PBCH is with symbol repetition, then the DMRS can be used for frequency offset estimation. An example PBCH design, in accordance with an embodiment, is depicted in FIG. 7.

Figure 8:
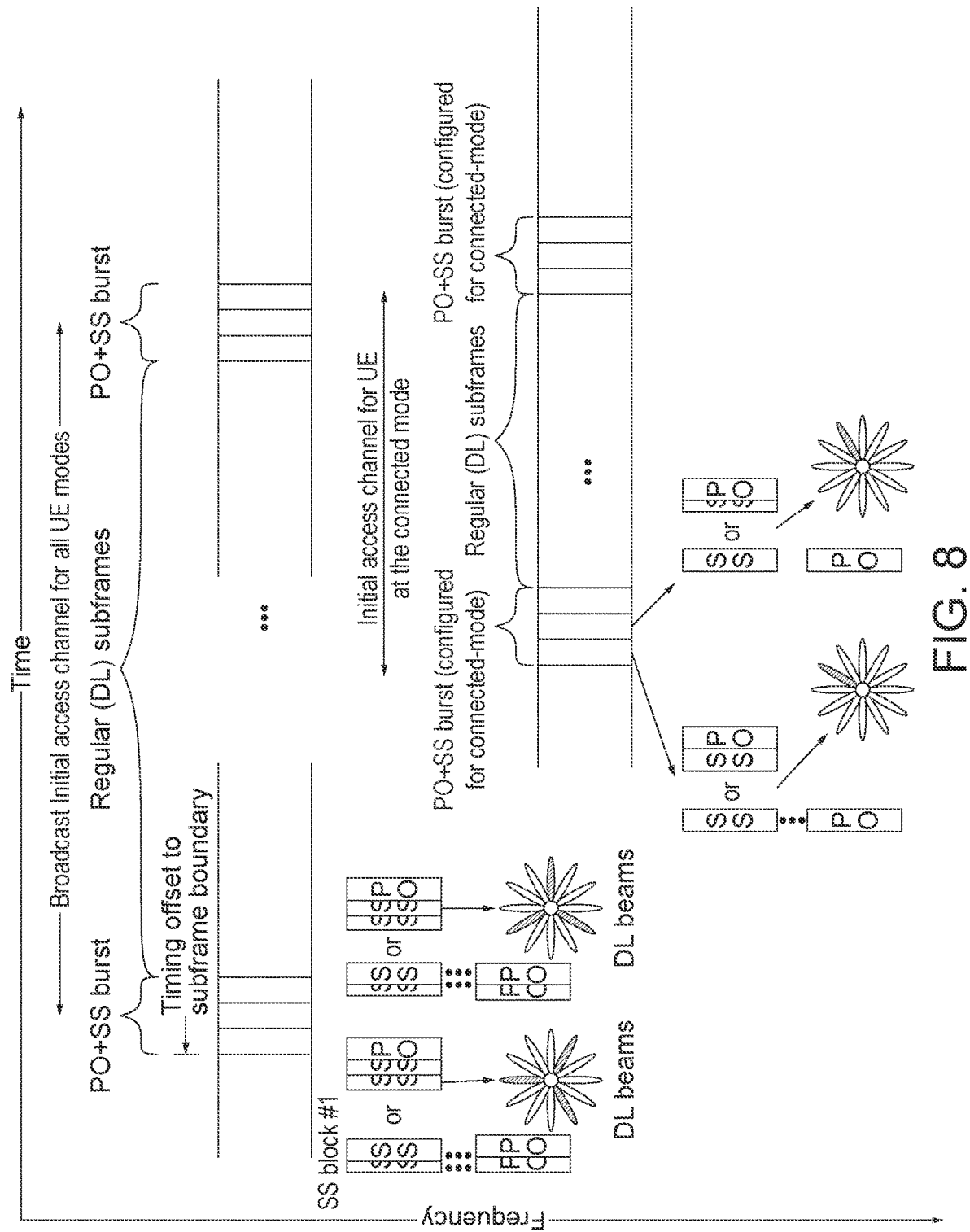
FIG. 8 depicts a paging occasion (PO) share with SS burst for idle-mode and connected-mode in accordance with an example.
Figure 9:
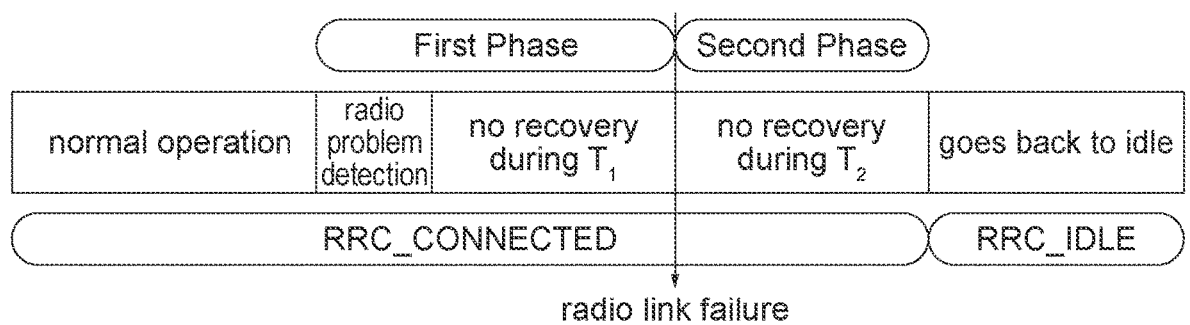
FIG. 9 illustrates an example radio link failure in LTE in accordance with an aspect of the application.

Turning now to paging channels, as used herein, a paging beam sweeping block can be treated as a unit of beam sweeping time unit for paging channel during the idle mode. Each paging block may consist of at least one or more CP-OFDM symbols. Multiple blocks can form a paging beam sweeping burst corresponding to a paging occasion (PO), which may containing a paging indication (PI). Here, the length of a sweeping burst refers to the number of paging beam sweeping blocks in a burst. Thus, a UE may receive a paging occasion with a paging indication associated with the synchronization signal block. As an example, if a paging beam sweeping burst length is equal to M, then there are M sweeping blocks existing in a PO. Since a paging may share the same beam burst structure as a synchronization signal (SS) block burst structure, the paging can share beams with the SS block. In FIG. 8, an example of paging sweeping burst with an SS block is depicted. The paging beam sweeping burst can be configured periodically or aperiodically, for instance via a transmission. Each paging beam sweeping block can be associated with a single beam or multiple beams, and the association method can be with or without downlink control information (DCI). Furthermore, the paging may have different configurations. For example, if a paging does not involve any DCI indication, the beam association method can be with the initial access channel, such as NR-PSS/NR-SSS and/or NR-PBCH. If there is a configured SS block burst for a UE at the connected-mode, where it has a different setup than at the idle-mode SS block burst, then this paging can share the same beam structure as the configured SS block at the connected-mode. As an example, referring to FIG. 8, there is a configured SS block burst for a UE at the connected-mode, and the paging is associated with each SS block in this configured SS burst. In accordance with the illustrated example, the PO with a paging indication and SS block can be frequency division multiplexed (FDM) at the same OFDM symbols or time division multiplexed (TDM) at different OFDM symbols. TDM and FDM, between SS block and paging cases, may be applied to the same beams. In another example, the PO resources for paging indication can be assigned via RRC signaling for semi-static configuration.

Turning now to Synchronization Signal (SS) aspects, a PSS sequence can include (i) a Golay complement sequence; and (ii) sonar, modular sonar, or submodular sonar sequences. The NR-SS sequence can also include a NR-PSS that can have a structured signal pattern in the time-domain (TD) for fast compensation of frequency offset operations (CFO) acquisition and peak detection. Here, the signal structured pattern design can take place within one OFDM symbol or multiple OFDM symbols. It can use TD sequences for NR-PSS. The signal structure pattern can be composed from a single sequence or multiple sequences According to an embodiment, an example SS Burst Set is now described. Here, the SS bursts might not be evenly distributed across time if there are higher priority channels that need to be scheduled and those higher priority channels have allocated resources that overlap with SS burst resources. For example, URLLC physical control, data channel (URLLC PDCCH, PDSCH) might be scheduled with overlapping with the SS burst. In this case, the SS burst might be disabled for transmission.

According to another embodiment of the SS Burst Set, an example SS burst block distribution in a burst set includes: (i) a consecutive burst block; and (ii) a non-consecutive burst block. In the non-consecutive burst block, in some examples, if all burst blocks in a burst are continuous allocated the in time-domain, then this type of burst can be referred to as a consecutive burst block. Otherwise, the burst block can be a non-consecutive burst block. Further, in some examples, if a burst length for UE has been given (or assumed) in terms of an integer number of OFDM symbols or number of sub-OFDM symbols, then the UE does not have to assume that the burst block distribution consecutive. Thus, if a beam burst length (in terms of an integer M of symbols) is given for a UE, then the UE does not have to further assume whether the beam blocks inside the beam burst are consecutive or not. By way of example, if a beam burst has a duration equal to M8 OFDM symbols, and the beam burst is composed of two beam blocks, each beam block in this beam burst uses 2 OFDM symbols. Therefore, continuing with the example, there are four empty OFDM symbols between two beam blocks in this example.

Figure 10:
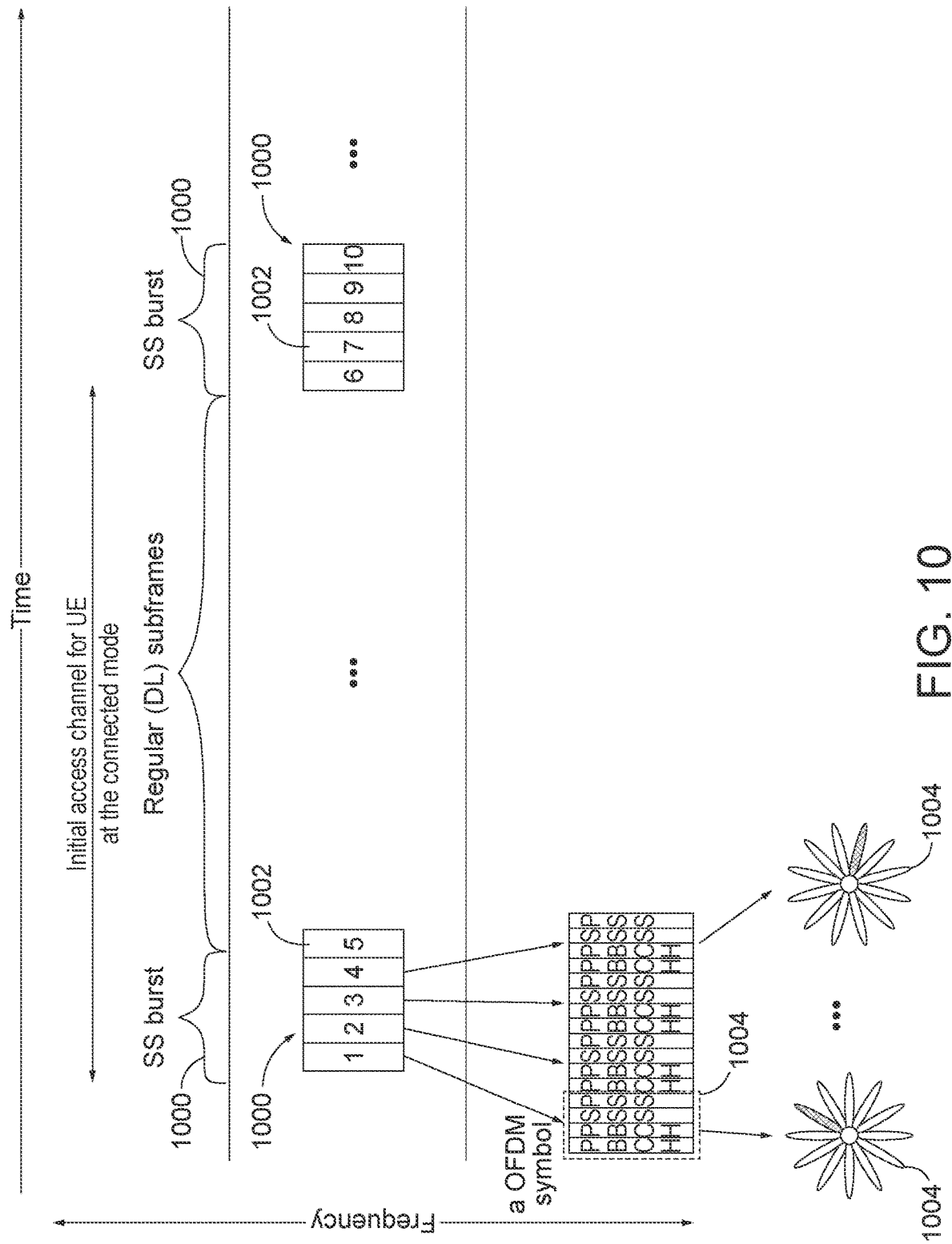
FIG. 10 illustrates an example consecutive burst block design in a SS burst according to an aspect of the application.
Figure 11:
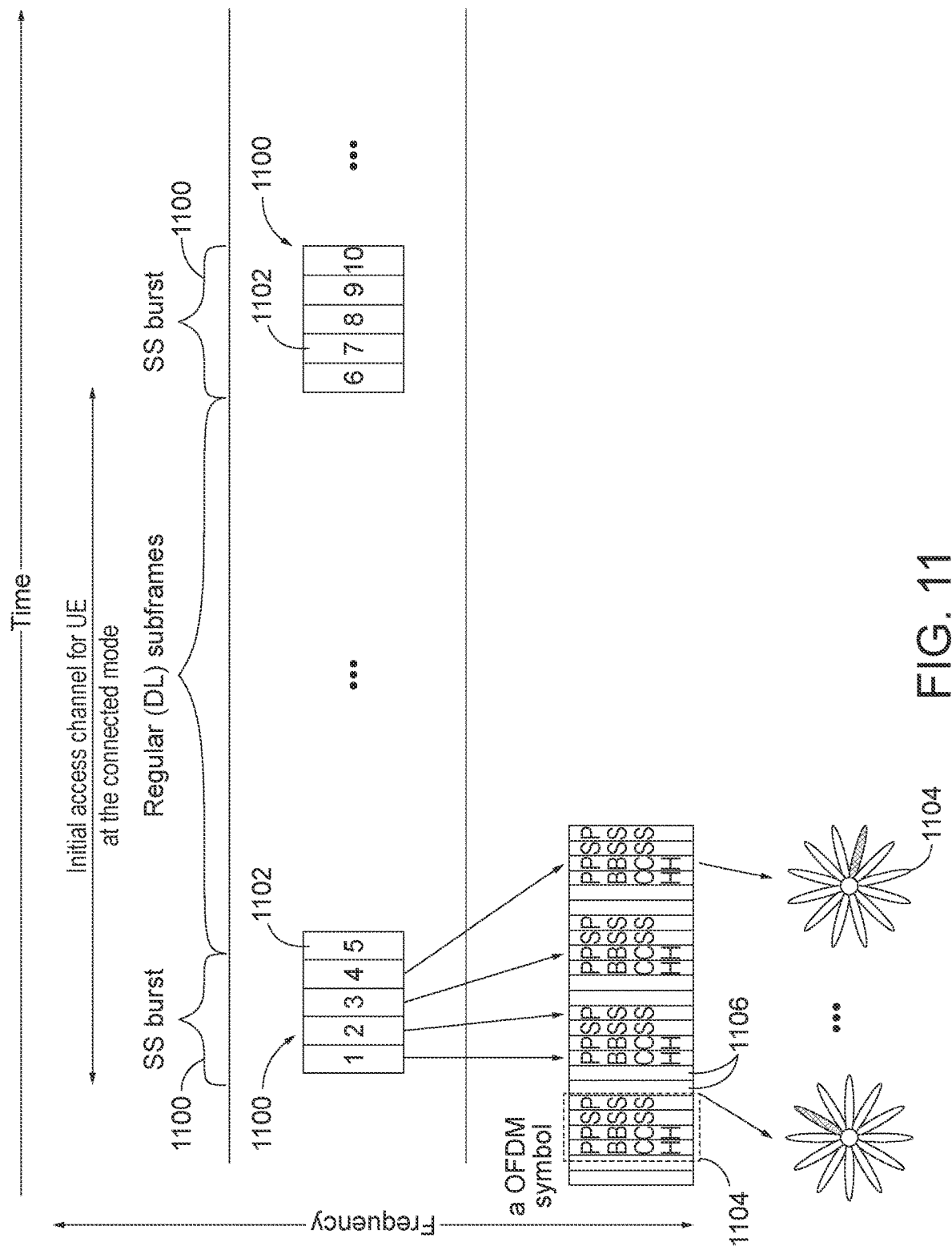
FIG. 11 illustrates an example non-consecutive burst block design in a SS burst according to an aspect of the application.

FIGS. 10 and 11 depicts examples of SS burst block distributions in a burst set. In the example depicted in FIG. 10, there are M=5 SS blocks 1002 in one SS burst 1000, and each SS block 1002 has N=4 OFDM symbols 1004. In this example, the SS burst has MN=20 OFDM symbols.

In an alternative example depicted in FIG. 11, there are M=5 SS blocks 1102 in a SS burst 1100 and each SS block has N=4 OFDM symbols 1104, but it has reserved O=2

OFDM symbols 1106 between each burst block 1104. In some cases, if the burst length is defined as MN+MO=20+ 10=30 symbols, then a given UE can detect the SS signal without knowing the burst block distribution in a given burst 1100. For example, if the burst length is known to the UE in terms of number of OFDM or sub-OFDM symbols, then the UE is able to detect the SS without knowing the SS block distribution in a SS burst 1100.

Turning now to SS burst periodicity, in an example, the SS burst periodicity impacts the timing-frequency acquisition time. If a SS burst periodicity is set too long, it is recognized herein that the one-time detection probability may need to be increased to avoid excessive synchronization time.

In some cases, support of multi-beam transmission in a beam sweeping SS block can reduce the beam sweeping time. If multi-beams are used in a beam sweeping block, in some examples, a beam ID signaling is required. For example, in a SS burst, if there are simultaneous multiple beams that are transmitted for NR-PSS, NR-SSS and NR-PBCH, then extra beam training reference signals can be used for distinguish them from each other and/or signaling of beam IDs. The resource allocation for multiple beams transmission of NR-PSS, NR-SSS and NR-PBCH can be the same or different. For example, if two beams are transmitted simultaneously at the same burst block time then, each beam may use different frequency domain allocations or may share the same resources in frequency domain of burst block. In some examples, the beam reference signal can be configured as a function of Cell ID, beam ID, and/or SS burst timing index. That is, the beam reference sequence can be initialized as function of $c_{init}=f(N_{ID}^{cell}, n_{beam}, n_{time-index})$, where $c_{init}$ is the initialization of beam training sequence. The SS burst timing/time index and beam IDs can be used for indicating physical random access channel (PRACH) resources such as PRACH preamble signal and time-frequency allocation. In this way, it can avoid the detection ambiguity for a UE when there are simultaneous multiple beams that are transmitted for NR-PSS, NR-SSS, and NR-PBCH. If there is a demodulation reference signal (DMRS) for the NR-PBCH demodulation in a SS burst, then the DMRS can be configured by Cell ID and/or with the SS burst timing index, i.e., $c_{init}=f(N_{ID}^{cell}, n_{time-index})$, where $c_{init}$ is the initialization of DMRS sequence.

In some cases, different nodes or gNBs might not transmit the same number of beams because some beams might not be transmitted in a SS burst among gNBs. In an example, if every gNB transmits the same number of SS blocks in a SS burst, then a UE can still detect the SS from multiple gNBs. Thus, in some cases, each gNB can configure the same number of SS blocks in a burst, but the decision to transmit beams or not in a SS burst can be determined by gNB implementation.

Different transmission and receptions points (TRPs) can associate to the same cell (gNB), and can use code division multiplexing (CDM) for multiple beam transmissions in a SS block, for example, to maintain beam orthogonality. Further, if a beam reference signal has been applied with an SS burst, then the beam reference signal can use CDM to maintain the beam orthogonality.

Turning now to physical broadcast channels (PBCHs), in one example, the NR-PBCH carries a portion of the minimum system information (SI), such as a master information block (NR-MIB), and secondary broadcast channels carry the remaining minimum system information (RMSI). In some cases, the NR-PBCH can carry NR-MIB information and the resource indication of remaining minimum system information (RMSI), for example, where the PRBs allocate the RMSI. For those secondary broadcast channel carrying the RMSI, the channels can share the SS burst set, thereby conserving beam sweeping resources. These secondary broadcast channels can be FDM with SS burst. Those broadcast channel resources and demodulation reference signals can be indicated by the PBCH carrying NR-PBCH with minimum SI and MIB. In some cases, the broadcast channel that carry RMSI might not be always transmitted. The demodulation reference signal can share the same port as PBCH. The DMRS signal can be derived using various methods. In an example, if the beam ID is explicitly signaled for a SS burst block, then the DMRS ID can be obtained via Cell ID, beam ID, and port ID for a SS burst block. In another example, if the beam ID is implicitly signaled by SS timing index from SS burst block, then the DMRS ID can be obtained via Cell ID, SS timing index, and port ID from SS burst block.

Figure 12:
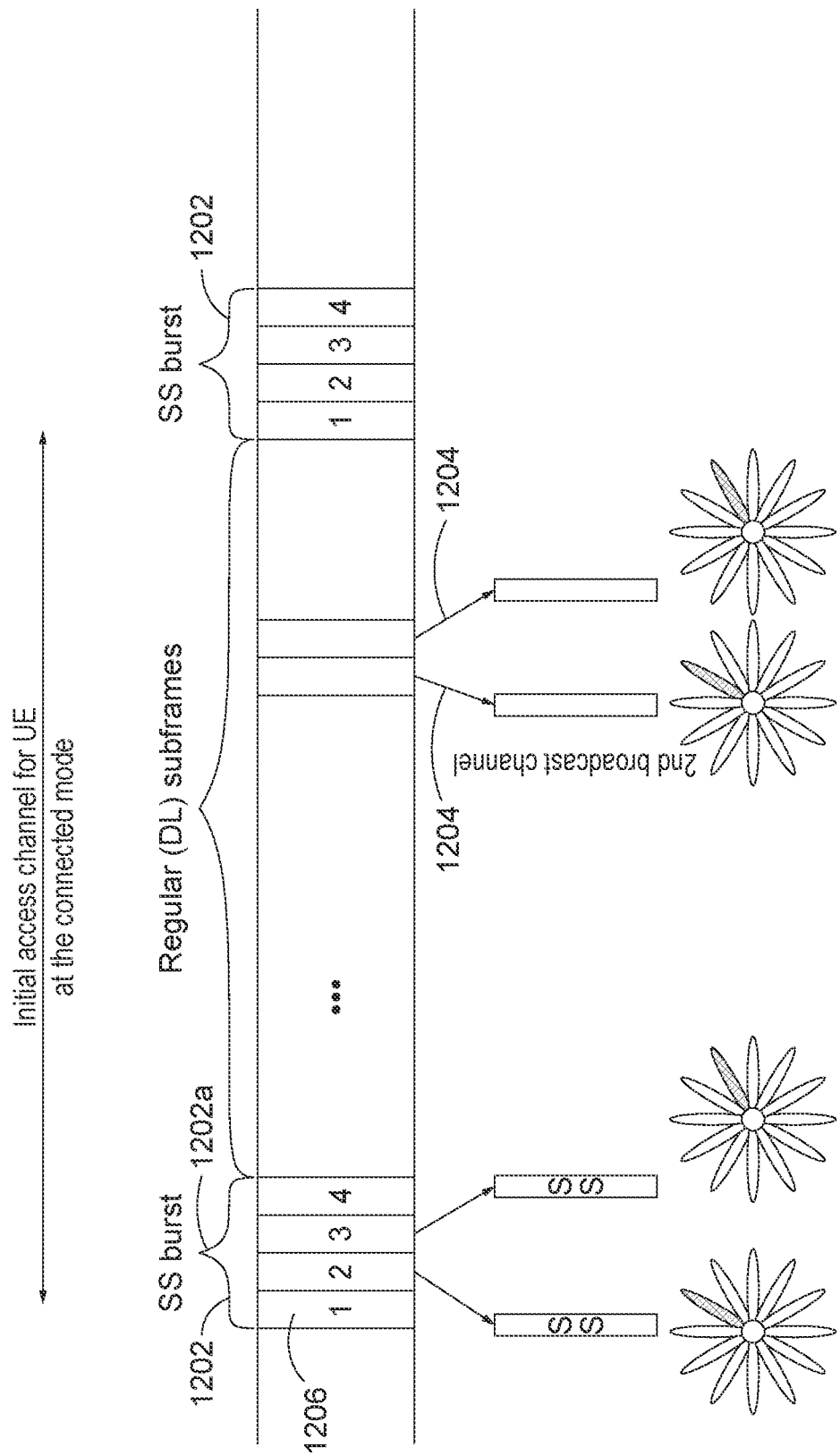
FIG. 12 illustrates an example broadcast channel carrying remaining minimum system information (RMSI) and sharing the same beam configuration with a defined SS burst in an initial access according to an aspect of the application.

Referring now to FIG. 12, in an example in which the NR-PBCH carries a portion of the minimum SI and the secondary broadcast channels carry the RMSI, those broadcast channels can be TDM with the SS burst 1202 in the initial access. The secondary broadcast channels 1204 can share the same transmission beams defined in the initial access SS burst 1202a. Those broadcast channel resources and demodulation reference signals can be indicated by the PBCH with minimum SI and MIB as shown in FIG. 12. The DMRS signal can be derived by using various mechanism. For example, if the beam ID is explicitly signaled from the SS burst block 1206 then the DMRS ID can be obtained via Cell ID, beam ID, and port ID from the SS burst block 1202. If the beam ID is implicitly signaled by the SS timing index from the SS burst block 1206, then the DMRS ID can be obtained via Cell ID, SS timing index, and port ID from the SS burst block 1206.

Figure 13:
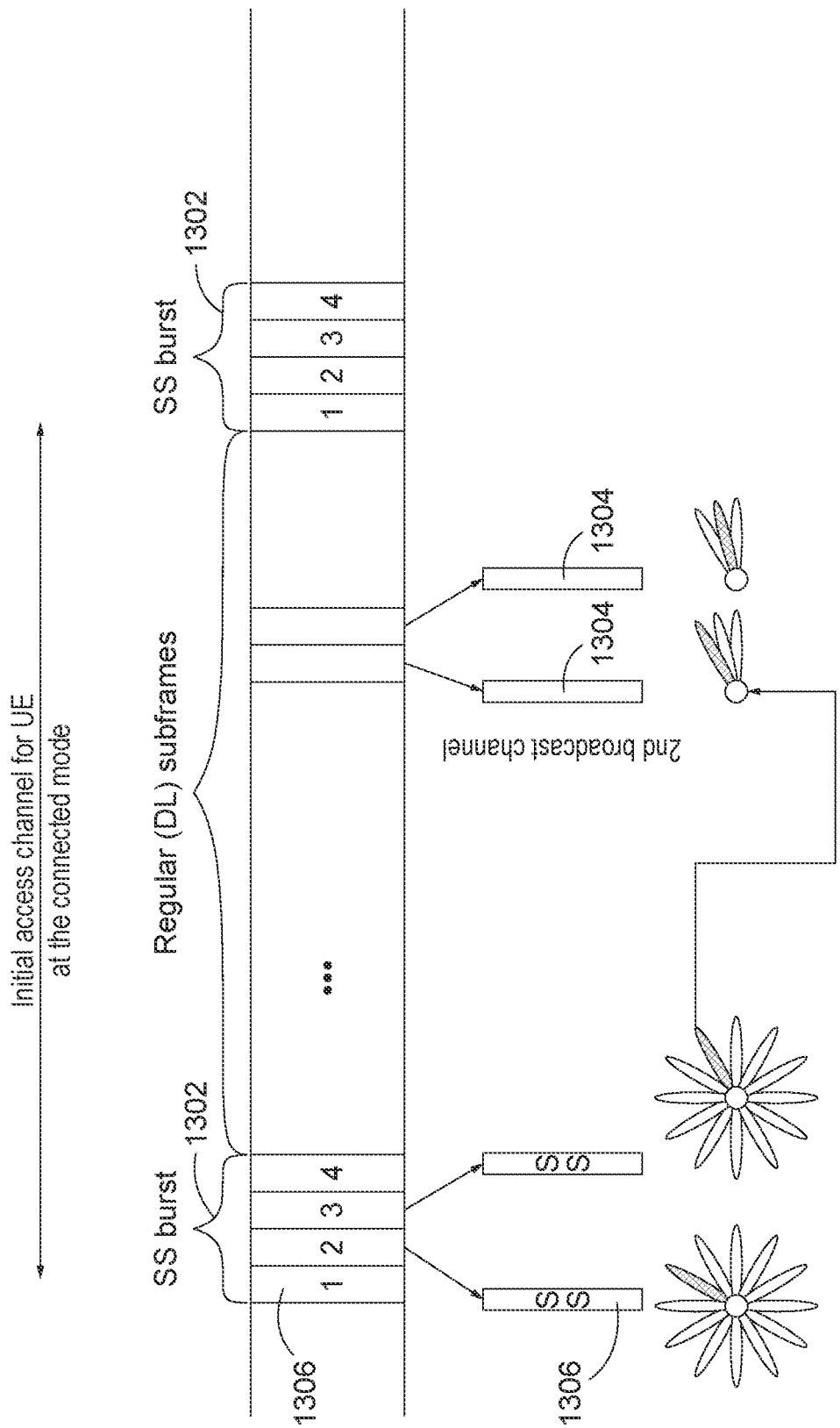
FIG. 13 illustrates an example broadcast channel carrying RMSI use refinement beams based on a defined SS burst in the initial access according to an aspect of the application.

Referring to FIG. 13, in another example in which the NR-PBCH carries a portion of the minimum SI and the secondary broadcast channels carry the RMSI, a beam refinement can be associated with a secondary broadcast channel 1304 while carrying the RMSI. From a UE perspective, in some examples, it can assume the transmission beams for those secondary broadcast channels 1304 are based on a pre-configured SS burst set 1302 in the initial access. Those broadcast channels 1304 can be transmitted via a second level beam sweeping burst. The second level beam sweeping burst can employ finer beams than those coarse beams used in the initial access. For example, if those broadcast channel resources and the corresponding refined beam sweeping burst information can be indicated by the PBCH carrying minimum SI and MIB, then a given UE can perform a second stage of beam training after successful detection of the NR-PBCH carrying minimum SI and MIB, as shown in FIG. 13. In this case, the UE may receive multiple broadcast channels that carry the same information. The UE can select the best signal to noise ratio (SNR) for the choosing the refined beam for beam correspondence. In addition, those broadcast channel can carry timing index information for implicit beam ID information. The DMRS signal can be derived using various mechanisms. For example, if the beam ID is explicitly signaling from a SS burst block 1306 by using a beam training reference signal, then the DMRS ID can be obtained via Cell ID, beam ID, and port ID from the SS burst block 1306 (i.e., $c_{init}=f(N_{ID}^{cell}, n_{beam}, n_{time-index})$, where $c_{init}$ is the initialization of beam training sequence. If the beam ID is implicitly signaled by the SS timing index from the SS burst block 1306, then the DMRS ID can be obtained via Cell ID, SS timing index, broadcast channel timing index, and port ID from a detected SS burst block 1306.

In another example PBCH design in accordance with another embodiment, the NR-PBCH can carry a portion of minimum SI, such as NR-MIB, and a physical downlink shared channel (PDSCH) for new radio (NR-PDSCH) can carry the RMSI. The NR-PDSCH resource and demodulation reference signals (e.g., such as ports and sequences) for carrying SI can be signaled via a RACH response (RAR) message 4 with RRC connection setup. The DMRS signal can be derived using various mechanisms. For example, if the beam ID is explicitly signaled from the SS burst block, then the DMRS ID can be obtained via Cell ID, beam ID, UE ID, and port ID from the RAR message. In another example, if the beam ID is implicitly signaled by the SS timing index from the SS burst block, then the DMRS ID can be obtained via Cell ID, SS timing index, UE ID, and port ID from the RAR message.

Figure 14:
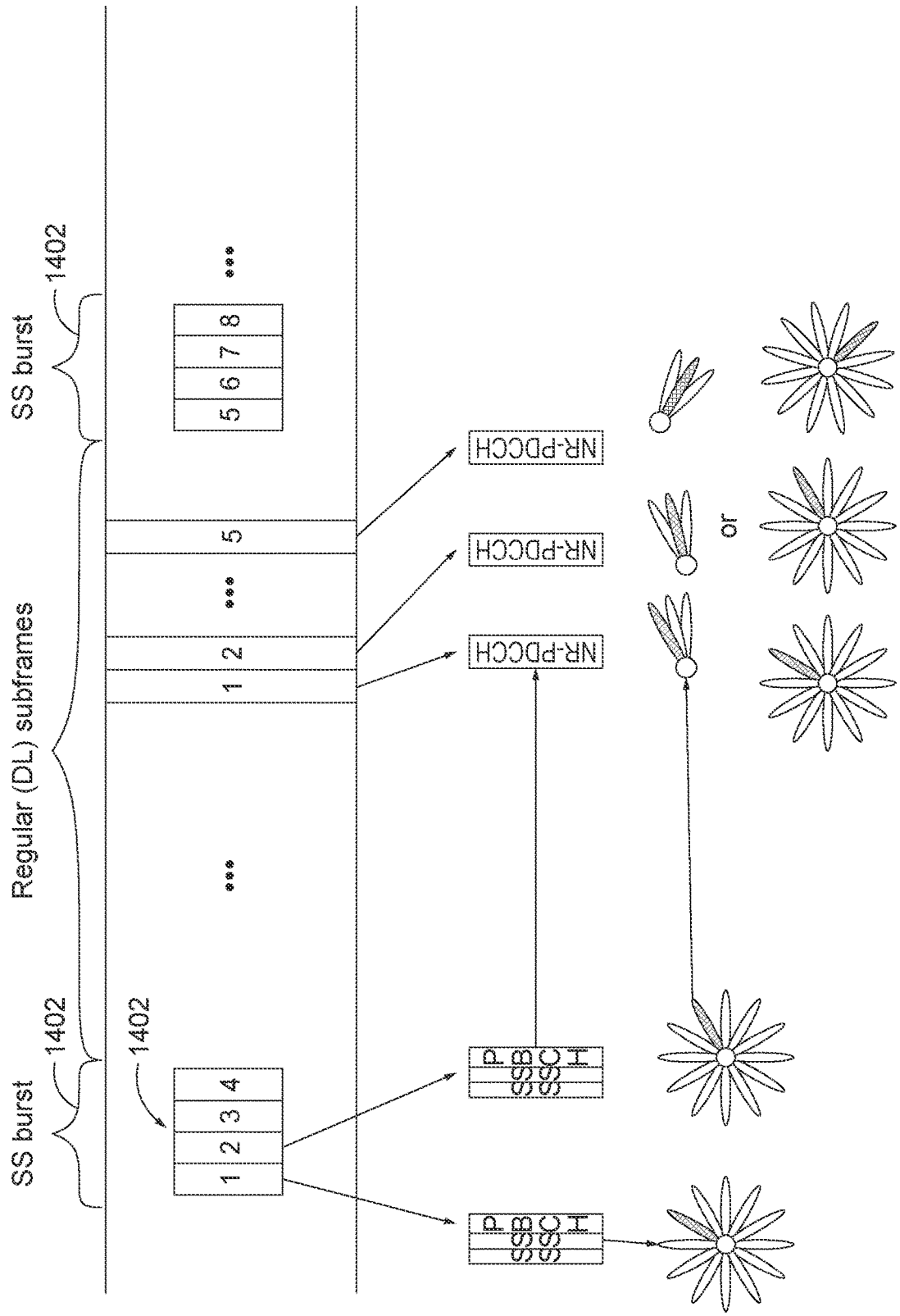
FIG. 14 illustrates an example physical downlink control channel (PDCCH) for NR (NR-PDCCH) carrying SI use refinement beams or a similar beam based on a defined SS burst in the initial access according to an aspect of the application.

In yet another example PBCH design in accordance with yet another embodiment, the NR-PBCH can carry a portion of minimum SI, such as NR-MIB, and a (cell-specific) physical downlink control channel (PDCCH) for NR (NR-PDCCH) can carry the RMSI. The NR-PDCCH resource (or search space) and the demodulation reference signals (such as ports and sequences) can be indicated by the PBCH carrying NR-PBCH with minimum SI and MIB. The demodulation reference signal for NR-PDCCH can be configured with the same or different beams in the SS burst set of the initial access. A given UE may use the configured DMRS for demodulation of the NR-PDCCH as shown in FIG. 14, for example.

In some cases, the NR-PDCCH that carries the RMSI might not be always transmitted. The DMRS signal can be derived using various mechanisms. For example, if the beam ID is explicitly signaled from the SS burst, then the DMRS ID can be obtained via Cell ID, beam ID, and port ID from a detected SS burst block. If the beam ID is implicitly signaled by SS timing index from a detected SS burst block, then the DMRS ID can be obtained via Cell ID, SS timing index and port ID from SS burst block. The NR-PDCCH search space can associate with beam ID and time-frequency resources. The beam ID can be explicitly signaled via an extra beam reference signal, or it can be implicit signaling via the timing index of the beam training sweeping burst. For example, referring to FIG. 14, in the initial access, the beam training sweeping burst can be the SS burst 1402 (or burst set). It can have its own beam sweeping burst set definition for NR-PDCCH. If NR-PDCCH has its own dedicated beam sweeping burst/burst set, then the NR-PDCCH may carry the timing index for implicit beam ID signaling, or an extra beam reference signal can be used for beam ID indication, as shown on FIG. 14.

Figure 15:
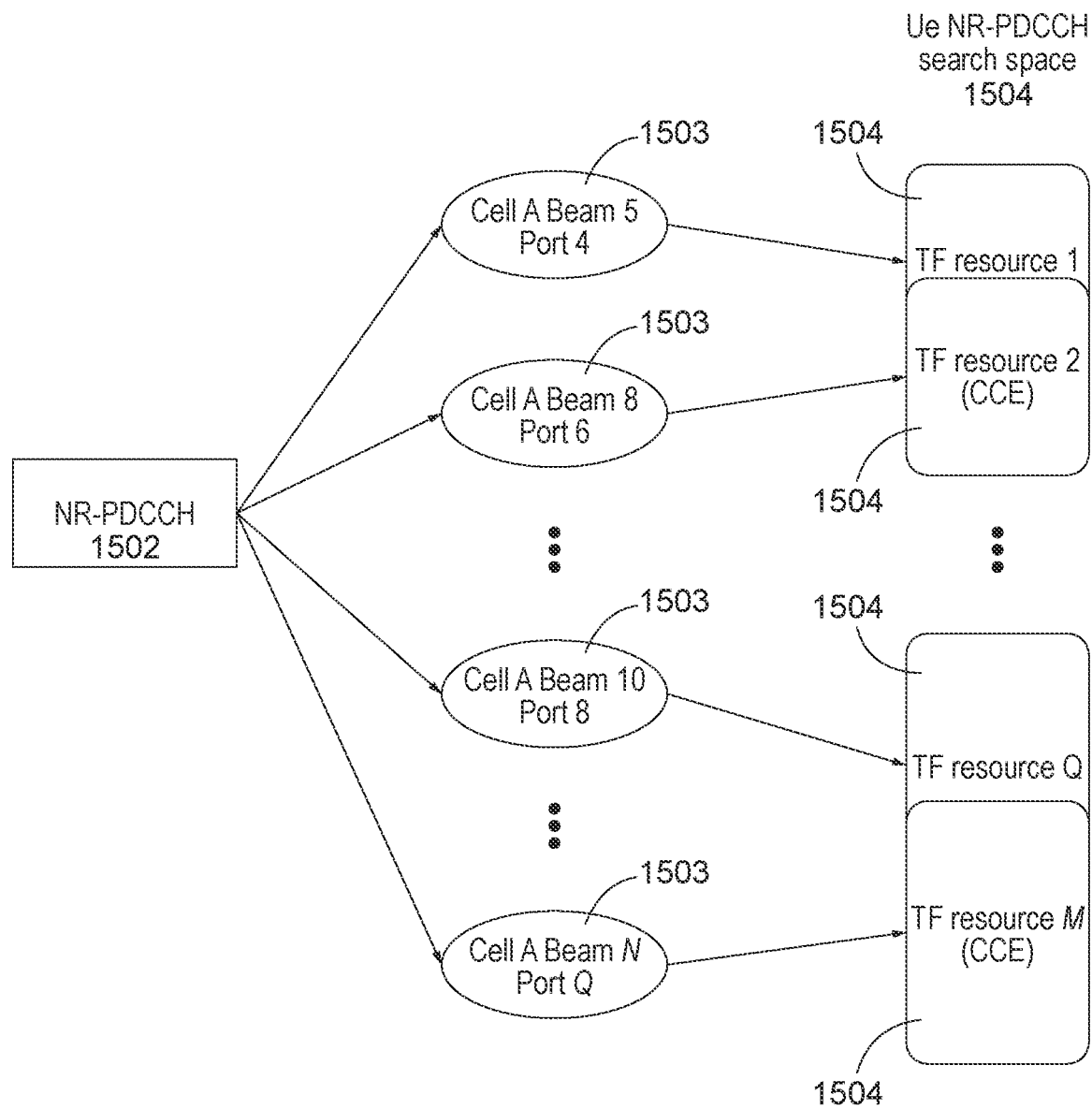
FIG. 15 illustrates an example search space for NR-PDCCH with association of beam ID and time frequency resources according to an aspect of the application.

In an example, referring to FIG. 15, an NR-PDCCH 1502 can be transmitted via multiple beams 1503 and search spaces 1504. This may allow a given UE to monitor multiple different beams 1503 with its corresponding search space 1504 for beam tracking or beam recovery at the same time or different times. The UE can track at least more than one NR-PDCCH search space 1504 for beam recovery. NR-PBCH timing indications may be implicit or explicit in which an SS burst timing index is signaled. In n example, the timing index can be used for masking CRC, or a bit-interleaver can be used for the indication of timing index. A scrambling code can be used for the indication of timing index. The SS burst timing (time) index can be used for deriving the PRACH resources as well.

Figure 16:
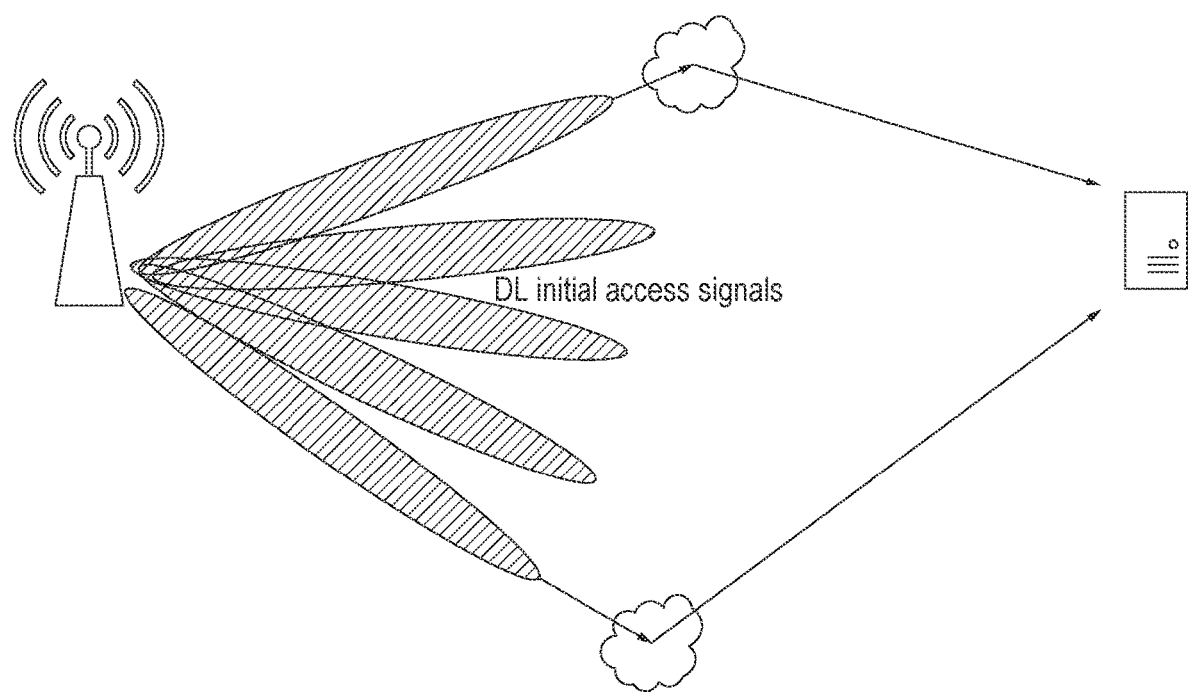
FIG. 16 illustrates an example UE monitoring more than one beam in the initial access for physical random access channel (PRACH) retransmission according to an aspect of the application.

According to another aspect regarding random access, techniques are described for RACH resource indication. Here, the PBCH may have a different period than SS burst when PRACH resources are signaled by PBCH. Techniques are also described for RACH RAR power boosting and beam reselection. When the UE retransmits the preamble but the RAR is not received, in some examples, a preamble can be reselected based on the monitored beams from the initial access (either from connected-mode or idle-mode SS). The RACH preamble may be selected from the resources corresponding to the best selected initial access DL beams. An example showing DL initial access signals is shown in FIG. 16. In some examples, if it is still no RAR then UE can boost transmit power for PRACH transmission when cycling the selected best M initial access beams (SS bursts) in a certain time window.

Figure 17A:
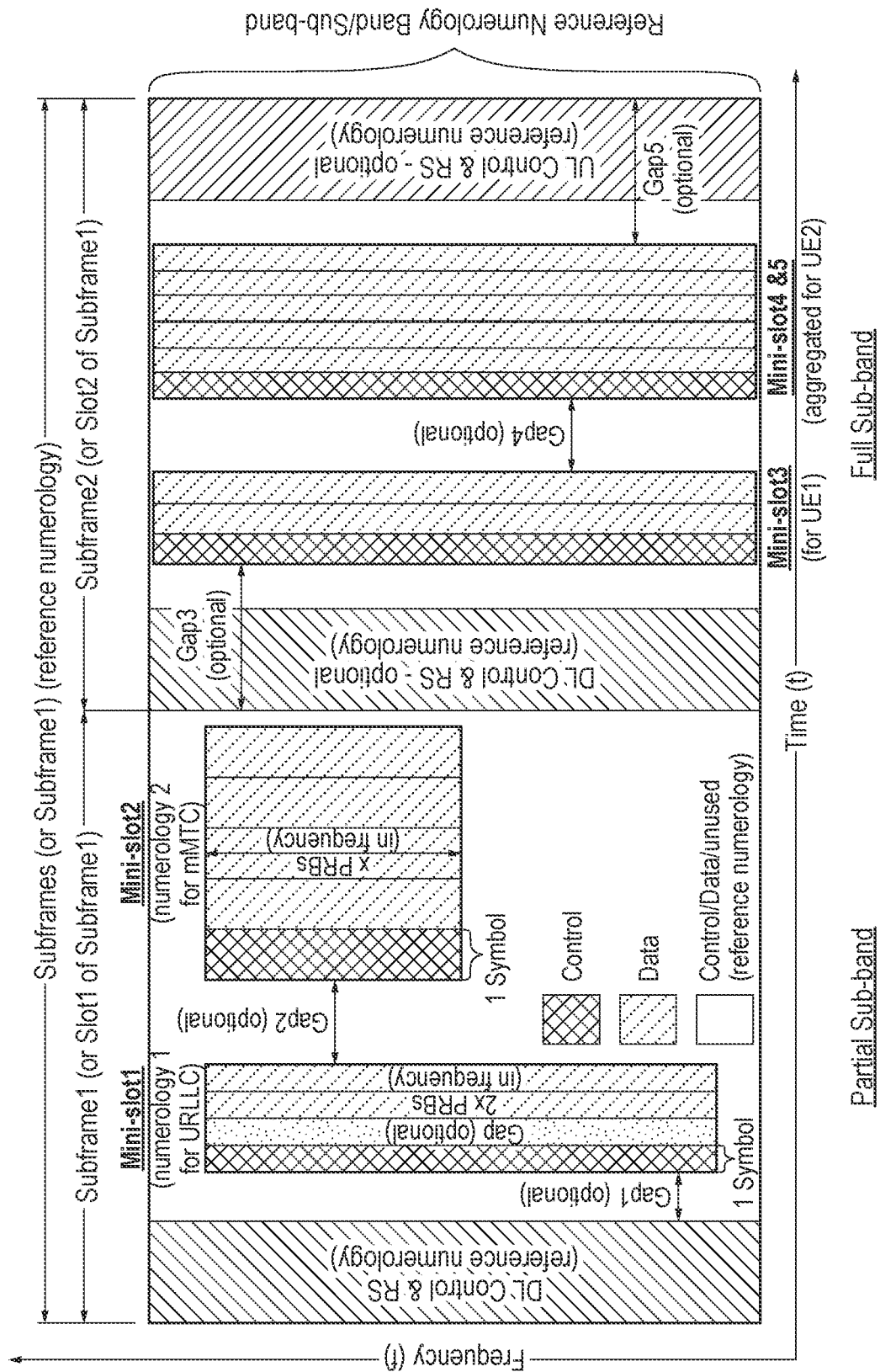
FIGS. 17A and 17B depict examples of mini-slots in accordance with an example embodiment.
Figure 17B:
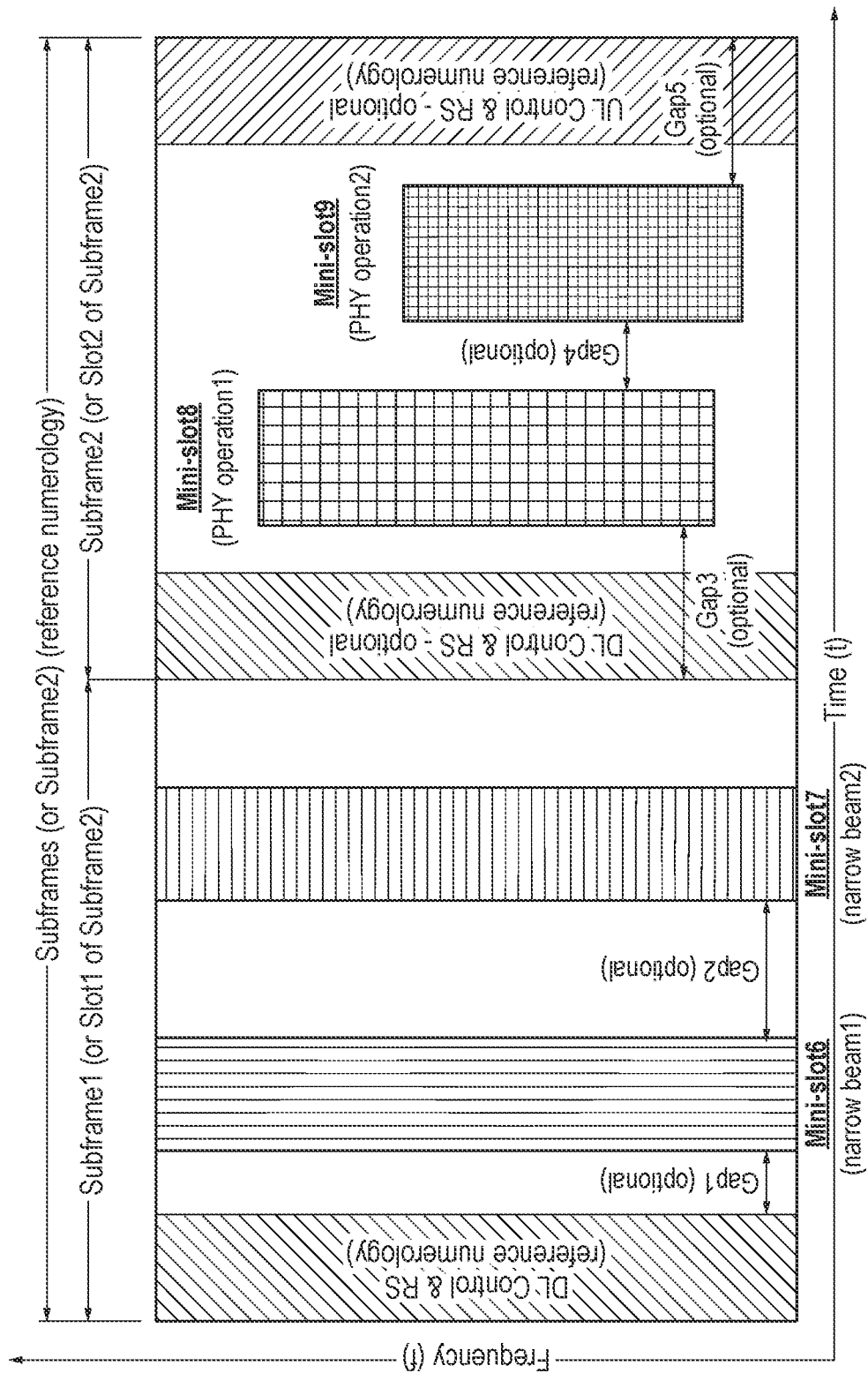

Example mechanisms for control channels are now described, in accordance with various embodiments. Referring to FIG. 17, an example mini-slot is a scheduling or transmitting interval within a subframe and/or slot that is defined with a reference numerology. A mini-slot may be used as, presented by way of example and without limitation, for:

- Numerology specific signals, control and/or data. For example, different subcarrier spacing and/or different symbol length may exist within the reference numerology subframe and/or slot (e.g., Mini-slot 1 and 2 in FIG. 17);
- Beam specific signals, control, and/or data, e.g. resources allocated to a specific narrow beam or beams (e.g., Mini-slot 6 and 7 in FIG. 17);
- PHY function specific signals, control, and/or data, e.g. for a specific or on-demand PHY function or procedure such as synchronization in time and/or frequency or phase tracking; broadcasting for system information or paging; beam management (e.g., training, alignment or refining); radio link and/or interference measurements; neighboring cell and/or TRP discovery, etc. for a specific service or UE(s) (e.g., Mini-slot 8 and 9 in FIG. 17);
- Service specific signals, control, and/or data, e.g. for URLLC and/or mMTC service, and/or for services using grant-free UL transmission (e.g., Mini-slot 1 and 2 in FIG. 17); and/or
- UE or UE group specific signals, control and/or data, e.g. self-contained to a specific UE or UE group (e.g., Mini-slot 3 and 4 and 5 in FIG. 17).

Figure 18:
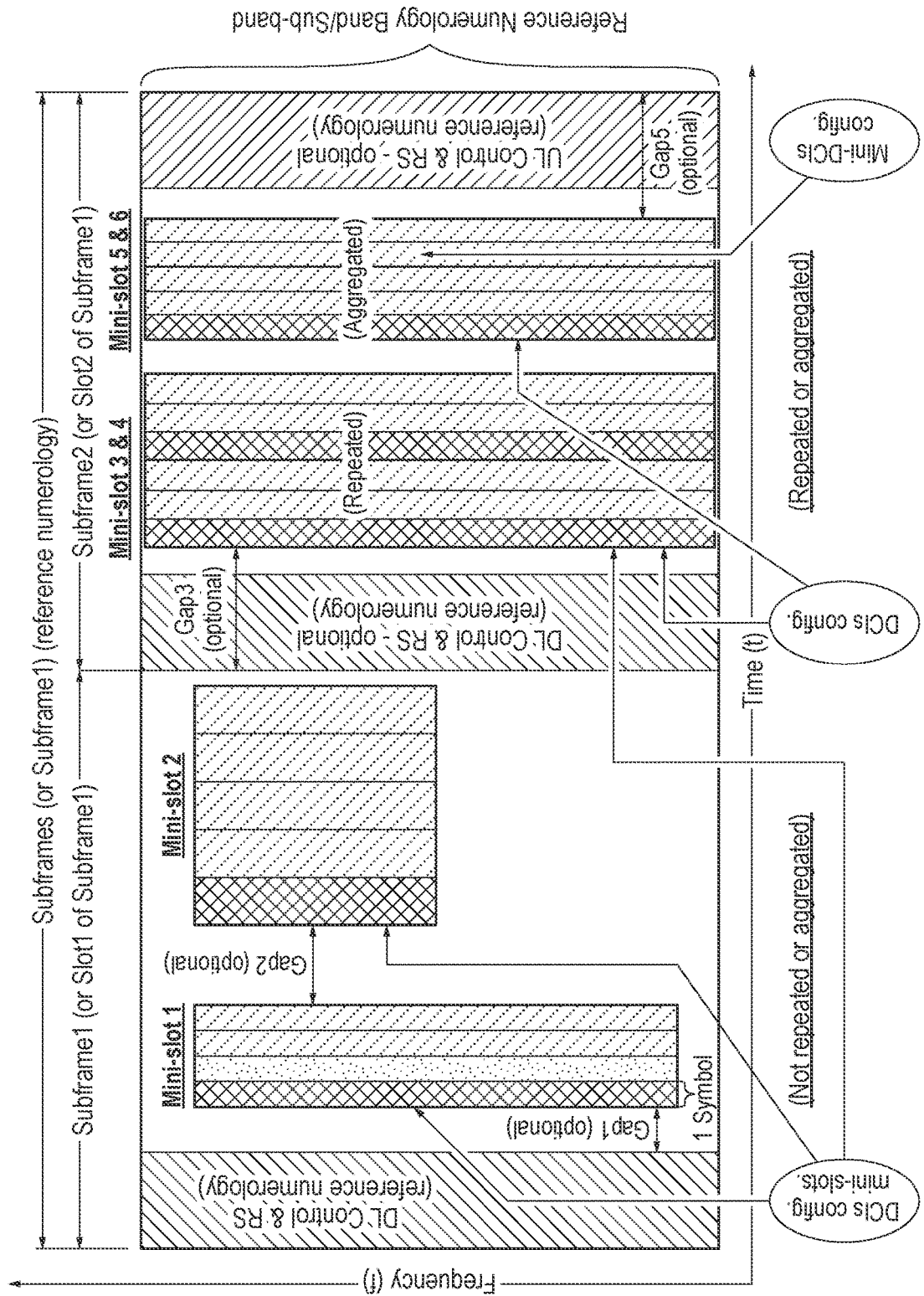
FIG. 18 shows a dynamic Indication of mini-slot configuration in accordance with an example embodiment.

Example mini-slot configurations, as shown in Table 2 and Table 3 below, may be indicated, for example, statically via system information, semi-statically via RRC signal or MAC CE. Mini-slot configurations may also be indicated dynamically via the DL control channel (e.g., DCIs in DL Control of Subframe 1 or Slot 1 for Mini-slot 1, Mini-slot 2, and repeated Mini-slot 3 and 4, DCIs in DL Control of Subframe 2 or Slot 2 for repeated Mini-slot 3 and 4, and aggregated Mini-slot 5 and 6) within the subframe or slot of reference numerology, or the specific DL control channel within a mini-slot (e.g., Mini-DCIs in Mini-slot 5 indicating the aggregated Mini-slot 6 following Mini-slot 5), as shown in FIG. 18. DCIs or Mini-DCIs may contain mini-slot configuration parameters as depicted in the example of Table 2, or a mini-slot configuration index as depicted in the example of Table 3. It will be understood that the gaps illustrated in the figures, such as gaps 1802 in FIG. 18, unless otherwise specified, may also be configured statically, semi-statically, or dynamically.

TABLE 2

Example of Mini-slot Configurations

| Configuration in Time | | | | Configuration in Frequency | | | | |
|---|---|---|---|---|---|---|---|---|
| | | | | | Offset | | | |
| Start Symbol Index | Length (symbols) | Grid or Aggregated (optional) | Across Slot (optional) | Length (PRBs) | (PRBs)- if partial band | Continuous (optional) | Function (optional) | Pre-empt (optional) |
| e.g. 00: 1st 01: 2nd 10: 3rd 11: 4th | e.g., 00: n/a 01: 1 10: 2 11: 3 | e.g., 000: 0 (no ) 001: 1 010: 2 011: 3 ... 111: 7 | 0: no 1 : yes | e.g., 000: full band/ subband 001: 1 010: 2 011: 3 ... 111: 7 | e.g., 000: 0 (no offset) 001: 1 (repeat 1) 010: 2 011: 3 ... 111: 7 | 0: no 1: yes | e.g., 00: sync 01: broadcast 10: control/data 11: measure | 0: no 1: yes |

TABLE 3

Example of Mini-slot Configuration Index Table

| Config. Index | Start Symbol Index | Length (symbols) | Grid or Aggregated | Across Slot | Length (PRBs) | Offset (PRBs) | Function | Pre-empt |
|---|---|---|---|---|---|---|---|---|
| $C_1$ | 00 ($1^{st}$) | 001 (1) | 000 (no) | 0 (no) | 000 (full band) | 000 (no) | 00 (sync) | 1 (yes) |
| $C_2$ | 10 ($3^{rd}$) | 010 (2) | 000 (no) | 0 | 110 (6) | 100 (4) | 01 (broadcast) | 1 (yes) |
| ... | | | | | | | | |
| $C_i$ | 01 ($2^{nd}$) | 011 (3) | 100 (repeat 4 times) | 1 | 000 (full band) | 000 (no) | 10 (control/ Data) | 0 (super- position) |
| ... | | | | | | | | |

Figure 19:
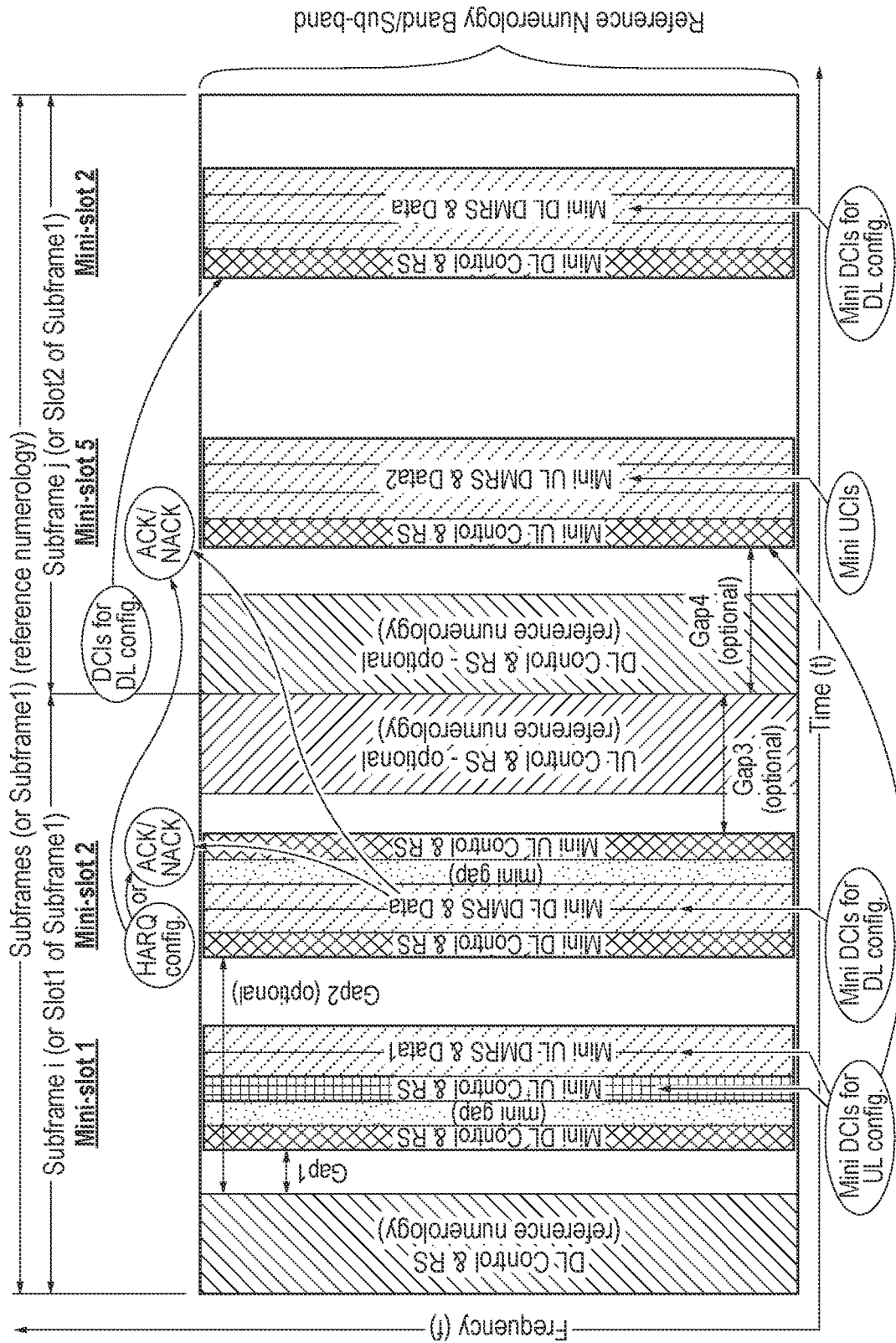
FIG. 19 depicts examples of a mini-slot structure in accordance with an example embodiment.

Examples of mini-slot structures are illustrated in FIG. 19. It will be understood that hybrid automatic repeat request (HARQ) is used for purposes of a closed-loop example, and similar mechanisms may be used for other operations, such as, for example, closed loop power control, CSI measurement, radio link adaptation, etc. As shown in FIG. 19, the Mini-DCIs in Mini-slot 1 of Subframe i configures the mini gap and UL control and/or data transmission(s); the Mini-DCIs in Mini-slot 2 of Subframe i indicates the information for DL control and/or data transmission(s); the Mini-UCIs in Mini-slot 5 of Subframe j indicates the UL control and/or data transmission(s); Mini-DCIs in Mini-slot 2 of Subframe j indicates the DL control and/or data transmission(s). Also as exemplified in FIG. 19, the Mini-DCI for HARQ configuration of Mini-Slot 2 of Subframe i configures either the ACK/NACK feedback for the received DL control, or data is transmitted on the Mini UL control of Mini-slot 2 of Subframe i or Mini UL control of Mini-slot 5 of Subframe j.

Figure 20:
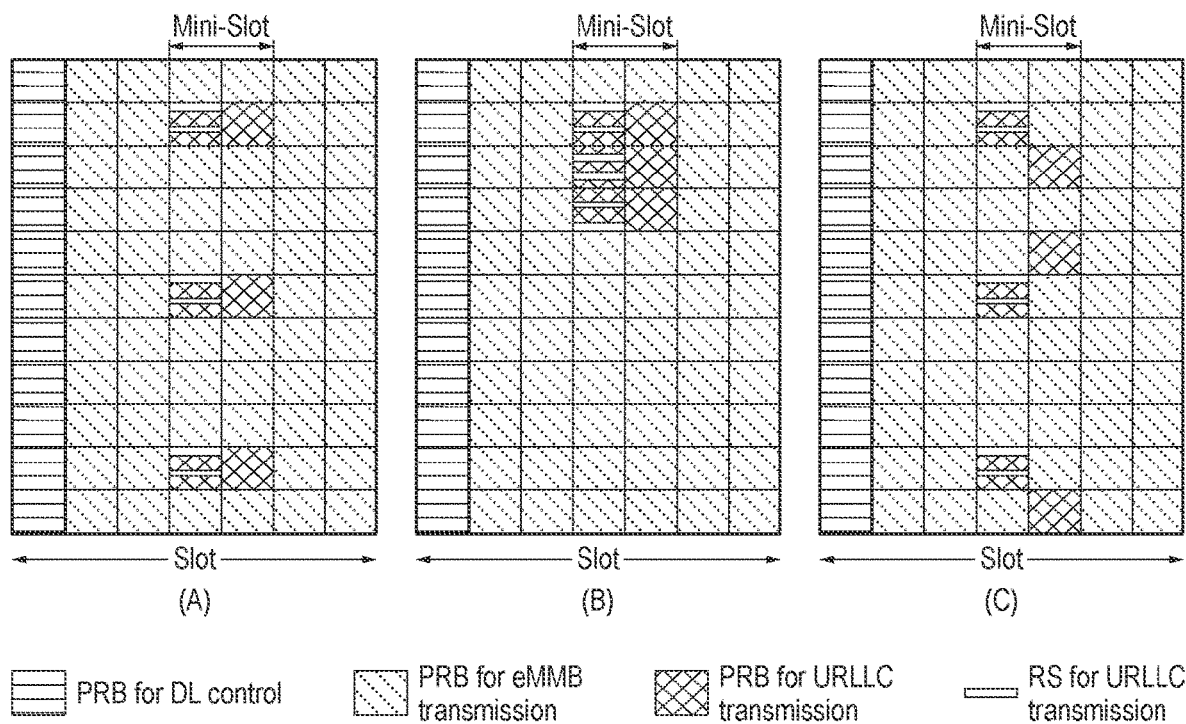
FIG. 20 depicts examples of preemptive Ultra-Reliable Low Latency Communication (URLLC) resource configuration over enhanced Mobile Broadband (eMBB) transmissions: (A) distributed frequency resources, (B) contiguous frequency resources, and (C) frequency hopped resources.

Embodiments for transmitting URLLC over scheduled eMBB resources in the DL are now described in detail. When URLLC resources take precedence over scheduled eMBB resources, there are various possibilities for allocating the URLLC time-frequency resources. For example, the URLLC transmission may be super-positioned on top of the eMBB transmission, or the URLLC transmission may alone be transmitted and no eMBB transmission may occur on those resources. Design aspects are also disclosed below for CB design and mapping for eMBB, MAC level recovery of affected eMBB information, and indicating scheduled or unscheduled transmissions to the URLLC UE In an example, the DL resources for a URLLC UE may be allocated in a distributed manner across a certain bandwidth or in a contiguous portion of the spectrum as seen in FIGS. 20A and 20B. Also, the resources may be confined to a few symbols or less (e.g., as small as one) in time with respect to the eMBB numerology to minimize the latency. It is recognized herein that, in some cases, contiguous symbols in time may be most beneficial for URLLC. The resources may frequency hop across the allocated symbols as shown in FIG. 20C.

In an example embodiment, the reference signaling for URLLC UE to decode the URLLC transmission may be shared with the eMBB transmission (e.g., especially if eMBB and URLLC transmission use the same precoder), or separate resources may be allocated for the URLLC transmission (e.g., especially if the precoders are different from those of eMBB).

As mentioned above, the eMBB and URLLC transmissions may be super-positioned within the same set of resources. In this case, in an example, the relative power offset between the eMBB and URLLC transmissions may be used to enable eMBB UE to recover its information despite the interference from the URLLC transmission. The eMBB may use successive interference cancellation (SIC) to recover its information by detecting the URLLC data and cancelling it from the received signal. The eMBB UE is assumed to be signaled the information about the URLLC transmission. The information may include, presented by way of example and without limitation, relative power of URLLC transmission with respect to the eMBB transmission, code rate of URLLC transmission, modulation of the URLL transmission, and time and frequency resources of the URLLC transmission. In general, the solutions described above for indicating the URLLC information to the eMBB UE are also applicable here.

Turning now to exclusive use of eMBB resources for URLLC, URLLC may be transmitted preemptively by redirecting the eMBB resources exclusively for URLLC. This may impact the eMBB transmission. Example embodiments, which are described in detail below, enable eMBB systems to recover from the loss of resources in various scenarios, such as scenarios in which there is timely knowledge of pre-emptive URLLC transmission, delayed knowledge of pre-emptive URLLC transmission, or no knowledge of the pre-emptive URLLC transmission. It is noted that this scheme may be considered a special case of super-positioning in which the power allocated to the eMBB is zero.

Timely knowledge of pre-emptive URLLC transmission is now described. The DL signaling may explicitly or implicitly provide the eMBB UE knowledge of the pre-emptive URLLC transmission before or during the reception of the eMBB TB. One or more of the following information may be conveyed implicitly or explicitly to the UE about the pre-emptive URLLC transmission, presented by way of example and without limitation:
  Existence of a pre-emptive URLLC transmission
  Impacted eMBB time-frequency resources such as, for example:
    REs assigned to the URLLC transmission
    RBs assigned to the URLLC transmission
    CBs partially or fully assigned to the URLLC transmission
    Symbols partially or fully assigned to the URLLC transmission
    Mini-slots or slots partially or fully assigned to the URLLC transmission
  One or more of the URLLC transmission parameters such as, for example, modulation type, reference signal, transmission mode, relative power level with respect to the eMBB transmission.

The knowledge of preempted resources may be signaled implicitly in various ways. In one example, the eMBB and URLLC transmissions may use different modulations. The eMBB UE may blindly detect the URLLC modulation and exclude those resources from the eMBB TB. For example, the URLLC resources may be assigned in units of PRBs as shown in FIG. 2. The URLLC transmission may use the same (FIG. 21A) or different numerology (FIG. 21B) as the eMBB transmission. The URLLC transmission is shown to occur in a mini-slot of 2 symbols with respect to the eMBB numerology and its resources are allocated in chunks of PRBs distributed through the bandwidth. In some cases, the URLLC transmission may also include a control signaling region.

If an eMBB UE fails its CB or TB CRC check, in some cases, it may blindly detect other modulations and permitted numerologies in each PRB. The eMBB UE may again decode the CB or TB such that the PRBs deemed to belong to other modulations will be set to zero LLR in the LDPC decoding process, as shown in the example UE method depicted in FIG. 22.

Figure 22:
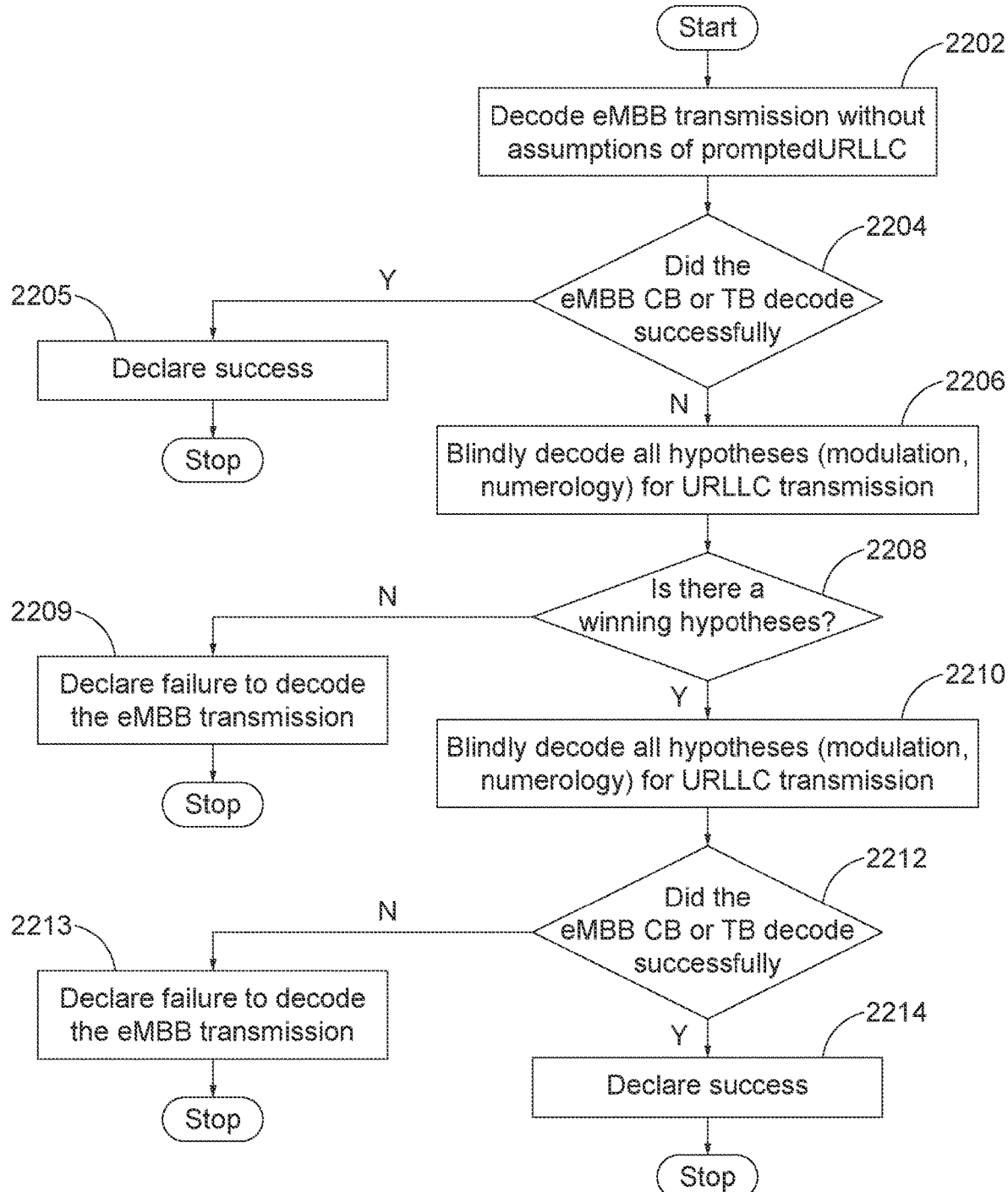
FIG. 22 is a flow diagram that shows an example of a eMBB UE's method to decode its payload in the presence of pre-emptive URLLC transmission with a different modulation/numerology, according to an embodiment.

Referring to FIG. 22, in accordance with the illustrated example at 2202, an eMBB UE performs reception without knowledge of URLLC preemption. At 2204, the eMBB UE decodes CB or TB by performing a CRC check for the CB or TB, respectively. If the CRC check is successful, the process proceed to 2205, where the UE sends an Ack. If the Step 2205: If the eMBB UE has successful CRC check, it sends Ack. If the eMBB UE fails the CRC check, the process may proceed to 2206, where the UE checks possible hypotheses for the presence of a URLLC preemption. At 2208, the eMBB UE determines whether a URLLC preemption is detected. If no URLLC preemption is detected, the eMBB UE may send a Nack, at 2209. If eMBB UE detects a URLLC transmission, in accordance with the example, the UE zeros out the LLR for those resources and decodes the CB or TB again, at 2210. At 2212, the eMBB UE determines whether there is a CRC match. If there is not a match, the process may proceed to 2213, where the eMBB UE sends a Nack. If there is a match, and thus the CRC is successful, the process may proceed to 2214, where the UE sends an Ack. Thus, in example cases in which the percentage of the preempted resources is small or where the eMBB transmission has a low code rate, the eMBB UE may decode successfully after erasing the preempted LLRs (e.g., setting to zero).

In some cases, the set of modulations and numerologies to be blindly detected may be configured through RRC signaling or through system information.

Figure 21:
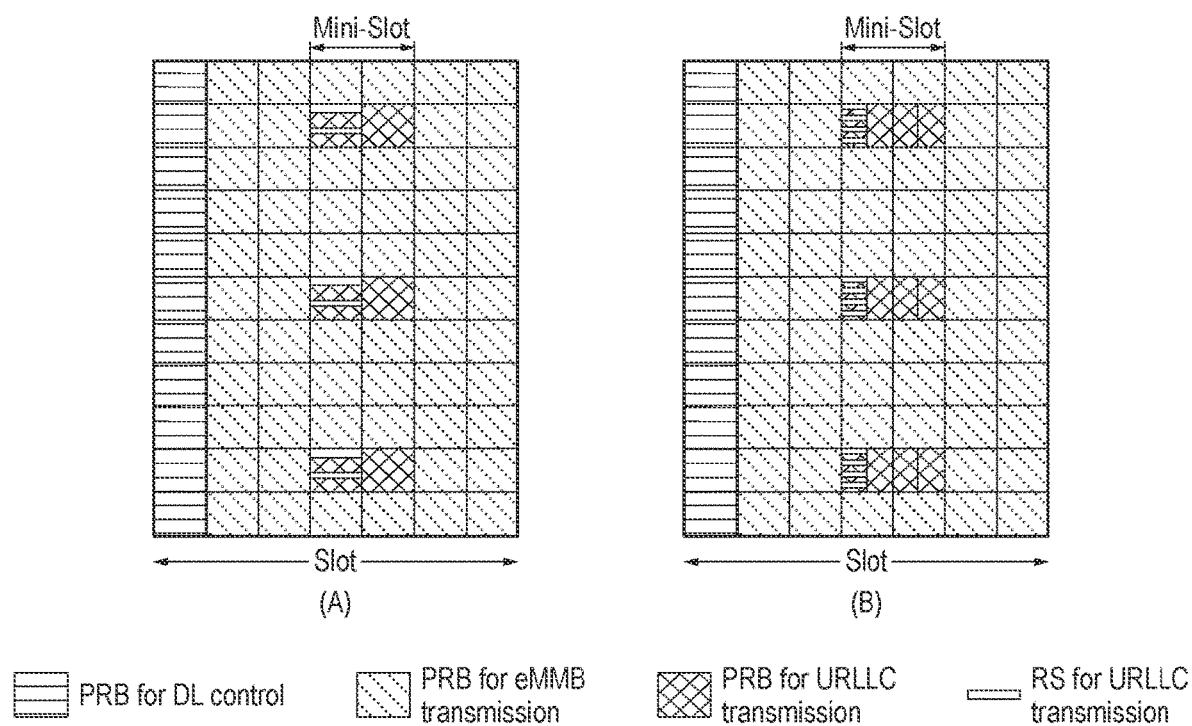
FIG. 21 depicts an example numerology for URLLC transmissions that is (A) the same as eMBB and (B) different from eMBB.

In another example embodiment, a unique reference signal for URLLC may be used to identify the URLLC transmission, as shown in FIG. 21. The eMBB UE may correlate with the URLLC reference signal and detect a high correlation, and thus may identify corresponding resources as URLLC resources. The sequence for the URLLC reference signal may be specified or configured through system information or RRC as a function of one or more of the following, presented by way of example and without limitation:
  Symbol within a mini-slot/slot/subframe/frame
  RE within the bandwidth
  Numerology of the eMBB transmission
  Numerology of the URLLC transmission
  Beam ID of the transmission
  Cell ID
  eMBB UE ID An example of a corresponding UE procedure is shown in FIG. 23, where the URLLC transmission's RS is used as an identifier to indicate the associated URLLC resources.

Figure 23:
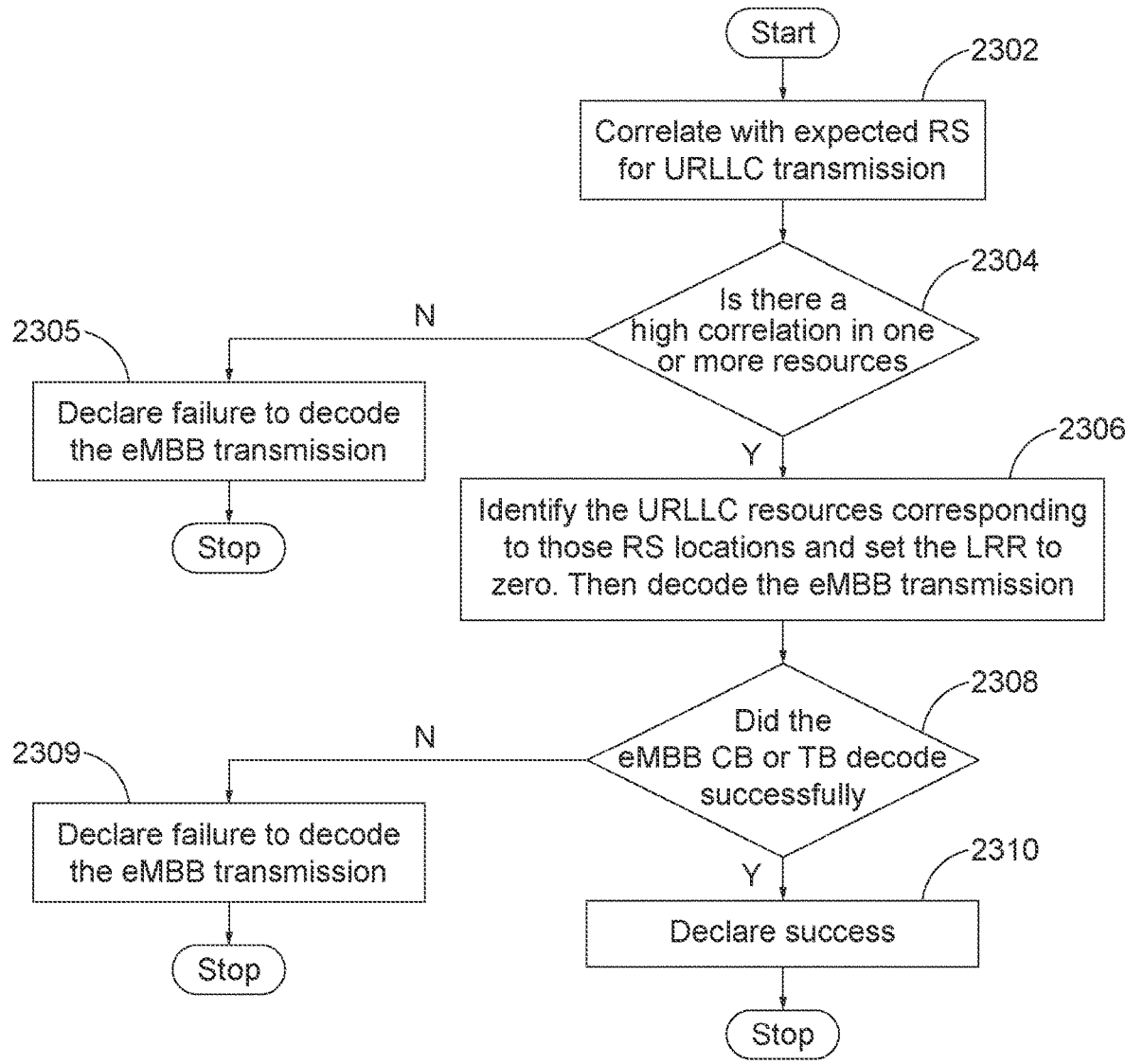
FIG. 23 is a flow diagram that shows an example of a eMBB UE's method to decode its payload in the presence of pre-emptive URLLC transmission using distinct reference signals for URLLC transmission, according to an embodiment.

Referring to FIG. 23, in accordance with the illustrated example, at 2302, RS resources are used as identifiers to enable an eMBB UE to detect preemption. The eMBB UE may perform correlation of the received transmission with expected RS sequences, so as to detect the presence of the RS associated with the preemption. When the eMBB UE cannot decode the received CB or TB successfully, it may perform this operation to determine if preemption resources are present. At 2304, the eMBB UE computes the correlation metric for the RS for candidate resources. It compares the metric with a threshold to determine if preemption is detected or not. If the eMBB UE does not detect preemption (e.g., if metric is not higher than threshold), it may send a Nack, at 2305. If the eMBB UE detects preempted resources, it sets the LLR of the received symbols corresponding to those resources to zero, at 2306. At 2308, in accordance with the illustrated example, the eMBB UE attempts to decode the CB or TB again with updated LLRs, and thus determines whether CRC detection is successful. If the eMBB UE does not have a successful CRC detection, it transmits a Nack, at 2309. If the eMBB UE has a successful CRC detection, it sends an Ack, at 2310.

Thus, as described herein, an apparatus may send a first transmission and a second transmission, and the apparatus may assign resources of the first transmission to the second transmission, so as to preempt the first transmission with the second transmission. The apparatus may send control information so as to explicitly indicate that the second transmission should preempt the first transmission, and the control information may further indicate at least one resource for preemption. Alternatively, the apparatus may transmit a reference signal that indicates preemption information, so as to implicitly indicate that the second transmission should pre-empt the first transmission. The first transmission may be overwritten by the second transmission at select resource locations of the first transmission. In some cases, as described further below, the first transmission skips resources selected for preemption by the second transmission. Further, the apparatus may transmit a control signal that indicates that the first transmission should be preempted by the second transmission. As described below, the control signal can be transmitted in a mini-slot that also carries the second transmission. Alternatively, the control signal may be transmitted in subsequent slot to the mini-slot that carries the second transmission.

In yet another embodiment, different CRC masks are used for CBs preceding or following the preempted time-frequency resources. When a TB consists of CBs similar to LTE, each CB may have a CRC check to determine success or failure of the CB. It is proposed herein, in accordance with an example embodiment, that the URLLC information be embedded in the CRC of the CB. For example, the CRC of one or more CBs preceding the CB or symbol being punctured by URLLC may be masked with a signature known a priori to the eMBB UE. If the eMBB UE detects a CRC failure, it will detect that CB with the masking signature. If it passes, it knows that the subsequent CB is punctured. Alternatively, one or more CBs following the punctured CBs may be masked with the signature indicating that the prior CB was punctured.

Turning now to indicating preempted resources explicitly to eMBB UE, in one embodiment, indication is through a Physical Preemption Indication channel (PPIC) in NR. For example, a PPIC may be designated to indicate the URLLC transmission and its resources to the eMBB UE. The PPIC is transmitted when there is a URLLC transmission over eMBB. In some cases, the PPIC will not be transmitted if there is no URLLC transmission. This way, in some examples, no resources are wasted if there is no URLLC transmission.

In an example, resources for the PPIC may be allocated in REs configured for the eMBB through standards or semi-statically through RRC or dynamically through its DCI making the DL eMBB grant. The location may correspond to N number of resources distributed through the eMBB's DL grant.

The PPIC resources may occur in one or more symbols per slot and each PPIC information may extend over one or more symbols. Each PPIC information may provide indication of one or more preemptive URLLC transmissions.

Figure 24:
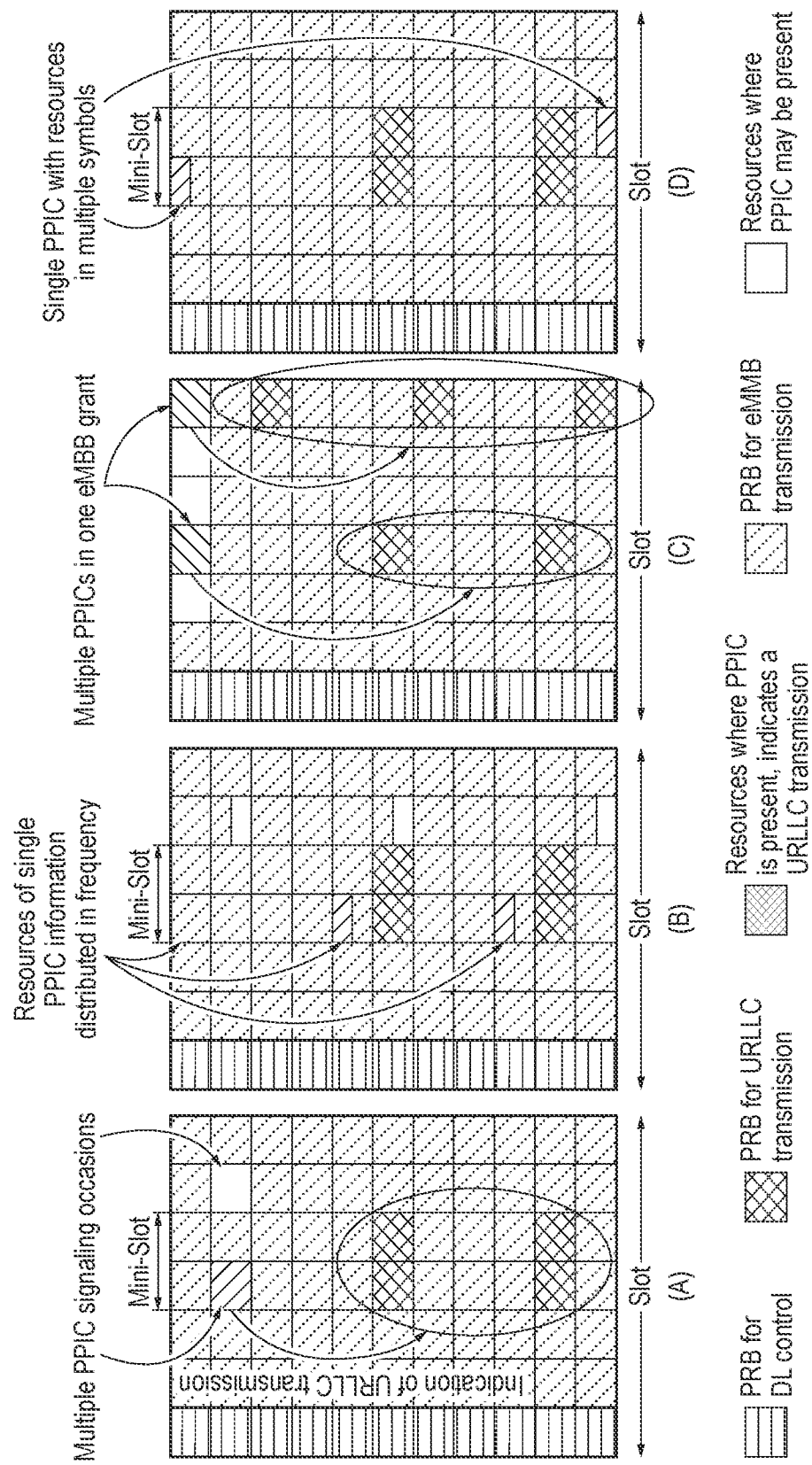
FIG. 24 shows examples of allocations of Physical Pre-emption Indication channel (PPIC) resources in different scenarios: (A) localized frequency resources, (B) distributed frequency resources, (C) multiple PPICs in a single eMBB DL grant, and (D) multi-symbol PPIC.

FIG. 24 shows examples of allocations of PPIC resources in different scenarios. FIGS. 24A and 24B show localized and distributed PPIC resources with one PPIC occasion actually carrying an indication of a URLLC transmission. The other PPIC resources are used for eMBB transmission. FIG. 24C shows an example where two PPICs are transmitted indicating two URLLC transmissions. FIG. 24D shows an example where a PPIC may have resources distributed across multiple symbols.

In some cases, the eMBB UE may look for the PPIC on occasions when the PPIC is expected. Upon detecting the PPIC, it recognizes the resources for the URLLC transmission. If it does not detect the PPIC, it continues to decode the payload as if it does not contain the PPIC and URLLC transmission.

The PPIC may contain one or more of the following information elements about the URLLC transmission, presented by way of example and without limitation:
  Symbol within a mini-slot/slot/subframe/frame
  RE within the eMBB's DL grant or within some specified bandwidth
  Numerology of the eMBB transmission
  Numerology of the URLLC transmission
  Reference signals for URLLC transmission
  Beam ID of the transmission
  Cell ID
  eMBB UE ID In some cases, the PPIC may use the same numerology as eMBB or have a numerology preconfigured through RRC or DCI of the eMBB grant. The modulation for PPIC may be specified in the spec or configured through RRC or DCI.

A CRC may be attached to PPIC information, and together they may be encoded with an error correction code. This CRC may be masked with eMBB UE ID-specific information.

In another embodiment, the presence and/or resources of the URLLC transmission may be indicated through control signaling. This can be done in multiple ways in accordance with various embodiments.

Figure 25:
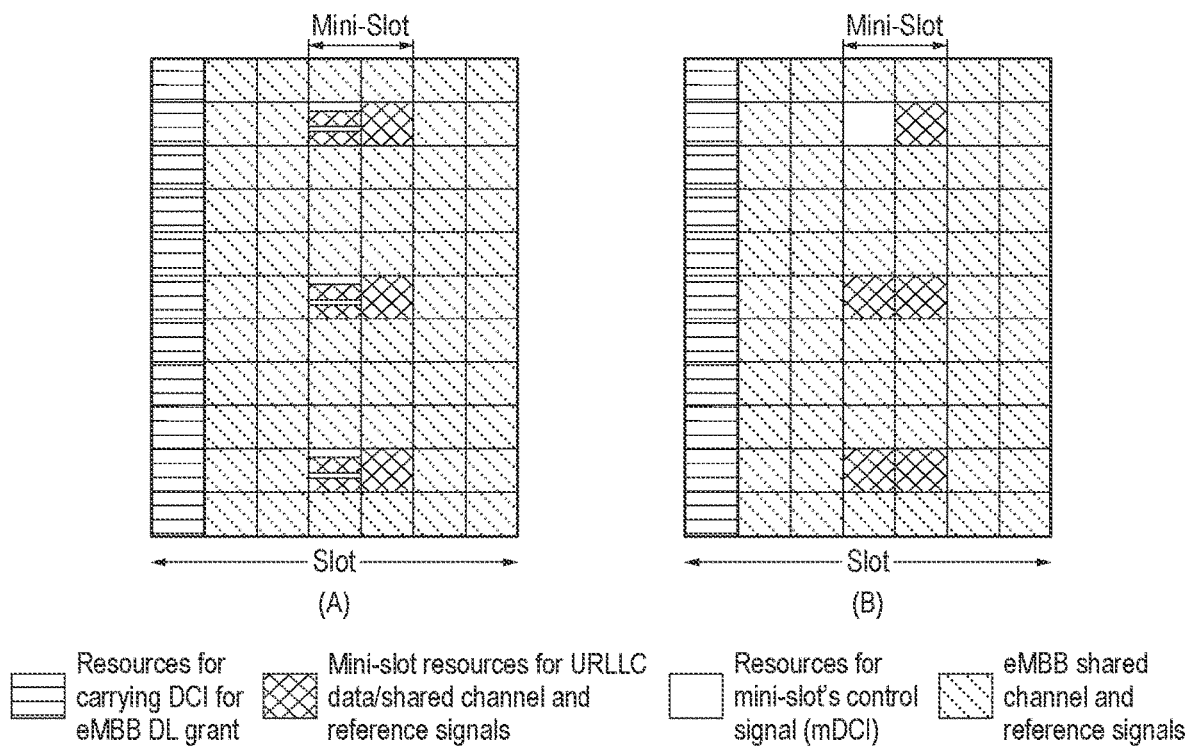
FIG. 25 depicts an example control region in a mini-slot to indicate URLLC transmission for (A) distributed resources and (B) localized resources.
Figure 26:
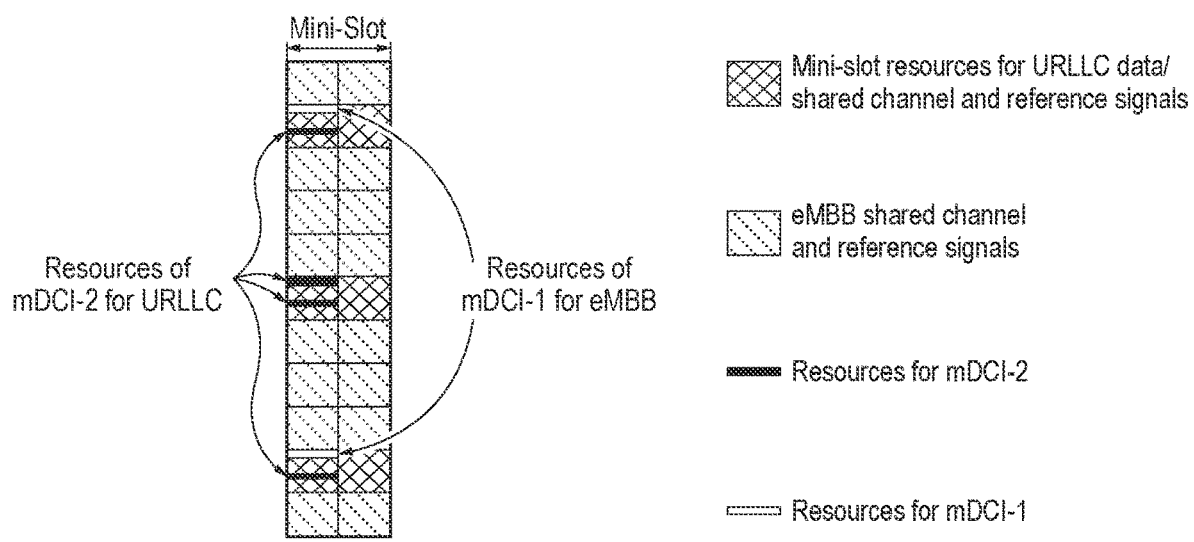
FIG. 26 depicts different mini-slot down link control information (DCI) formats for eMBB and URLL UEs to indicate the URLLC resources, in accordance with an example embodiment.

In one example, the control signaling region of the mini-slot carries the URLLC transmission. As shown in FIG. 25, the mini-slot carrying the URLLC transmission may have a control region that may indicate the presence and resources for the preemptive URLLC transmission. The DCIs carried in the mini-slots control region are referred to as mDCI. This control region's resources may be localized or distributed in frequency or time and may be multiplexed with URLLC data.

The eMBB UE may be configured through the standard or RRC or its DCI about the possible locations of the control regions for mini-slots and/or the mini-slots. So the eMBB UE may check this control information. In an example, if it finds valid control information, it recognizes the resources of the URLLC transmission. If it does not find any, for example, it may assume that no URLLC transmission is preempted on its DL grant.

The control region of the mini-slot may consist of multiple DCIs and the eMBB UE may have to blindly decode them to identify the DCI for the URLLC transmission. To minimize the number of blind decodes, the eMBB UE may be required to monitor certain mini-slot locations may be valid and mini-slots may not occur at high periodicity such as every symbol.

Figure 28:
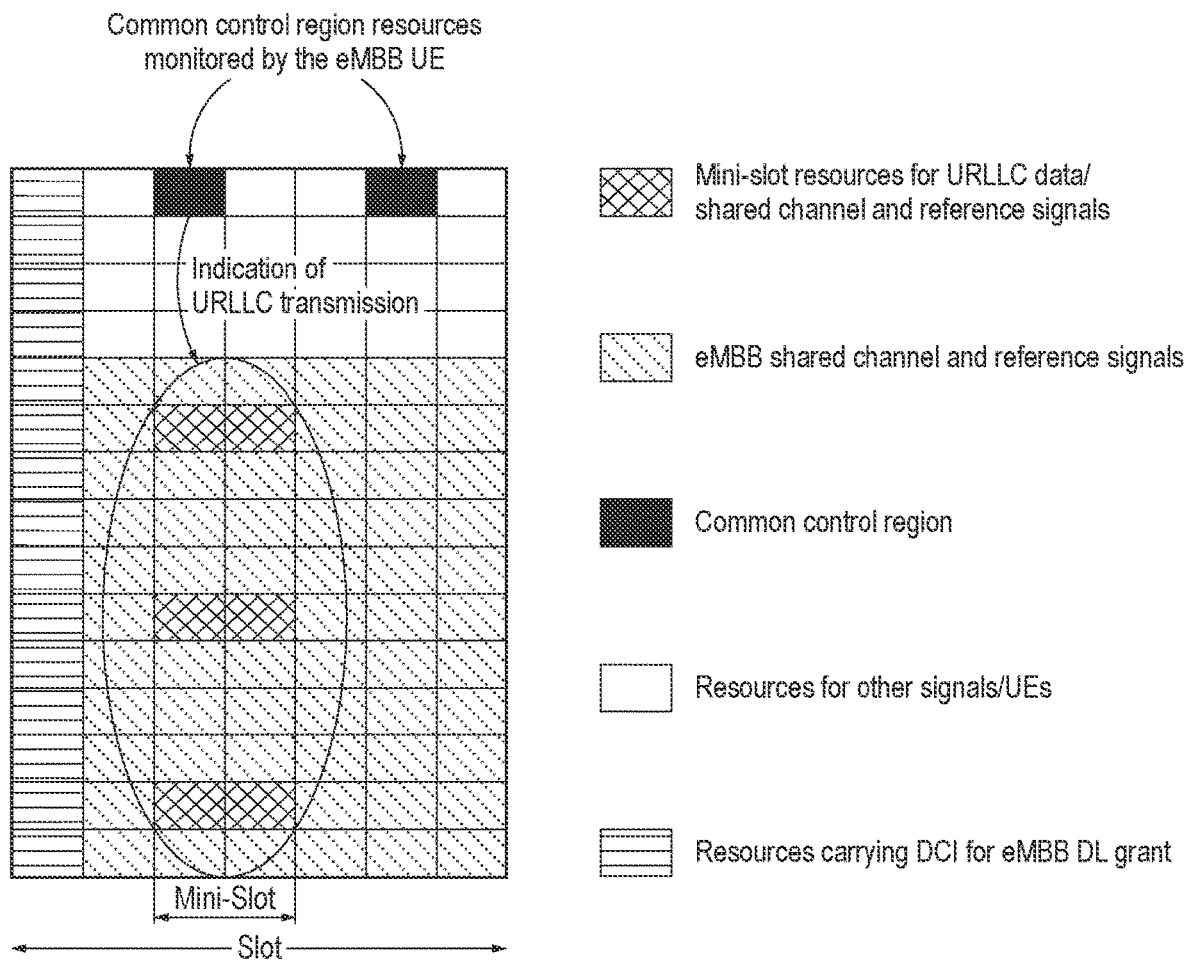
FIG. 28 shows a common control region indicating the preemptive URLLC transmission in accordance with an example embodiment.

An mDCI in the mini-slot may indicate to the eMBB UE the resources for the URLLC transmission. This DCI may have the CRC be masked by the Cell Radio Network Temporary Identifier (C-RNTI) of the eMBB UE. Another DCI in the mini-slot may indicate to the URLLC UE the presence of a transmission, its resources, and all parameters about that URLLC DL grant. The DCI may have the CRC masked by the C-RNTI of the URLLC UE. FIG. 28 shows an example where there are two mDCIs in a mini-slot: mDCI-1 is intended for the eMBB UE and indicates the resources for the URLLC transmission, and mDCI-2 is intended for the URLLC UE and indicates the signaling parameters and resources to receive the DL URLLC grant.

Figure 27:
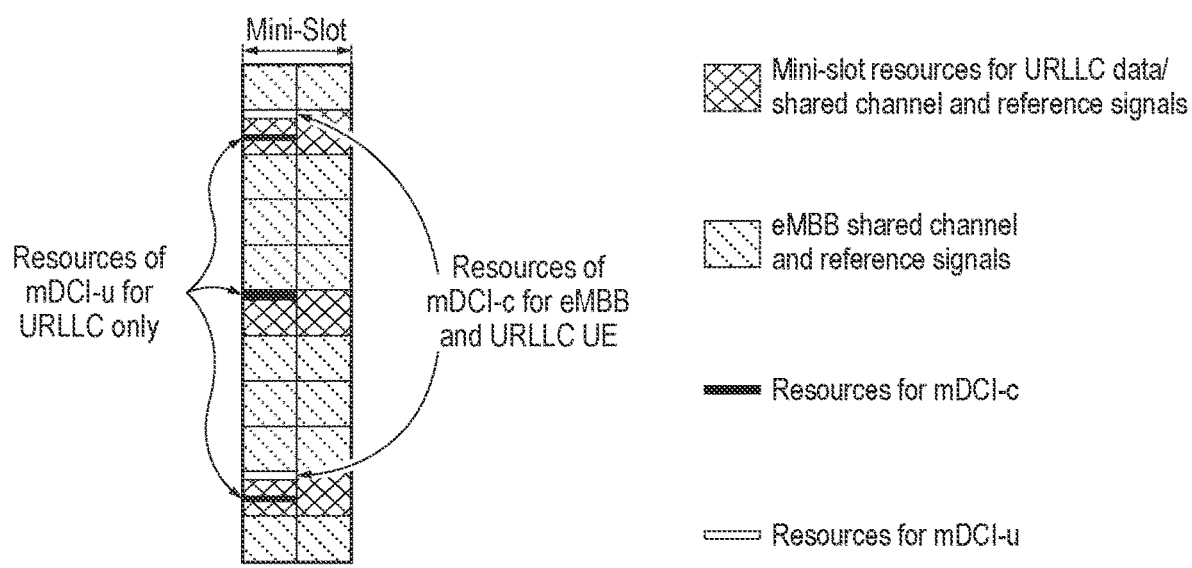
FIG. 27 shows a common mDCI format to indicate the location of the URLLC transmission in accordance with an example embodiment.

Alternatively, the control information may be encoded in a way that both the eMBB UE and the URLLC UE may be able to share some or all of the control information. For example, a portion of the URLLC control information indicating the resources for the URLLC transmission may be encoded separately with a signature that both the eMBB and URLLC can use to decode. For instance, the CRC of this information may be masked with a signature configured for both the eMBB and URLLC UEs. This signature may be configured through RRC for both eMBB and URLLC UEs. Alternatively, the signature may be configured for the eMBB UE through its DCI providing the DL grant and for the URLLC UE through the remaining part of the control information in the mini-slot. This remaining part of the DCI may also include other information specific to the URLLC transmission such as, for example and without limitation:
Modulation
Code rate
Numerology
Precoder information
Beam ID
Reference signals As shown in FIG. 27, an example mini-slot 2702 contains two mDCIs: a mDCI-c that is common to eMBB and URLLC UE and indicates the resources of the preemptive URLLC transmission, and a mDIC-u that is URLLC UE specific and provides other signaling information to URLLC UE concerning its DL grant.

In another example, a common control region may be designated in certain resources by NR. The eMBB UE may be configured to monitor one or more occasions of this common control region to look for a DCI indicating the URLLC transmission. Such a DCI may commonly indicate the resources for one or more URLLC transmissions. The eMBB UE will check to see if the indicated resources fall within in DL grant. If it finds URLLC resources within its grant, the eMBB UE may account for puncturing.

In yet another example, the control region of the mini-slot/slot/subframe may follow the URLLC transmission (e.g., see FIG. 28). Here the eMBB UE may receive a DCI in the next mini-slot or slot or subframe that the eMBB is configured to monitor. This control region may provide a DCI indicating the presence of the URLLC resources in the past transmission. The eMBB UE may use the information to appropriately decode the eMBB data assuming that it has appropriate buffering capabilities and can tolerate the increased latency.

Figure 29:
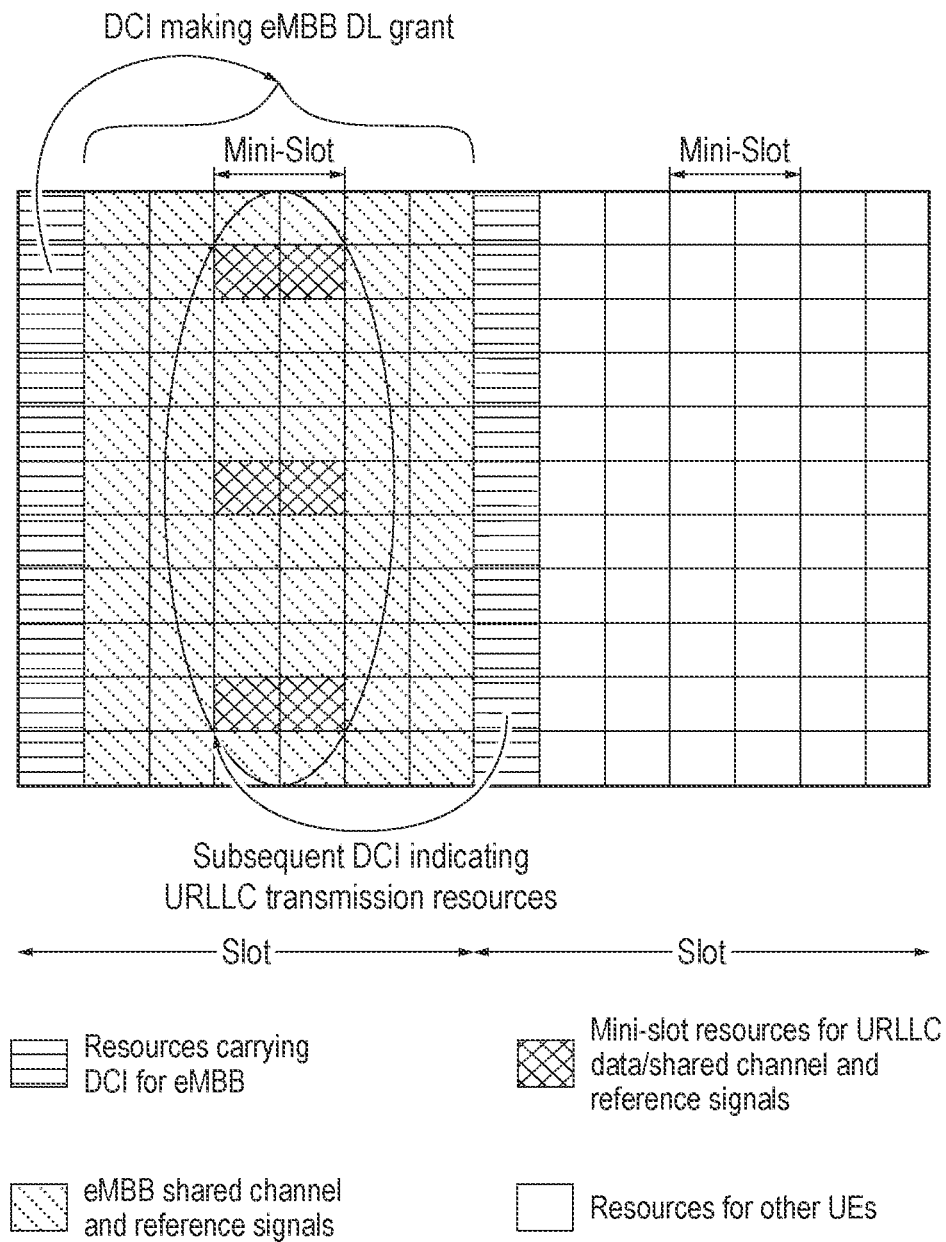
FIG. 29 shows an example URLLC indication in subsequent control regions in accordance with an example embodiment.

Referring generally to FIG. 29, knowledge of the preemptive URLLC transmission may be delayed in accordance with an example embodiment. For example, the eMBB UE may get knowledge of the preemptive URLLC transmission after the eMBB TB has been processed, i.e., the eMBB UE is unable to process the payload again with this knowledge alone, possibly because of latency considerations. In this case, HARQ retransmission is one example way to recover from the resource loss. The HARQ retransmission may include the resource locations of the URLLC transmission (in the original transmission) at a fine or coarse level (in terms of actual REs or RBs or CBs or symbols) so that the eMBB UE can discard the indicated portions prior to combining with the retransmission.

In an example case in which a retransmission is punctured by URLLC transmission, and knowledge is not available in time at the eMBB receiver, the recombined HARQ retransmissions may be corrupted. It is proposed herein that the NR-node either use timely information at least for retransmissions, or resend the information in a new HARQ process.

Figure 30:
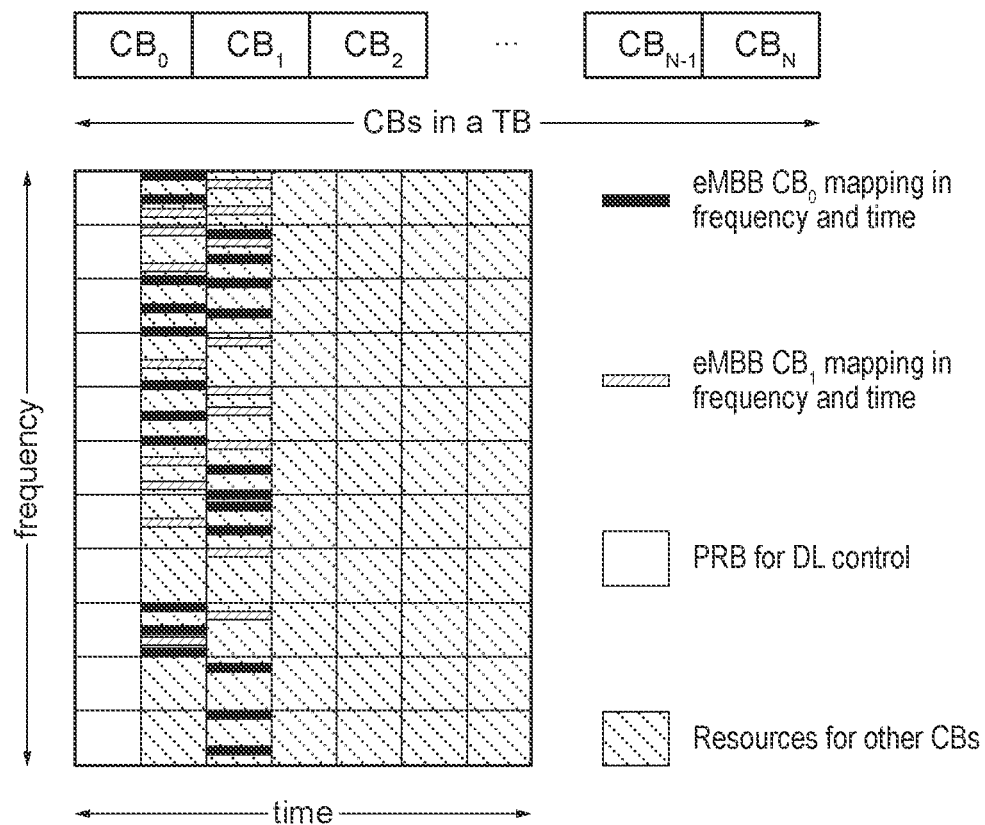
FIG. 30 shows an example of code bock (CB) mapping over multiple symbols of a resource grid.

Turning now to code block (CB) design for eMBB, in LTE, the CBs are mapped to the resource grid in a frequency-first manner so that the code blocks (CBs) can be decoded with minimal latency. For robustness to puncturing, in accordance with various example embodiments, the CBs in NR may be designed with the one of more of the following attributes, presented by way of example and without limitation. For example, CBs be mapped over more than one symbol. Frequency-first may be used. This ensures, for example, that if a symbol is punctured for URLLC, the loss of resources is spread across a large number of CBs. The concept is exemplified in FIG. 30, where the $CB_0$ and $CB_1$ of a transport block (TB) are mapped in two symbols. In an example, CBs may be contained within N number of symbols to keep the buffering and latency requirements acceptable. For example, N may be restricted to the length of a mini-slot, so that the impact of the puncturing affects only a limited set of CBs, i.e. the code-blocks that falls in the region of the mini-slot. If the amount of puncturing is significant, in some cases, this solution may ensure that at least some CBs may be decoded correctly.

Figure 31:
FIG. 31 depicts examples of a contiguous CB transmission.

In another example, after reserving the URLLC resources, the eMBB CBs may be mapped to the resource grid in a contiguous manner. For example, the CBs may be mapped in a continuous manner on the available resources. In some cases, any loss of resources results in truncating the tail end of the payload. This may ensure that certain critical information, such as the MAC CEs which are typically carried in the beginning of the eMBB payload, will have less likelihood of being punctured. FIG. 31 shows an example simplified illustration where an eMBB TB is made of CBs 0 through 5. The symbols of the CBs are denoted by $CB_{k,\ m}$ where k denotes the CB number and m denotes the symbol number within that CB. FIG. 31A shows the mapping of the CBs to the available resource grid for eMBB. FIG. 31B shows an example where two symbols are punctured for URLLC resources. In this example, $CB_2$ and $CB_3$ data are lost to the eMBB UE. FIG. 31C shows an example where $CB_2$ and $CB_3$ are mapped after the URLLC resources are reserved. In the example process there are no resources available for $CB_4$ and $CB_5$, which cannot be transmitted.

Turning now to MAC level recovery of affected eMBB information, in some cases, when the puncturing from URLLC is so severe that it prevents the eMBB UE from decoding the TB or CB successfully, the UE may rely on retransmission of the punctured data. Ordinarily the retransmission of the punctured data may occur through a HARQ retransmission. Here another embodiment is disclosed to recover the punctured information. Instead of a HARQ retransmission, the information bits corresponding to the punctured data may be transmitted in a new HARQ process and the MAC will take care of reassembling the information together. CBs that are punctured may be transmitted in this manner through a new HARQ process and rely on MAC layer reordering of data.

In accordance with an example embodiment, the URLLC transmission may be prescheduled or unscheduled. When unscheduled, it may be preemptively sent on eMBB resources and the solutions described above are applicable.

Figure 32:
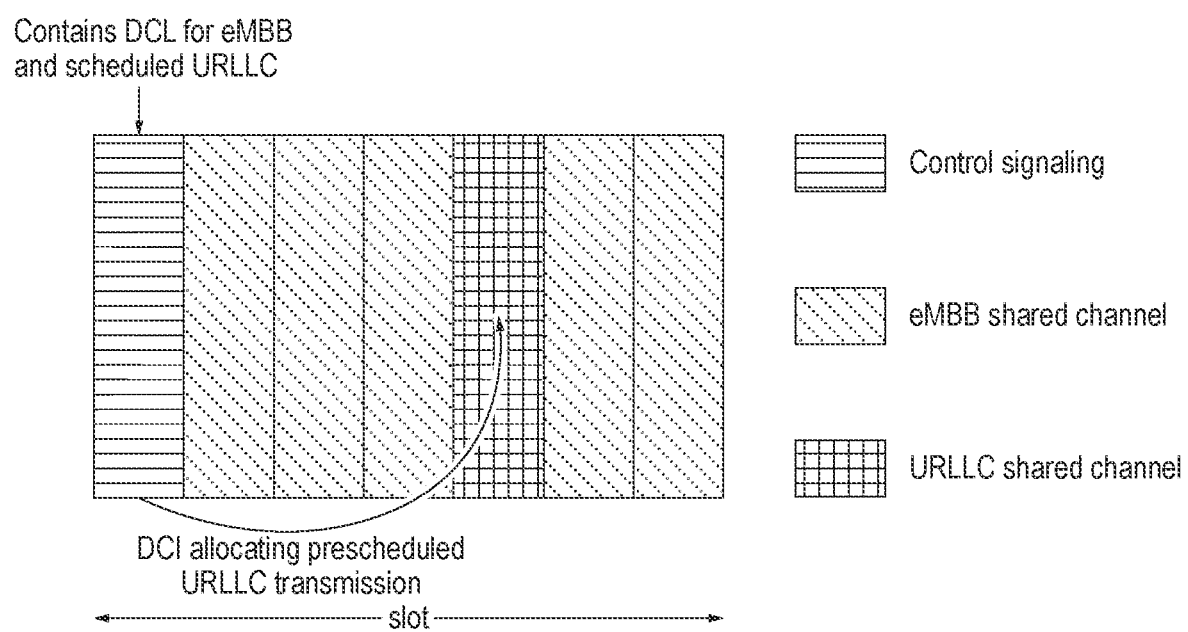
FIG. 32 shows an example of a prescheduled URLLC transmission that is indicated through DCI shared with an eMBB, in accordance with an example embodiment.

In some cases, the URLLC transmissions may also be prescheduled so that eMBB resources do not have to be punctured. For example, the DCI in the control signaling region of a slot/mini-slot may indicate the DL grants. In this case, the control signaling region may be shared by both eMBB and URLLC UEs and the URLLC UE may blindly decode to identify its DCI. FIG. 32 shows an example where the control region of a slot carries DCI for both eMBB and scheduled URLLC transmissions.

Figure 33:
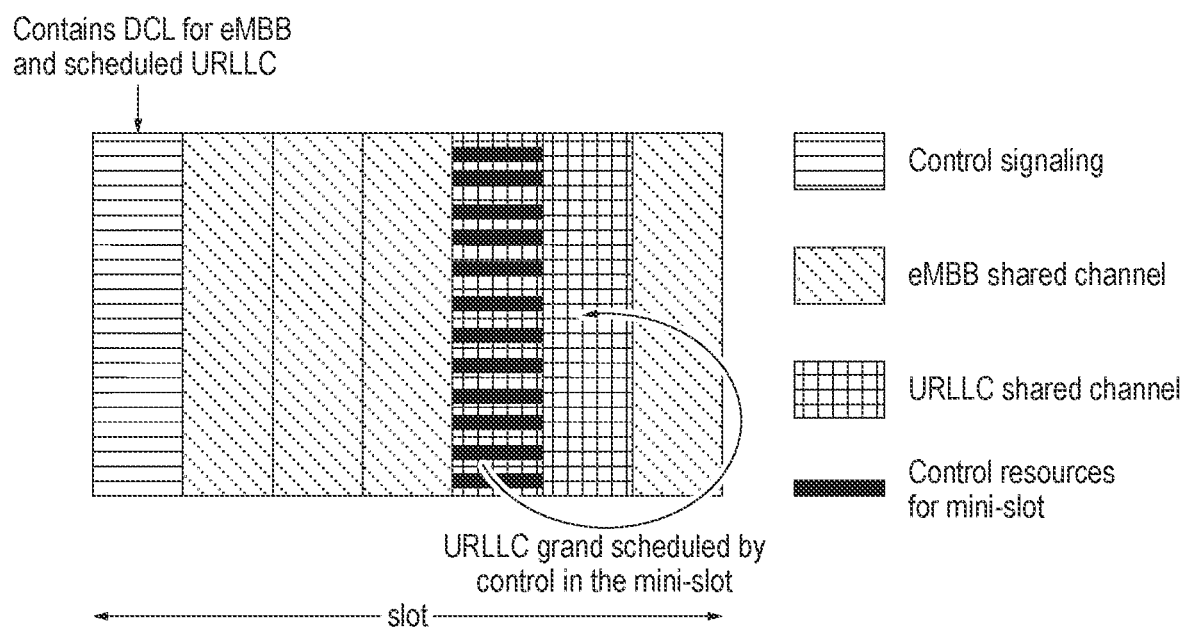
FIG. 33 shows an example of a URLLC scheduled via mini-slot according to an example embodiment.

In yet another embodiment, a mini-slot may schedule the URLLC DL grant. In an example, eMBB resources might not be punctured as they may terminate prior to the start of the mini-slot. Here, the URLLC UE may decode the control region of the mini-slot to identify its grant as exemplified in FIG. 33, where the mini-slot is configured to have two symbols and the control resources are multiplexed with data in the first symbol of the mini-slot. In an example, the URLLC UE is preconfigured through RRC to monitor certain mini-slot occasions. When the URLLC UE detects a DCI for it, it obtains the SL grant resources.

The control region of the mini-slot may have resources multiplexed between multiple URLLC UEs or eMBB UEs. In another example embodiment, semi-persistent configuration is provided to transmit URLLC, for example, for regular and high traffic use cases. In this case, the RRC signaling may set up a semi-persistent configuration indicating the resources and periodicity of reception, but the DCI may switch off or on the semi-persistent DL grants for the URLLC UE.

As used herein, group common PDCCH refers to a channel that carries information intended for a group of UEs. The group common PDCCH may provide various information to the UE, such as, for example: (i) Frame or slot structure (DL and UL portion, gap); (ii) Number of control signals; (iii) Starting location of data region; (iv) Numerology of one or more PHY channels; (v) Bandwidth of operation for the UEs in the group. (A given UE may be configured to function within a limited bandwidth for power savings and hardware efficiency. This bandwidth and its location may be indicated in the group-common PDCCH. This indication may be for the control signaling region or data region for DL and UL operation. This indication for the control region may limit the number of blind-decodes required to be performed by the UE); (vi) Structure of mini-slots if any are present (number of mini-slots, number of symbols in each); (vii) Paging indicator (indicates presence of a paging message and/or the resources where the list of UEs being paged is transmitted); and (viii) Paging message (list of UEs being paged).

The modulation for the group-common PDCCH may be defined, for example as QPSK, such that UEs do not require an explicit indication to demodulate it.

In some cases, multiple group-common PDCCHs may be signaled, wherein each PDCCH may be received by UEs configured with the corresponding 'group common RNTI' (gc-RNTI). A UE may have one or more gc-RNTIs configured. For example, a given UE may receive a paging message on one group common PDCCH and the slot structure on another PDCCH. gc-RNTIs may be shared by UE of a particular use case such as URLLC or by UEs corresponding to a particular beam.

Figure 34:
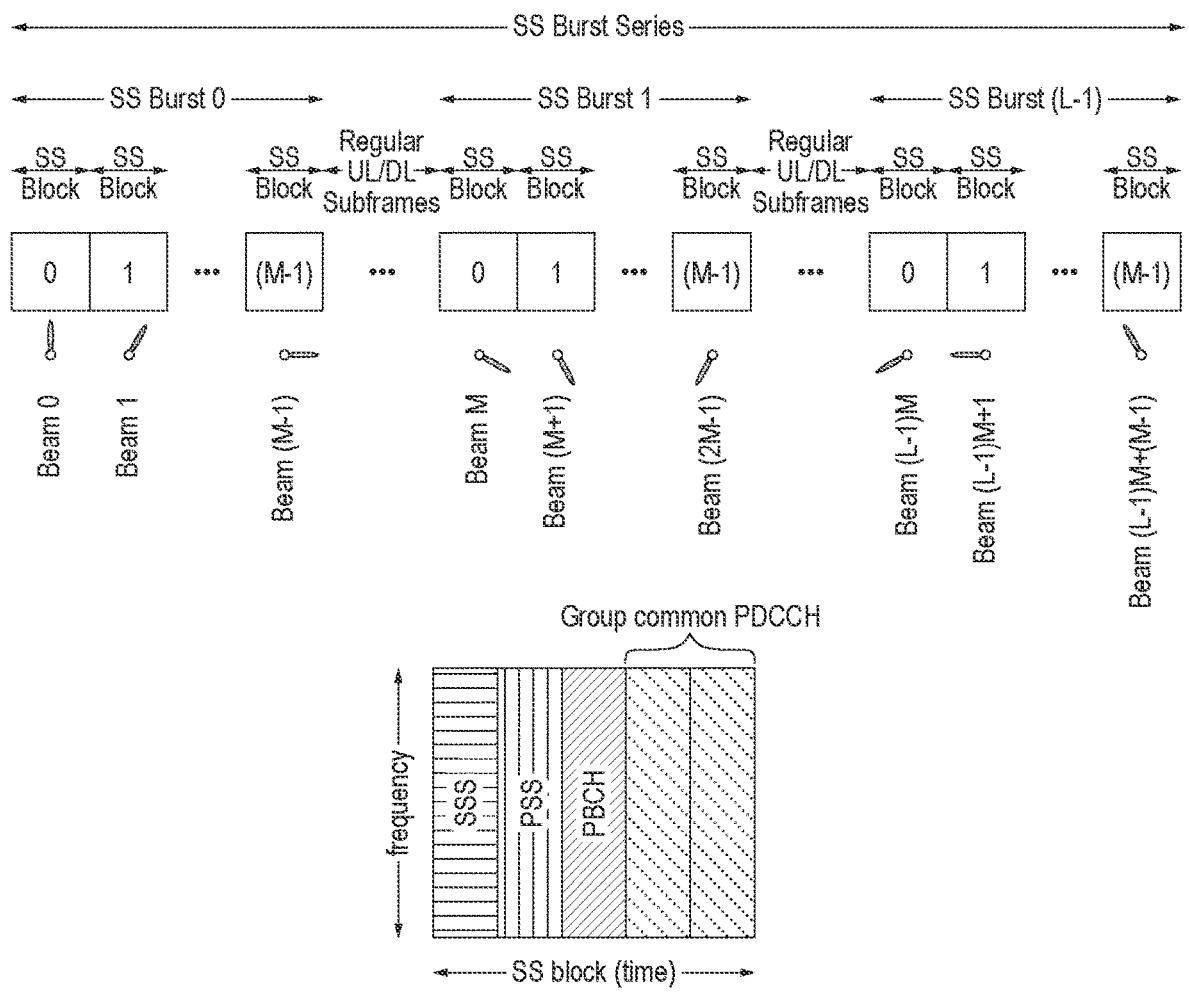
FIG. 34 illustrates an example of signaling the group common PDCCH through a SS burst according to an aspect of the application.

In some examples, the group common PDCCHs may be multiplexed in the available resources and the UEs may blindly decode them based on their gc-RNTIs. In an example, the group-common PDCCH may be allocated resources within the SS burst. As the beams sweep though the SS blocks, the beams may also sweep through the group common PDCCH. This example is shown in FIG. 34, where the SS burst contains SS blocks that are swept through different beams. The SS block contains resources for the group common PDCCH alongside resources for PSS, SSS, and PBCH.

Figure 35:
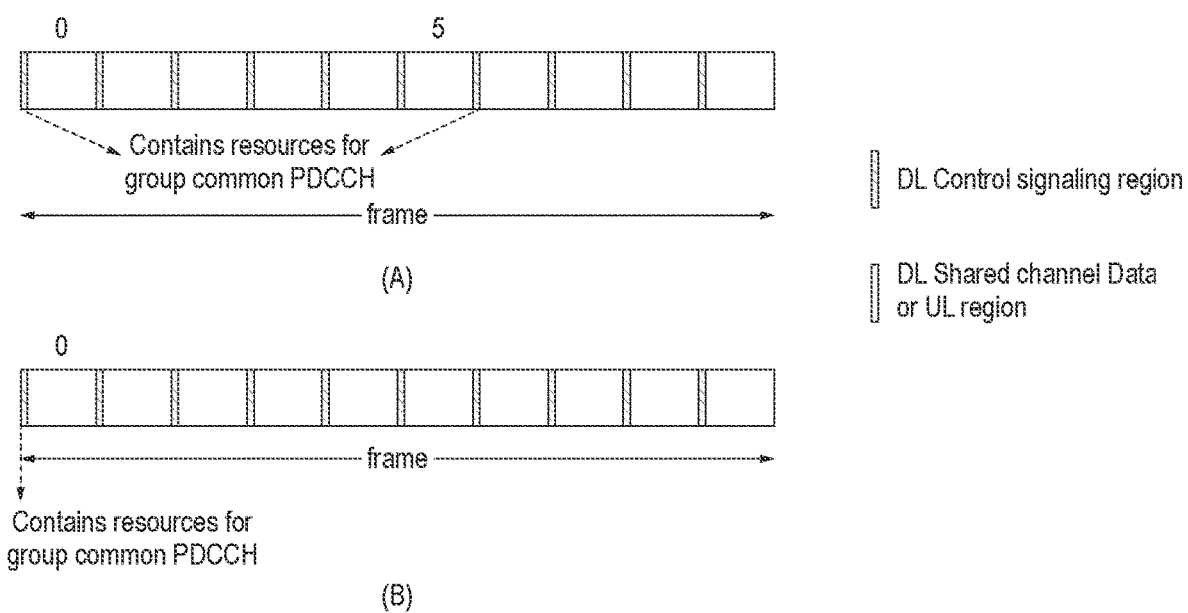
FIG. 35 illustrates an example of signaling the group common PDCCH via DCI according to an aspect of the application.

The group common PDCCH may also be assigned in resources designated for DL control signaling, and may occur at a certain periodicity within a frame. FIG. 35 shows examples where the group common PDCCH has resources in the 0th and 5th subframes of a frame (FIG. 35A), and where the group common PDCCH has resources only in the 0th subframe of the frame (FIG. 35B). The periodicity for the group common PDCCH may be specified/predetermined or may set up through the PBCH and semi statically updated. Furthermore, different beams may be used to signal the symbols carrying group common PDCCH. In an example, the NR-PBCH may indicate the presence of the group common PDDCH and the number and location of the resources for the group common PDCCH. In some cases, not all UEs are configured to receive a group-common PDCCH. In this case, for example, the relevant configuration information may be signaled in the common control search space or UE-specific search space.

Turning now to the physical uplink control channel (PUCCH), in some examples, resources for short duration PUCCH may be assigned anywhere within the available spectrum. Especially for UL using CP-OFDM waveform, as there is no constraint of using contiguous REs, the short PUCCH may have resources distributed in the spectrum.

Figure 36:
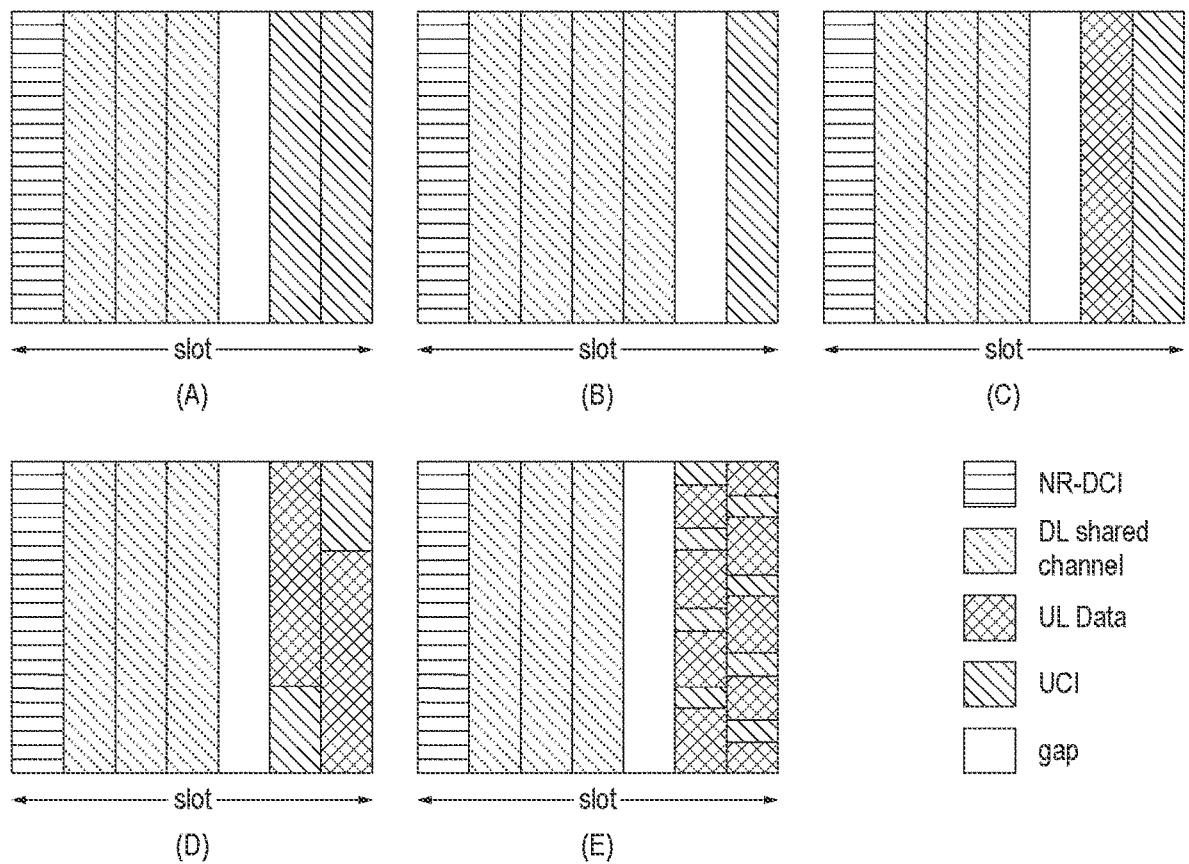
FIG. 36 illustrates an example short PUCCH resources allocation in a DL centric subframe according to an aspect of the application.

FIG. 36 shows different example ways of assigning resources for short PUCCH in a DL centric slot. Here the leading symbols carry resources for the DL. The UCI is sent on one (FIG. 36B) or two (FIG. 36A) of the UL symbols occurring at the end of the slot. The UCI may be multiplexed with data (FIG. 36C). The UCI may have frequency hopping between symbols (FIG. 36D). The UCI may give contiguous or dis-contiguous resources, for example, especially if deployed with CP-OFDM (FIG. 36E).

Figure 37:
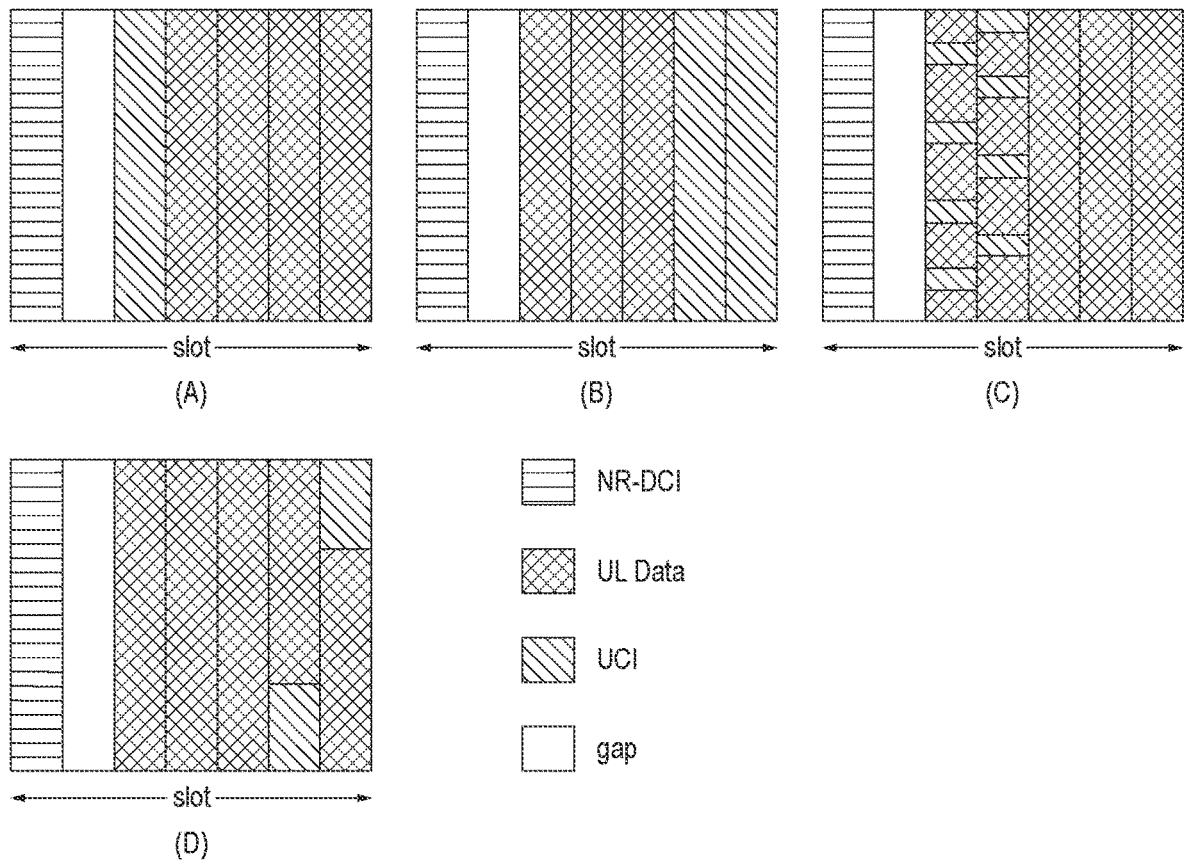
FIG. 37 illustrates an example short PUCCH resources allocation in a UL centric subframe according to an aspect of the application.
Figure 38:
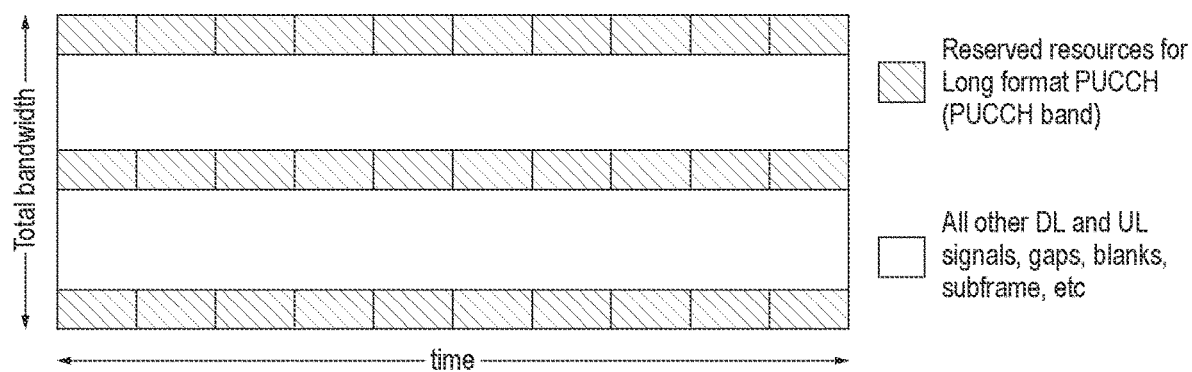
FIG. 38 illustrates example PUCCH bands with resources reserved for long PUCCH according to an aspect of the application.

FIG. 37 shows different ways of assigning resources for short PUCCH in a UL centric slot. In an example, one or two symbols may be used to carry the UCI and the resources may be present at the start of the UL signaling region (FIG. 37A) or at the end of the UL signaling region (FIG. 37B). The UCI resources may be discontinuous especially with CP-OFDM (FIG. 37C) or the resources may frequency hop between symbols (FIG. 37D).

In some examples, the DCI makes the DL grant implicitly or explicitly indicates resources for the short PUCCH. Also, within the UCI resources, one or more UEs may be code division multiplexed or time division multiplexed or frequency division multiplexed.

Turning now to PUCCH in Long Duration, in some examples, because long PUCCH is a good candidate for UEs that are UL power limited (e.g., those in the cell edge), long PUCCH may operate using DFT-s-OFDM. Resources may be reserved in specific frequency bands for long PUCCH similar to the resources at band edge for PUCCH in LTE. FIG. 37 shows an example of how resources may be reserved for long PUCCH in the spectrum. Here, 3 "PUCCH-bands" are reserved for long PUCCH signaling. A UE may be allocated resources from one of more of these PUCCH-bands and frequency hopping between the PUCCH-bands may be used across symbols/mini-slots or slots to improve frequency diversity. Depending on the maximum bandwidth that the UE can process, the NR-Node may configure a subset of adjacent PUCCH-bands for it to receive it long format PUCCH. This configuration may be done semi-statically through RRC or dynamically through DCI.

Figure 39:
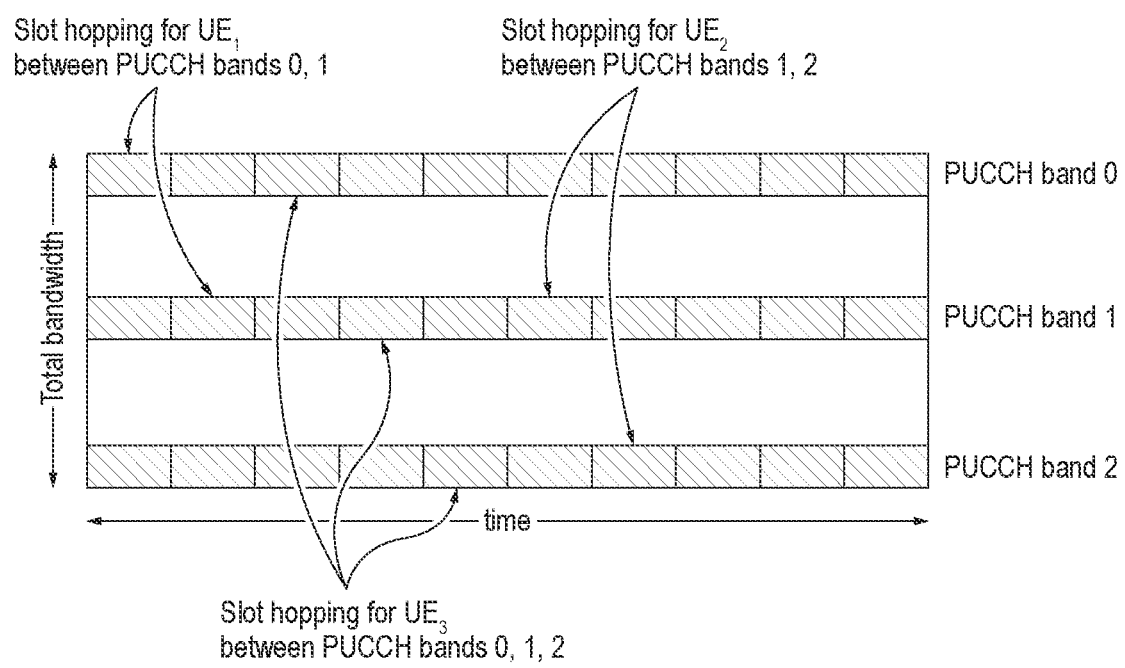
FIG. 39 illustrates an example PUCCH band selection for resource allocation for UEs according to an aspect of the application.

FIG. 39 shows an example of how the resources may hop for long PUCCH. In accordance with the example, different UEs are assigned resources on different PUCCH bands. UE1 operates on PUCCH bands 0 and 1 and hops between them. UE2 operates on PUCCH bands 1 and 2 and hops between them. UE3 operates on all the 3 PUCCH bands.

The hopping pattern may be tied to one or more of the following: (i) cell ID; (ii) beam ID of the associated DCI (making the grant or reserving the UCI resources); (iii) beam ID of the resources of the UCI; (iv) C-RNTI; and (v) Symbol/mini-slot/slot number in a subframe.

In some cases, a UE may be semi-statically configured to use short PUCCH or long PUCCH. In addition, a dynamic override may be provided for so that the short or long PUCCH configuration may be dynamically changed for the grants corresponding to that DCI.

Turning now to HARQ mechanisms, described herein is a multi-bit A/N scheme, wherein more than 1 bit of A/N is transmitted by the UE in response to reception of a TB. The TB may be composed of multiple CBs. Similar to LTE, the CBs may be encoded with a CRC. The UE may transmit A/N for one or more of the decoded CRCs within the TB.

Figure 40:
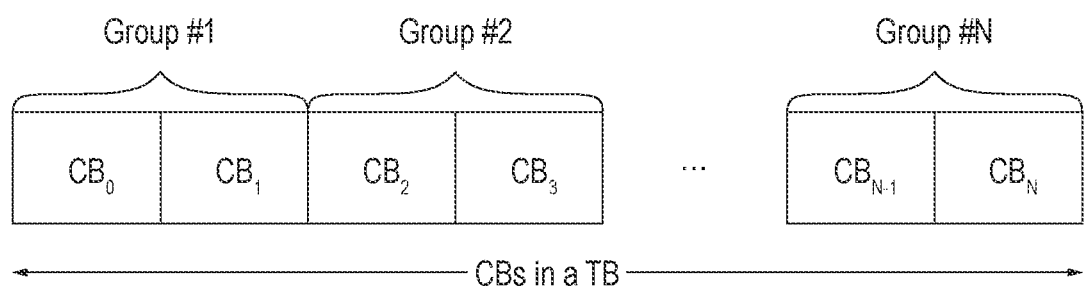
FIG. 40 illustrates an example (ACK/NACK) (A/N) bit allocation per group of CBs according to an aspect of the application.

FIG. 40 shows an example in which the CBs in a TB are grouped into multiple groups and one A/N bit is transmitted per group. For example, when URLLC is preemptively transmitted over eMBB, the eMBB UE may be configured to report multi-bit A/N. The multiple bits in this A/N report may consist of single-bit A/N response for each CB or a group of CBs that are impacted by the URLLC. An example is shown in FIG. 40 where a preemptive URLLC transmission punctures some REs of an eMBB UE in CB0, CB1, and CB2. In this case, the eMBB UE may be configured to report richer A/N by reporting in one of the following ways, presented by way of example: (i) A/N per CB of the TB; (ii) One A/N for TB, one A/N for the group {CB0, CB1 and CB2} of CBs; (iii) One A/N for TB, one A/N for each of CB0, CB1 and CB2; and (iv) One A/N for TB, one for group {CB1, CB2}, one for CB0 (a good configuration to choose if the impact of puncturing is very sever on CB0 and less severe on CB1 and CB2).

Figure 41:
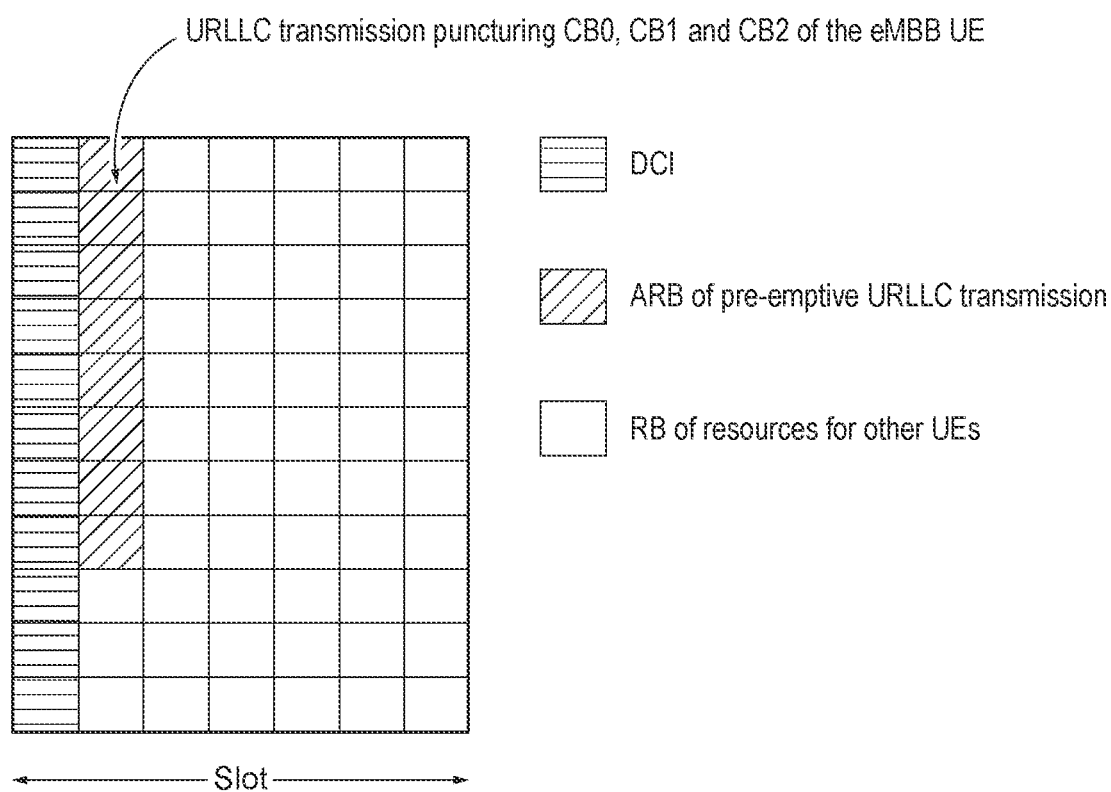
FIG. 41 illustrates an example of URLLC puncturing eMBB transmission according to an aspect of the application.

Referring now to FIG. 41, URLLC may puncture eMBB transmissions such that CB0, CB1, and CB2 of eMBB payload are affected. The number of A/N bits to transmit and information on how they may be CBs may be configured by the NR-Node, for example, depending on the traffic and use case. In some examples, the configuration may be made semi-statically or dynamically through a DCI. For example, the NR-PDCCH carrying information on the TB's HARQ process or A/N resource allocation may indicate the number of A/N bits per TB.

Figure 42:
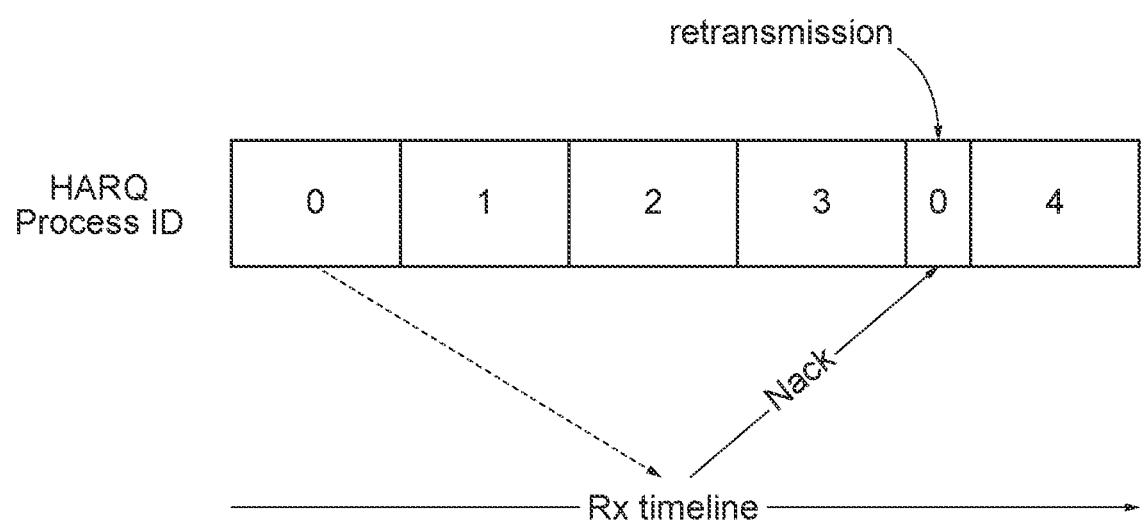
FIG. 42 illustrates an example hybrid automatic repeat request (HARQ) retransmission occurring on a transmission time interval (TTI) of a different numerology according to an aspect of the application.

It is recognized herein that the HARQ procedure may need to handle multiple numerologies and TTI lengths. In some examples, HARQ retransmission may occur in numerologies and TTI lengths different from the original transmission. FIG. 42 shows an example where the retransmission occurs on a shorter TTI of a different numerology. In some cases, different HARQ processes with different numerologies and TI lengths may be configured for a UE. An example use case for such a configuration is one where some HARQ processes cater to eMBB while some cater to URLLC for the same UE.

Turning now to packet duplication in NR-PDCP, in an example, a packet may be duplicated in the NR-PDCP and the copies may be transmitted over different carriers in the case of carrier aggregation. It is recognized herein that this may improve reliability for the UE. For example, the UE may receive multiple copies of that packet and keep the one that is error-free. If the UE fails to correctly decode all of the copies, in some cases, it may transmit A/N corresponding to all of the component carriers that served the packet or only a subset of them, for example, only on the primary component carrier. In accordance with an example, duplicate packets may also be transmitted via different beams coming from a single or different TRPs.

Turning now to UE capability indications, in some cases, the timing depends on the TB payload size (this determines the processing time, especially for channel estimator and LDPC decoder), use case (for example, URLLC requires very short interval), and the UE capability (for example, mMTC UEs may have slower processing capabilities). In an example, the UE is required to indicate its capability of minimum HARQ processing time to the NR-Node. The UE indicate its capability to NR-Node by signaling various information. For example, the information may include average time required to process TBs of sizes S1, S2, ... Sn, where n=>1 after reception of relevant data, reference and control signals. The time may be indicated as a metric from a pre-defined scale of numbers. The UE may be calibrated for such information and programmed with this information for different carrier frequencies and sampling frequencies. Maximum supported sampling frequency. The UE may indicate to the NR-Node the highest sampling frequency it can support. The indication itself may happen through UL RRC and may be semi-statically configured. For example, if the UE moves to a different carrier frequency band, it may reconfigure its capabilities for that frequency band.

When a UE powers up and connects to a cell for the first time, it may transmit its A/N by default at some specified latency with respect to a DL reception. Alternatively, the NR-Node may configure it to transmit it's A/N at a high but acceptable latency. Subsequently, the UE indicates its processing capabilities in an UL transmission after which the NR-Node may configure the A/N latency suitably in a dynamic or semi-static manner.

Another way to inform the NR-Node of the UE capabilities is at the time of performing a RACH procedure. The RACH resources may be partitioned into groups such that each group indicates a certain UE capability for A/N latency. The UE's choice of RACH resource indicates it capability to the NR-Node. Alternatively, the UE may piggyback a message with the PRACH to indicate its capabilities or include its capability information in the messaging of the RACH procedure.

Turning now to URLLC transmissions, the NR-DCI of URLLC UE may be designed in a compact manner so that with required aggregation level (code rate), the resource requirement for NR-PDCCH can be kept small, thereby also facilitating easier blind decoding. The HARQ information may be provided in a compact manner. The starting PRB location may be associated with the HARQ process ID and does not need explicit signaling. Information about the DMRS such as the code and resources may also be implicitly tied to some other information, such as the starting PRB number for example.

URLLC may be limited to support only a subset of modulations (for example QPSK only) to support high reliability. This may reduce or eliminate the need to signal the modulation type. In some cases, TPC commands are not sent as part of a grant allocation to a URLLC UE. The TPC commands may be transmitted separately to the URLLC UE on a different DCI format that might not necessarily conform to high reliability and low latency.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, anontransitory computer-readable or executable storage medium for storing computer-readable or executable instructions is disclosed. The medium may include one or more computer-executable instructions such as disclosed above in one of the plural call flows. The computer executable instructions may be stored in a memory and executed by a processor disclosed below in FIG. 47B, and employed in devices including UE, NR-Node, and TRP/RRH. In one embodiment, a computer-implemented UE having a non-transitory memory and processor operably coupled thereto, as described below in FIG. 47B is disclosed. The UE includes a non-transitory memory having instructions stored thereon for performing a beam recovery process. The UE also includes a processor, operably coupled to the non-transitory memory. The processor is configured to perform the instructions of providing a trigger for a serving beam to initiate the beam recovery process. The processor is also configured to perform the instructions of detecting an occurrence of the trigger for the serving beam. The processor is also configured to perform the instructions of performing a beam management protocol based on the detected occurrence of the trigger for the serving beam. Further, the processor is configured to perform the instructions of terminating the beam recovery process.

Turning now to beamforming training that can reduce the latency for the beamforming training processing time, described now is an example beamforming training sequence design, which can mitigate the interference from other TRPs or other beams from the same TRP. An example procedure to detect the desired beam and a new DoD estimation method are also described.

Figure 43:
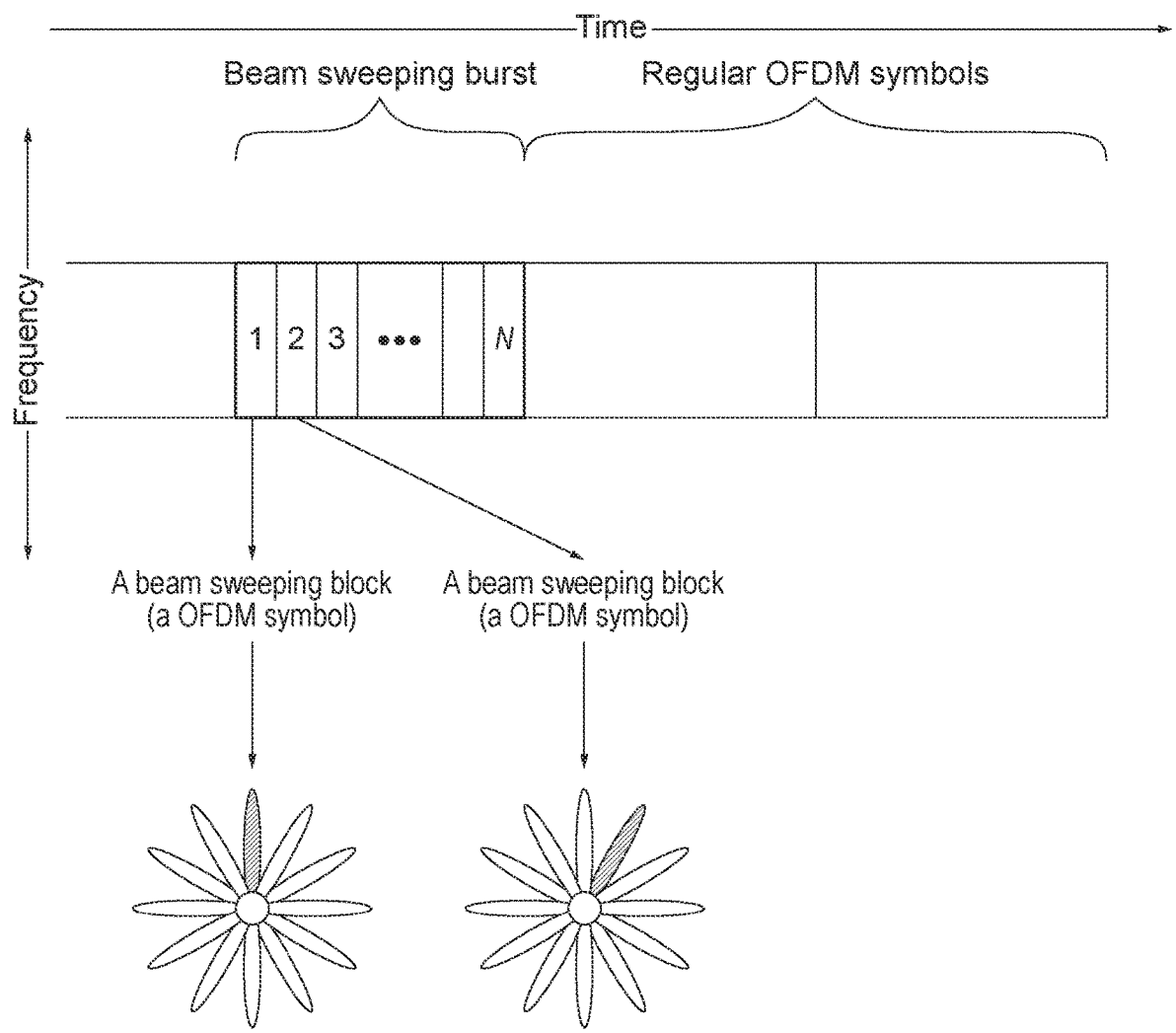
FIG. 43 depicts an example of beam sweeping burst and blocks in accordance with an example embodiment.

Consider a MIMO-OFDM beamforming system with K subcarriers, where the transmitter and receiver are equipped with $N_t$ transmit antennas and $N_r$ receive antennas, respectively. At the transmitter, a beamforming vector v is applied for a beam sweeping OFDM symbol, which is selected from a predesigned codebook. Here, we define a beam sweeping block can be treated as a unit of beam sweeping time unit for broadcasting beam training OFDM symbols. Each beam sweeping block may consist of one of multiple OFDM symbols. Multiple beaming blocks can form a beam sweeping burst. The length of a sweeping burst refers to the number of beam sweeping blocks in a beam sweeping burst, i.e., a beam sweeping burst length is equal to N then there are N sweeping blocks in a sweeping beam burst. In FIG. 43, an example of a sweeping burst is depicted. In this example, there are N=12 beam blocks in a beam sweeping burst and each beam block is equal to one OFDM symbol. At each beam sweeping block, it transmit a training beam pattern. Each training beam is associated with a unique training sequence. The Zadoff-Chu (ZC) training sequence is adopted as the beam training sequence. The ZC sequence has been widely used in LTE systems as DL synchronization sequence, UL random access channel, demodulation reference and sounding reference signal. There are several advantages to use ZC sequence as beam training sequences. For example, the ZC sequence has low PAPR property. Further, the ZC sequence with a same root but with different cyclic-shifts can form multiple orthogonal training sequences. In an example described herein, this kind of orthogonal property is adopted for mitigating other interfering training beams.

At the receiver, the received signal at the q-th receive antenna at the k-th subcarrier may be expressed as:

$$y_q(k) = H_q^{(0)}(k)v^{(0)}s_0(k) + \sum_{i=1}^{M} H_q^{(i)}(k)v^{(i)}s_i(k) + n_q(k),$$

where for i=0, 1 ... M, $H_q^{(i)}(k)$, $v^{(i)}$ and $s_i(k)$ are the $1 \times N_t$ channel vector at the k-th subcarrier between the i-th transmit and the q-th receive antenna at the receiver, the beamforming matrix of the i-th eNB, and the transmit symbol of the i-th transmit at the k-th subcarrier, respectively. Note that the interference could come from the same TRP using different beams. In practice, the maximum channel delay spread $L \le L_{cp}$, where $L_{cp}$ denotes the OFDM cyclic prefix length. Without losing the generality, we assume that $s_0(k)$ is the desired training sequence at subcarrier k and $s_i(k)$, i=1, 2, ..., M, are other interfering training beams. By collecting all subcarriers, the received signal in frequency domain can be obtained, $$y_q = \begin{bmatrix} y_q(0) \\ y_q(1) \\ \vdots \\ y_q(K-1) \end{bmatrix} = \sum_{i=0}^{M} \tilde{H}_q^{(i)} \cdot \begin{bmatrix} s_i(0) \\ s_i(1) \\ \vdots \\ s_i(K-1) \end{bmatrix} + \begin{bmatrix} n(0) \\ n(1) \\ \vdots \\ n(K-1) \end{bmatrix},$$

where $\tilde{H}_q^{(i)}$ is the diagonal matrix as follows, $$\tilde{H}_q^{(i)} = \begin{bmatrix} H_q^{(i)}(0)v^{(i)} & 0 & \cdots & 0 \\ 0 & H_q^{(i)}(1)v^{(i)} & \cdots & 0 \\ \vdots & \vdots & \ddots & \vdots \\ 0 & 0 & \cdots & H_q^{(i)}(K-1)v^{(i)} \end{bmatrix}$$

It can also be rewritten as $$y_q = S^{(0)}B_q^{(0)} + \sum_{i=1}^{M} S^{(i)}B_q^{(i)} + n_q, \tag{1}$$

where $$S^{(i)} = \begin{bmatrix} s_i(0) & 0 & \cdots & 0 \\ 0 & s^{(i)}(1) & \cdots & 0 \\ \vdots & \vdots & \ddots & \vdots \\ 0 & 0 & \cdots & s_i(K-1) \end{bmatrix}$$

$$B_q^{(i)} = \begin{bmatrix} H_q^{(i)}(0)v^{(i)} \\ H_q^{(i)}(1)v^{(i)} \\ \vdots \\ H_q^{(i)}(K-1)v^{(i)} \end{bmatrix} \text{ and } n = \begin{bmatrix} n(0) \\ n(1) \\ \vdots \\ n(K-1) \end{bmatrix}.$$

Let $H_{qp}^{(i)}$ be the frequency domain channel response between the p-th transmit antenna at the i-th eNB and the q-th receive antenna, $$H_{qp}^{(i)} = [H_{qp}^{(i)}(0) H_{qp}^{(i)}(1) \ldots H_{qp}^{(i)}(K-1)]^T.$$

With these notations, the channel vector $B_q^{(i)}$ can be rewritten as:

$$B_q^{(i)} = \begin{bmatrix} [H_{q1}^{(i)}(0) \ldots H_{qN_t}^{(i)}(0)]v \\ [H_{q1}^{(i)}(1) \ldots H_{qN_t}^{(i)}(1)]v \\ \vdots \\ [H_{q1}^{(i)}(K-1) \ldots H_{qN_t}^{(i)}(K-1)]v \end{bmatrix} = [H_{q1}^{(i)} \; H_{q2}^{(i)} \; \ldots \; H_{qN_t}^{(i)}] \cdot v. \quad (2)$$

The channel vector $H_{qp}^{(i)}$ can be derived from the time domain channel response between the p-th transmit antenna at the i-th eNB and the q-th receive antenna $h_{qp}^{(i)}$, $$H_{qp}^{(i)} = F h_{qp}^{(i)} \quad (3)$$

where F denotes the K×K DFT matrix and $h_{qp}^{(i)} = [h_{qp}^{(i)}(0) \ldots h_{qp}^{(i)}(L-1)\, 0 \ldots 0]^T$, where $h_{qp}^{(i)}$, i=0, ..., L−1, the time domain channel taps. By substituting (3) into (2), we have $$B_q^{(i)} = F[h_{q1}^{(i)} h_{q2}^{(i)} \ldots h_{qN_t}^{(i)}] v = F \hat{h}_q^{(i)}$$

where $\hat{h}_q^{(i)} = [h_{q1}^{(i)} \; h_{q2}^{(i)} \; \ldots \; h_{qN_t}^{(i)}] v$ is the time domain effective channel. By substituting the above equation into (1), we obtain the received frequency-domain signal vector at the q-th received antenna can be expressed as $$y_q = S^{(0)} F \hat{h}_q^{(0)} + \sum_{i=1}^{M} S^{(i)} F \hat{h}_q^{(i)} + n_q. \quad (4)$$

To distinguish the desired beam from the interference beams, in accordance with an example, a ZC sequence is applied to the reference signals as follows: $s^{(0)} = [s_0(0), s_0(1), \ldots, s_0(K-1)]^T$ is the K-length ZC sequence, and $s^{(i)}$ the cyclic shift sequence, $s^{(i)} = C_i s^{(0)}$, where $$C_i = \text{diag}\left(1, e^{2\pi j \frac{ic}{K}}, e^{2\pi j \frac{2ic}{K}}, \ldots, e^{2\pi j \frac{(K-1)ic}{K}}\right) \quad (40)$$

and c is the cyclic shift. Thus, the reference sequences of the adjacent beams are different cyclic shifted versions of the same ZC sequence. As shown below, the interference caused by those adjacent beams could be separated from the time domain signals.

By substituting the above equation to (4), we have:

$$y_q = S^{(0)} F \hat{h}_q^{(0)} + S^{(0)} \sum_{i=1}^{M} C_i F \hat{h}_q^{(i)} + n_q. \quad (5)$$

Note that $C_i F h_q^{(i)} = F \check{h}_q^{(i)}$ where $\check{h}_q^{(i)}$ is the cyclic shift of the original $\hat{h}_q^{(i)}$ by ic. Then we have $$y_q = S^{(0)} F \hat{h}_q^{(0)} + S^{(0)} \sum_{i=1}^{M} F \check{h}_q^{(i)} + n_q. \quad (6)$$

Let the matrix D be the inverse of $S^{(0)} F$, and then we have the time domain signals $$Z_q = D y_q = \hat{h}_q^{(0)} + \sum_{i=1}^{M} \check{h}_q^{(i)} + D n_q. \quad (7)$$

As long as the cyclic shift c is greater than the time spread L, the effective channel $$\hat{h}_q^{(0)} = \begin{bmatrix} h_{q1}^{(0)}(0) & \cdots & h_{qN_t}^{(0)}(0) \\ h_{q1}^{(0)}(1) & \cdots & h_{qN_t}^{(0)}(1) \\ \vdots & \vdots & \vdots \\ h_{q1}^{(0)}(L-1) & \cdots & h_{qN_t}^{(0)}(L-1) \\ 0 & \cdots & 0 \\ \vdots & \vdots & \vdots \\ 0 & \cdots & 0 \end{bmatrix} v.$$

can be estimated from the first L rows of $Z_q$ without affected by the interference. By reorganizing the entries of (7), we have $$x_l = \begin{bmatrix} z_1[l] \\ z_2[l] \\ \vdots \\ z_{N_r}[l] \end{bmatrix} = \begin{bmatrix} h_{11}^{(0)}(l) & h_{12}^{(0)}(l) & \cdots & h_{1N_t}^{(0)}(l) \\ h_{21}^{(0)}(l) & h_{22}^{(0)}(l) & \cdots & h_{2N_t}^{(0)}(l) \\ \vdots & \vdots & \vdots & \vdots \\ h_{N_r 1}^{(0)}(l) & h_{N_r 2}^{(0)}(l) & \cdots & h_{N_r N_t}^{(0)}(l) \end{bmatrix} v + \tilde{n}_l \quad (8)$$

for each path $l$, $l = 0, 1, \ldots, L-1$, i.e., $$x_l = H_l v + \tilde{n}_l.$$

The example beam detection method can be summarized using the following steps, in accordance with an example embodiment, though it will be understood that the list below is presented by way of example, and not by way of limitation:

1. For a transmitter, an ID is assigned to each beam, which determines not only a ZC sequence but also point to an index of the beamforming vector v selected from a predesigned codebook.
2. Training sequence design:
   a. For interference beams from other TRPs: In each beam sweeping block, the beam reference signals from different transmitters are based on a ZC sequence with a same root but with different cyclic-shifts: 0, c, 2c, ..., moduled by K, where c is greater than the maximum channel delay spread L and c=K/N, where N is an integer. The cyclic-shifts are assigned to each transmitter, and known by the receivers.
   b. For interference beams from the same TRP: In each beam sweeping block, multiple beams from the same TRP could be transmitted, whose training sequences are based on a ZC sequence with a same root but with different cyclic-shifts: 0, c, 2c, ..., moduled by K, where c is greater than the maximum channel delay spread L and c=K/N, where N is an integer. The adjacent beams should be assigned different cyclic shifts to mitigate the interference. For example, the beamforming codebook could use DFT beams with the size of 8. A ZC sequence of the length of 32 is chosen for the beam training sequence, and the cyclic-shift for the training sequence could be set to c=8. The beams could be assigned cyclic-shifts clockwise or counter clockwise by 0, c, 2c, ..., moduled by K. Then the adjacent beams have different cyclic-shifts, which may guarantee that the interference could be canceled. The beams assigned the same cyclic-shift are separated by a large angle, so that the interference could be ignored.

3. For each beam sweeping block, from the time domain received signals, the receiver obtains the frequency domain signal $y_q$;
4. For each possible reference signal sequence, multiply each subcarrier of $y_q$ by the inverse of the reference signal, and then apply the IFFT to obtain the time domain signal $Z_q$;
5. Select the first L rows of $Z_q$ to cancel the interference from other transmitters and calculate the energy $$\sum_{l=0}^{L-1} |Z_q[l]|^2 \qquad [9]$$

6. Repeat Step 4 and 5 for all possible reference signal sequences, and find the reference signal sequence with the maximum energy (9). Obtain the beam ID from the detected reference signal sequence as the beam ID for the current beam sweeping block.
7. Repeat Step 3 to 6 for all beam sweeping blocks, and find the two beam sweeping blocks with the largest and the second largest energy (9).
8. Obtain the best Q beamforming vectors, for example, Q=2, $v_1$, $v_2$ from the associated beam IDs of beam sweeping blocks.

Once the best two training beams are identified, it can proceed to estimate the DoA and DoD of the channel. Here, it is assumed that the channel at the l-th tap, l=1, ..., L can be expressed as $$H_l = \alpha_l a_{r,l} a_{t,l}^H, \qquad (10)$$

where $a_{r,l} = [1 \; e^{j2\pi\theta_l} \; e^{j2\pi 2\theta_l} \; \ldots \; e^{j2\pi(N_r-1)\theta_l}]^T$, $a_{t,l} = [1 \; e^{j2\pi\varphi_l} \; e^{j2\pi 2\varphi_l} \; \ldots \; e^{j2\pi(N_t-1)\varphi_l}]^T$ and $\alpha_l \in \mathbb{C}$ is the channel complex gain. The $\varphi_l$ and $\theta_l$ denotes the channel of angel of departure and angle of arrival, respectively. From Eq. (8) and Eq. (10), the Eq. (8) can be rewritten as $$x_l = \alpha_l a_{r,l} a_{t,l}^H v + \widetilde{n}_l. \qquad (11)$$

Furthermore, the Eq. (11) can be expressed as $$x_l = \alpha_l (v^T \otimes I_{N_r}) \text{vec}(a_{r,l} a_{t,l}^H) + \text{vec}(\widetilde{n}_l,), \qquad (12)$$

where $\otimes$ denotes the kronecker product matrix operator, $I_{N_r}$ is the identity matrix with size of $N_r$ and $\text{vec}(\cdot)$ is the matrix to vector operation. The estimation of the DoD (i.e., $\varphi_l$) of the channel can be expressed as $$\min_d |d|_1, \text{ subject to} \qquad (13)$$

$$\sum_{i=1}^{2} \left\| (v_i^T \otimes I_{N_r}) A d - x_l \right\|_2^2 \leq \varepsilon,$$

where $v_1$ and $v_2$ are the beamforming vectors obtained from the Step 8 and the dictionary matrix A is formed by the following method:

$$A = [a_1 a_2 \ldots a_{N_\varphi N_\theta}],$$

where $$a_i = a_{(\alpha-1)N_\varphi+\beta} = (b((\alpha\Delta\varphi))^* \otimes c(\beta\Delta\theta), \qquad (14)$$

where $N_\varphi$ is the dictionary length and $\Delta\varphi$ is the resolution for DoD; $N_\theta$ is the dictionary length and $\Delta\theta$ is the resolution for DoA, respectively.

$$b(\vartheta) = [1 e^{j2\pi\vartheta} \ldots e^{j2\pi(N_t-1)\vartheta}]^T$$

$$c(\vartheta) = [1 e^{j2\pi\vartheta} \ldots e^{j2\pi(N_r-1)\vartheta}]^T. \qquad (15)$$

Since the solution $d \in \mathbb{C}^{N_\varphi N_\theta \times 1}$ is a sparse solution in matrix A, this kind of solution for Eq. (13) can use least absolute shrinkage and selection method (also call LASSO method) to solve it. Once it obtains the DoD of the channel then the DoD can be used as feedback for transmitter to use.

9. The detected best Q beam IDs with or without estimated DoD can be used for feedback to the transmitter. The transmitter can use the estimated DoD for beam refinement without using beam sweeping method for beam refinement.

Turning now to examples for Beam Management, multiple beams may be used to provide a relatively large cell coverage area. Due to UE mobility, beam quality and/or availability between a UE and the network may change frequently, even when the UE rotates a little bit. Beam tracking and switching mechanisms are typically applied to select and re-select proper beams (e.g., beams with adequate quality, such as with RSRP or RSRQ above certain threshold) among a set of available beams, so that the link connection between UE and network can be maintained. However, in some cases of sudden beam quality drop, those regular beam tracking and switching mechanisms are not enough. For example, beam quality degrades fast for fast moving UE, and there are no enough time budgets to perform beam switching. Or network may not schedule enough resources to perform beam switching and re-alignment. Or sudden changes happen in radio environments, such as moving obstacles caused beam blockage.

Without proper beam recovery mechanisms, if the aforementioned sudden beam quality drop persists, radio link failure (RLF) as in legacy LTE networks may be declared When RLF is declared, the UE may perform connection re-establishment and cell selection may be initiated, which can cause a significant amount of network signaling, latency, connection interruptions, and power consumption. In addition, in HF-NR, degraded beam quality may rebound back soon, or/and there may be other easy alternative beams available. Therefore, declarations of RLF might not be necessary and should be minimized, in some cases.

Based on these considerations, among others, in some cases, beam recover processes should perform after and when regular beam tracking and switching processes are not able to maintain link connection, but before RLF is declared. If the beam recover process fails anyway (e.g., no alternative beams to recover link connections), RLF may have to be declared at the end. An example of this is illustrated in FIG. 44, which uses the LTE RLF as a baseline.

Figure 44:
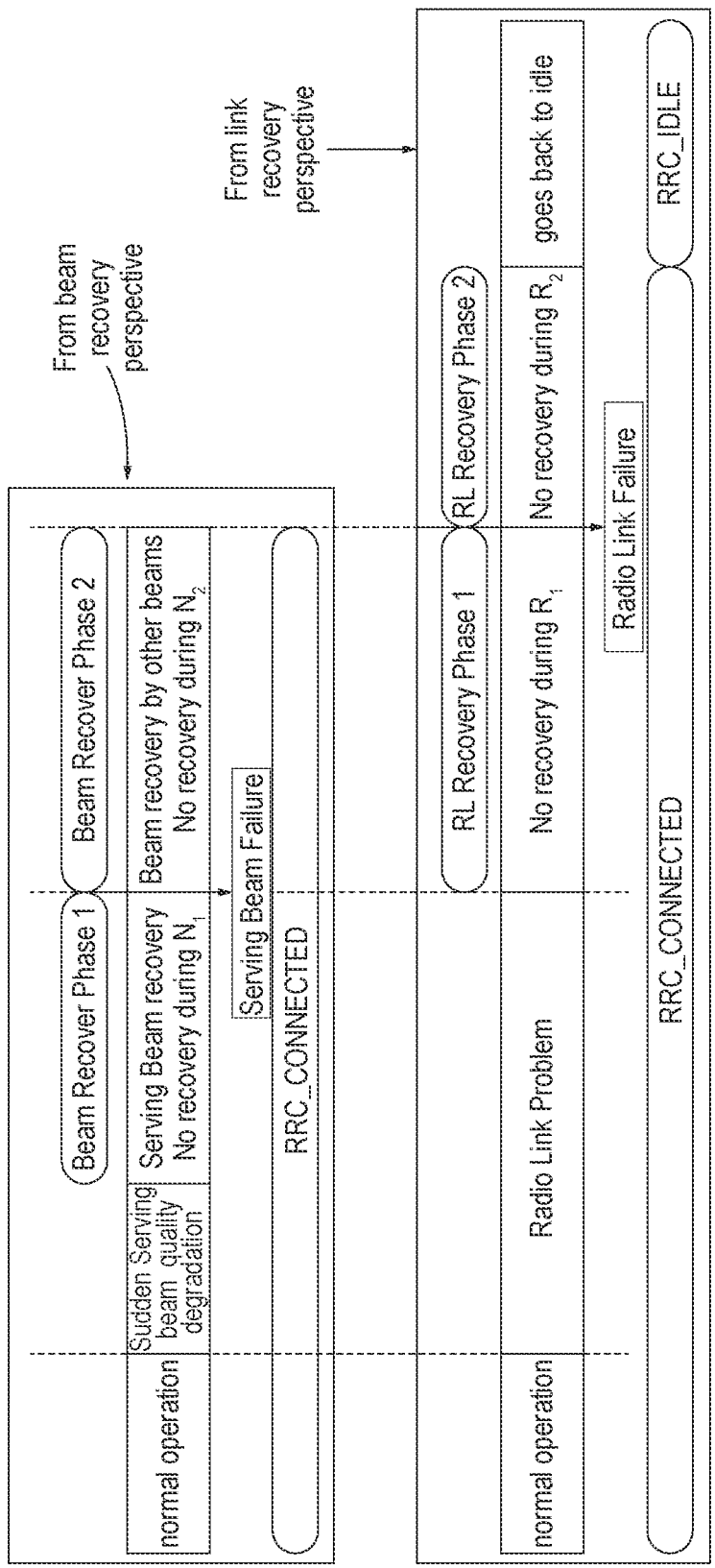
FIG. 44 illustrates beam recovery and radio link failure (RLF) at high frequency for new radio (HF-NR) according to an aspect of the application.

Referring now to FIG. 44, an example is shown from the beam recovery perspective, and an example is shown from the link recovery perspective. In beam recovery, when serving beam quality degradation is detected (e.g., out of sync, misalignment indication), lower layers (e.g., PHY or/and MAC) of the UE may keep monitoring the serving beam (e.g., expecting the signal quality would rebound) or/and perform corresponding beam management procedures (e.g., refine the alignment of the serving beams, such as adjust the precoding matrix, beamforming weights, etc.). If the serving beam(s) is/are successfully recovered within the phase 1, beam recovery process may terminate and the UE may go back to normal operation. Otherwise, the process may report that a serving beam failure is detected, and may go to phase 2. The value of N1 may be based on timer or other (e.g. counting) criteria. In beam recovery phase 2, in an example, the UE evaluates and switches to other candidates beams, if necessary. Note that each candidate beam may have a radio quality (e.g., SNR, RSRP, RSRQ, RSSI) that is above a preconfigured or dynamically configured absolute or relative (to the serving beam) threshold. If alternative beam(s) is/are successfully found and switched to be new serving beam(s), beam recovery process terminates and UE goes back to normal operation. Otherwise, beam recovery also terminates but radio link failure is declared, and UE enters RL recovery phase 2.

From the link recovery perspective, the failure of beam recovery phase 1 may trigger the start of RL recovery phase 1. Typically, the duration of beam recovery phase 2 and RL recovery phase 1 are timely aligned, but it may not be always the case. This is because the two processes may be running in parallel. Before the termination of beam recover phase 2, link recovery phase may start evaluating other cells so that UE can perform cell reselection immediately once beam recovery phase 2 is finished.

In summary, when a sudden serving beam quality drop is detected, in some examples, the beam recovery process is initiated first. If beam recovery fails even after the timer or other (e.g., counting) criteria (N1 and N2), in an example, radio link failure is declared and the second phase of link recovery starts. The behaviors in the second phase are the same as LTE in some cases. It is recognized herein that, in multi-beam based NR networks, a UE may under coverage of multiple beams from the same or different TRPs/cells. When there exists alternative beam(s) for communication, the link connection between UE and network may be quickly restored via beam recovery procedure, without going through the costly RLF declarations and unnecessary RRC connection re-establishments.

Proposed beam recovery mechanisms for downlink beam management are discussed in further detail below. In order to adapt to fast channel/beam variances, UE initiated beam recovery actions are considered, where the UE behaviors (e.g., beam quality measurements, beam recovery triggers) may be configured by the network via explicit signaling. Network initiated beam recovery is also possible (especially in the case of uplink based beam management).

For beam measurements, idle mode or connected mode UE may use same or different synchronization signals (SS), where the periodicity of idle mode SS is assumed to be known but connected mode SS can be dependent on configuration. Extra reference signals, such as specific mobility reference signals (MRS) and UE specific CIS-RS, may be available as well.

Measurements in beam recovery process serve various purposes. An example purpose is to serve beam quality monitoring and evaluation. This procedure may be used to detect serving beam quality degradation promptly. For different UE use cases and service requirements, the frequency of performing this procedure might need to be flexible and configurable to reach a balance between the latency and power consumption. This procedure may also be used in the beam recovery phase 1, so that the alignment of serving beam(s) may be properly refined, e.g. adjust the precoding matrix, beamforming weights, etc. In addition, in case serving beam quality becomes good enough again (e.g., RSRP value is above certain threshold), the beam recovery process may need to be terminated based on the measurement results of this procedure. For example, in some cases, moving obstacles appear and then disappear.

Another example purpose is for other candidate beams measurements and evaluation. In order to perform beam recovery, the UE may need to replace the degraded serving beams with alternative beams with good quality, and the measurement based evaluation of candidate beams may be necessary. This procedure may be performed in beam recovery phase 2.

In some examples, the list of candidate beams may be saved from previous measurements and may be statically preconfigured or dynamically reconfigured by the network. The list of candidate beams may be provided by PHY/MAC layer for fast access, or provided by RRC layer from online measurements or explicitly signaled by the network. If qualified beams are identified from the measurements and evaluation process applied on the candidate beams, regular beam switching and alignment procedures are performed and the recovery process terminates. Otherwise, if alternative beams are not identified or switched/aligned within a predefined time budget (e.g., N2 in FIG. 11), beam recovery is failed and radio link failure is declared to trigger the start of RL recovery phase 2, which is LTE like RLF recovery phase 2.

In one embodiment, conditions to trigger beam recovery process are defined. For this definition, the following exemplary conditions and related thresholds are included. The first is trigger events and related thresholds: (i) Serving beam(s) misalignment detected, out-of-sync detected; (ii) Quality of serving beam(s) below certain threshold, e.g., RSRP, SNR, RSRQ, RSSI; (iii) Moving averaged or/and weighted averaged quality of N-best candidate beams is above or below certain threshold; (iv) Expected messages (signals or data) not received, or received with low SNR; (v) Random access problem in MAC; and (vi) New detected beams have quality threshold value better than the serving beam(s).

As explained above, in one embodiment, only the downlink case for Network configured and UE initiated beam recovery was considered. Here, the UE is configured with the triggers defined above. This configuration can be statically preconfigured or dynamically reconfigured via RRC signaling or/and MAC control element. For different phases shown in FIG. 11, corresponding measurements can be performed as defined above to facilitate the triggering, transitions and terminations of different phases. There can be two phases of the beam recovery process. The first example phase is represented by beam recovery phase 1 as in FIG. 44.

In this first phase, lower layers (e.g., PHY or/and MAC) of UE will keep monitoring the serving beam (e.g., expecting the signal quality would rebound back) or/and perform corresponding beam management procedures (e.g., refine the alignment of the serving beams, such as adjust the precoding matrix, beamforming weights, etc.). If the serving beam(s) is/are successfully recovers within the phase 1, beam recovery process terminates and UE goes back to normal operation. Otherwise, the process reports that serving beam failure detected and goes to phase 2. The duration of this phase 1 is governed by the value of N1, which is based on timer or other (e.g. counting consecutive out-of-sync conditions) criteria. The information of N1 may be obtained from system information, or reconfigured by the network via explicit RRC or MAC CE signals, or preconfigured by manufacturers or operators.

The second example phase is represented by beam recovery phase 2 in FIG. 44. Here, the UE evaluates and switches to other alternative beams, if necessary. Each qualified alternative beam may have a radio quality (e.g., SNR, RSRP, RSRQ, RSSI) that is above a preconfigured or dynamically configured absolute or relative (to the serving beam) threshold. Note that the alternative beams may be from the same TRP or different TRPs of the same cell or different cells. The beams can be identified by cell ID or beam ID or port ID. Switching between different alternative beams is handled at layer ½, and only the configuration of the alternative beams is possibly provided by RRC. The configuration of the alternative beams may be based on previous saved measurements (e.g., PHY mobility set), may be statically preconfigured by manufacturers/operators or dynamically reconfigured by the network via explicit RRC and MAC signaling (e.g., NR mobility set). When measuring alternative beams, different reference signals may be used for UEs at idle, connected or inactive mode. For idle mode UEs, SS burst/SS burst set may be used for common beam reference. In addition, cell specific CSI-RS is also possible as a measurement reference signal if there is configured or specific mobility reference signal (MRS)/beam reference signal (BRS). For inactive mode UEs, UE specific CSI-RS and/or connected-mode SS burst can be used if UE can be configured by the network. Otherwise, the SS burst and/or cell specific CSI-RS are used. For connected mode UEs, connected-mode SS, UE specific CSI-RS and specific mobility reference signal (MRS)/beam reference signal (BRS) may be used. The transmissions of the reference signal may be on-demand or network scheduled. To switch to alternative beams, DL or UL signal transmission may be needed to do beam alignment with the network, e.g., RACH preamble sequence, DL/UL reference signal, control channel, etc. If necessary, resource allocation may also be needed, e.g., RACH resource. The RACH procedure for different states of UE may use 2-step or 4-step. The RACH resource for idle mode may be decided by SS-burst (e.g., signaling by PBCH and/or SS burst time index). In the connected-mode, the RACH resource may decide by RRC configuration or dynamically signaling by DCI (i.e., NR-PDCCH).

In some examples, if a link is successfully recovered by switching to new serving beam(s), the beam recovery process terminates and UE goes back to normal operation. Otherwise, beam recovery also terminates but the radio link failure is declared, and UE enters RL recovery phase 2. Note that in case no alternative beams available, direct transition to second level link recovery process may be considered.

In another embodiment, there are two phases of the link recovery process. The first phase of the link recovery process is to wait for the execution results of the second level of beam recovery process. Typically, the duration of first phase of link recovery process and the second level of beam recovery process are timely aligned, but it may not be always the case. This is because the two phase processes may be running in parallel. Before the termination of the second phase of beam recovery process, link recovery phase 1 may start evaluating other cells so that UE can perform cell reselection immediately once beam recovery phase 2 is finished.

In the second phase, in order to resume activity and avoid going via RRC_IDLE when the UE returns to the same cell or when the UE selects a different cell from the same gNB, or when the UE selects a cell from a different gNB, the following procedure applies: (i) The UE stays in RRC_CONNECTED; (ii) The UE accesses the cell through the random access procedure; and (iii) The UE identifier used in the random access procedure for contention resolution (i.e. LTE like C RNTI of the UE in the cell where the RLF occurred+physical layer identity of that cell+short MAC-I based on the keys of that cell) is used by the selected gNB to authenticate the UE and check whether it has a context stored for that UE: (a) If the gNB finds a context that matches the identity of the UE, or obtains this context from the previously serving gNB, it indicates to the UE that its connection can be resumed; and (b) If the context is not found, RRC connection is released and UE initiates procedure to establish new RRC connection. In this case UE is required to go via RRC_IDLE.

In another embodiment, a demand transmission of measurement signals during beam recovery process is provided. When UE evaluates either serving beam(s) or other alternative beam(s), on-demand transmissions of measurement signals for those beams may be necessary to provide accurate measurement results. The beams sending on-demand measurement signals may be originally considered to be unavailable, for energy saving or interference avoidance purposes.

The measurement signals may be requested to be sent in batch (multiple measurement signal transmission repeated over a certain time interval), in case UE mobility occurs more frequently and beam recovery performs frequently.

In another embodiment, a transient from beam recovery process to link recovery process is described. Depending on UE use cases, states and requested services, balance between energy efficiency and latency (data/signal transmission/reception interruption) needs to be considered. The time budget and behaviors (e.g., measurement gap, measurement objects) for beam recovery process needs to be adapted, e.g., timer or other (e.g. counting consecutive out-of-sync conditions) criteria (e.g., N1, N2, etc.), threshold during measurements.

Turning now to beam diversity, a UE may be configured to monitor M>=1 beam pair links (BPL) between the UE and gNB(s). In an example, the BPL that the UE will monitor the most frequently is defined as the active BPL. Other BPLs in the monitored set may be monitored or detected with a longer duty cycle, and denoted as non-active BPL(s). These BPLs in the monitored BPL set may be transmitted by different gNB, or different TRPs belonging to the same gNB, or the same TRP.

In some examples, the beam ID may be used with other parameters such as cell ID, slot index etc. to scramble the DM-RS sequence of NR-PDCCH for beam diversity. One example is now described below for the purpose of illustration; however the actual design is not limited to the example. For instance, suppose a NR-PDCCH uses k antenna ports for transmission. For any of the antenna ports $p \in \{n, n+1, \ldots n+k-1\}$ the reference-signal sequence r(m) is defined by:

$$r(m) = \frac{1}{\sqrt{2}}(1 - 2\cdot c(2m)) + j\frac{1}{\sqrt{2}}(1 - 2\cdot c(2m+1)),$$

The pseudo-random sequence c(i) is the base sequence to build the DM-RS sequence. The sequence c(i) can be a ZAZAC sequence, M sequence, or other sequences. The pseudo-random sequence generator may be initialized with:

$c_{init} = (\lfloor n_s/2 \rfloor + 1)\cdot(2N_{ID}^{cell} + f(n_{beamID}) + 1)\cdot 2^{16} + n_{RNTI}$, or $c_{init} = (\lfloor n_s/2 \rfloor + 1)\cdot(2n_{ID}^{(nSCID)} + f(n_{beamID}) + 1)\cdot 2^{16} + n_{SCID}$ Depending on different cases of the monitored beam transmitter locations (e.g., same or different cells, etc.), different NR-PDCCH designs may be employed in accordance with various embodiments. For the NR-PDCCHs transmitted using different beams or BPLs from the same or different TRP(s) of the same cell, the contents of active and non-active NR-PDCCHs may be the same. Those NR-PDCCHs may use corresponding DM-RS that utilize beam ID as one of the scrambling parameters as described above. Alternatively, with respect to the NR-PDCCHs transmitted using different beams or BPLs from different cells, there may be different embodiments for NR-PDCCH contents/information. In one example, the contents of active and non-active NR-PDCCHs are the same. In this way, a cell that transmits a NR-PDCCH to the UE using a non-active BPL may need to reserve the same physical channel resources as in the cell that transmits a NR-PDCCH to the UE using the active BPL. In another example, the contents of active and non-active NR-PDCCHs are different. For example, considering the purpose of transmitting a NR-PDCCH is, in some cases, to increase the beam diversity, in one embodiment the NR-PDCCH is transmitted on a non-active BPL, which can be a UCI (uplink scheduling grant or similar) carrying information including an UL resource indication for the UE to transmit a BPL switching command/handshaking signaling or beam reporting feedback of the non-active BPL. The UE can monitor at least two beam-paired links (BPL) for monitoring the NR-PDCCH. In an example, one BPL is from the active BPL and the other BPLs are from non-active BPLs. In some cases, if UE cannot decode the NR-PDCCH from the active BPL successfully, but can decode the NR-PDCCH from the non-active BPL successfully, then UE can use UL UCI to report BPL switching command/handshaking signaling or beam reporting feedback of the selected non-active BPL.

In an example, when a UE is monitoring a set of M BPLs according to higher layer or MAC CE or physical control channel configurations, it may detect NR-PDCCHs on one or several non-active BPLs with a lower duty cycle in addition to its regular detection of NR-PDCCH on active BPL. When the UE monitors NR-PDCCH on the active BPL and NR-PDCCH on at least one non-active BPL in the same sub-frame or TTI, it may perform in accordance with various rules. For example, if the UE decodes only the NR-PDCCH on the active BPL successfully, it may follow transmission or reception operation indicated in the NR-PDCCH (which can be a UCI or DCI or paging etc.). In some examples, if the UE decodes the NR-PDCCH on the active BPL and at least one NR-PDCCH on a non-active BPL successfully, it may follow transmission or reception operations indicated in the NR-PDCCH (which can be a UCI or DCI or paging etc.) transmitted on the active BPL, and ignore the NR-PDCCH transmitted on the non-active BPL. In an example, if the UE decodes only one NR-PDCCH on a non-active BPL successfully, it may follow transmission or reception operation indicated in the NR-PDCCH (which can be a UCI or DCI or paging etc.) transmitted on the non-active BPL. In this example where the decoded NR-PDCCH is a DCI, the UE may perform data reception accordingly and feedback ACK/NACK for received DL data with either explicit or implicit signaling that it has switched to the non-active BPL (due to failure of detecting a valid NR-PDCCH on the active BPL). One example of the implicit signaling is where the transmitting cell dynamically allocates/configures UL control channels resources for ACK/NACK feedback, whose resource index has a one-to-one mapping to parameters of NR-PDCCH that allocates the corresponding data transmission (for example, the index of first CCE/REG of the NR-PDCCH) and the beam ID or BPL index. In some cases, if the UE decodes more than one NR-PDCCH on on-active BPLs successfully, it may follow a pre-defined tie-breaking rule to pick one NR-PDCCH to perform its transmission or reception operation. An example rule is one where the best SINR is selected.

Figure 45:
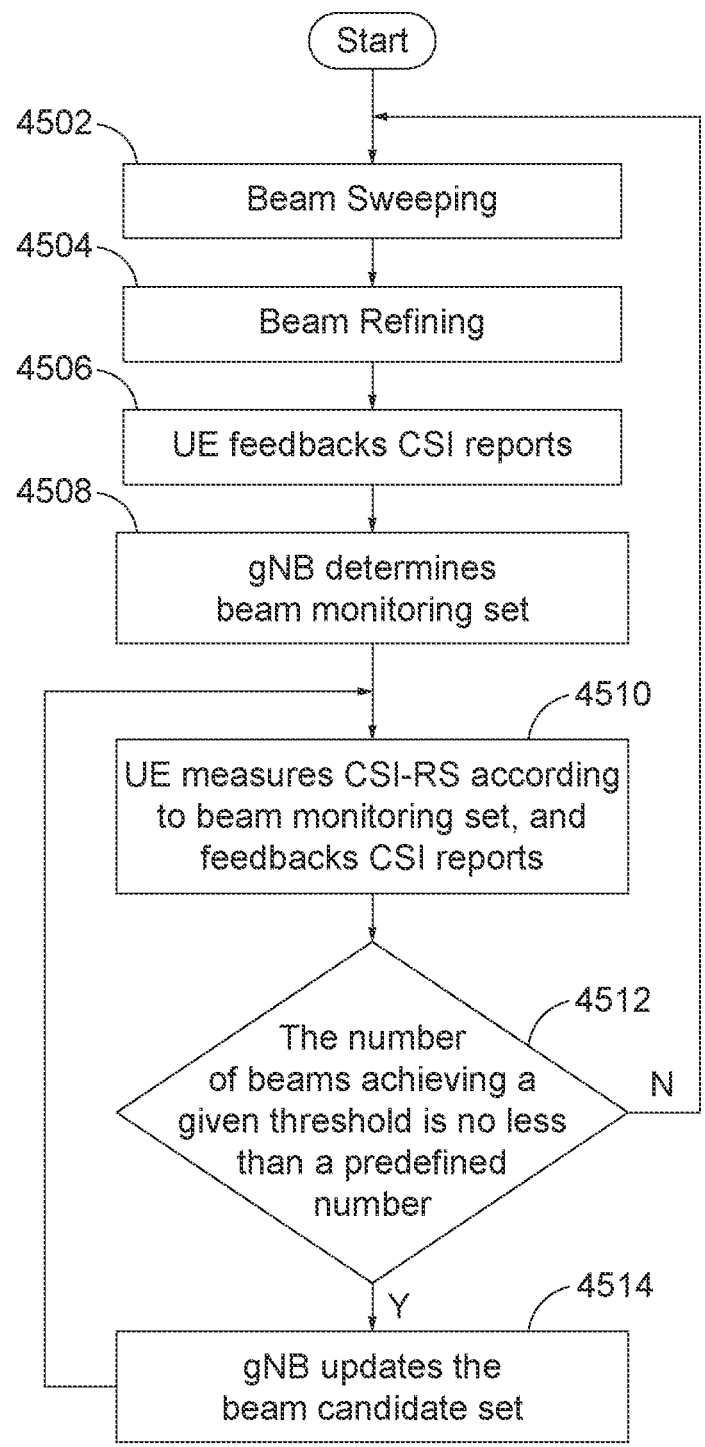
FIG. 45 illustrates an example procedure for updating the beam monitoring and candidate sets according to an aspect of the application.

Referring to FIG. 45, in an example UE-specific PDCCH, the UE sends CSI reports to the gNB (at 4506) in the connected mode after beam training, which may include beam sweeping (at 4502) and beam refining (at 4504). The CSI report at 4506 may contain the quality of multiple beams as well as the beam ID of each reported beam. The beam ID may be indicated explicitly or implicitly by the symbol index and the antenna port index or CSI-RS index. At 4508, the gNB may determine various sets of beams based on the current and previous CSI reports. For example, the gNB may determine a beam monitoring set, which may contain M beams. The UE may monitor the quality of these beams periodically by measuring the corresponding B-RS, M-RS, or CSI-RS. The gNB may also determine a beam candidate set, which may contain N beams chosen from the beam monitor set, where N≤M The gNB may select one or more beams for this set for PDCCH transmission. In some cases, the UE has to try all these beams and their corresponding search spaces for PDCCH blind decoding. In an example, the IDs of the beams in the beam monitoring set may be configured to the UE through RRC signaling. Then the UE may monitor the quality of the beams in the beam monitoring set by measuring the corresponding B-RS, M-RS or CSI-RS, and may feedback the CSI reports accordingly at 4510.

Based on the UE's CSI reports, the gNB selects N beams from the beam monitoring set, where these N beams are the candidates for the UE's PDCCH beam diversity transmission. The gNB may select the N beams with the best quality, e.g., the beams with the largest rank or the beams with the highest CQI. In an example, the IDs of the N selected beams are configured to the UE by RRC signaling. In some cases, the gNB may dynamically choose one or more beams from the beam candidate set for PDCCH transmission, and does not need to inform the UE of the chosen beam IDs. In some examples, however, the number of the selected beams may be signaled the UE by RRC signaling or common (or group) PDCCH or be transparent to the UE. When multiple beams are selected, the gNB may transmit the same DCI through these beams to achieve the beam diversity. In an example, the DCI is scrambled with the UE's ID, which may be the UE's RNTI or other NR UE IDs, so that after blind decoding the UE may identify whether the DCI belongs to itself. The gNB may update the beam candidate set based on the UE's recent CSI reports, e.g., changing some candidate beams by beams from monitoring set with better qualities. In case that a candidate beam is blocked, the gNB may change it with better beam from the monitoring set. If the gNB or the UE determines that the number of beams in the monitoring set have a quality better than a given threshold is less than a predefined number (at 4512), the process may return to 4502 and 4504, where it may request or initiate a new beam sweeping and beam refining procedure to form a new beam monitoring set. Alternatively, if the number of beams that achieve a given threshold is greater than a predefined number, the process may proceed to 4514, where the gNB updates the beam candidate set accordingly.

Figure 46:
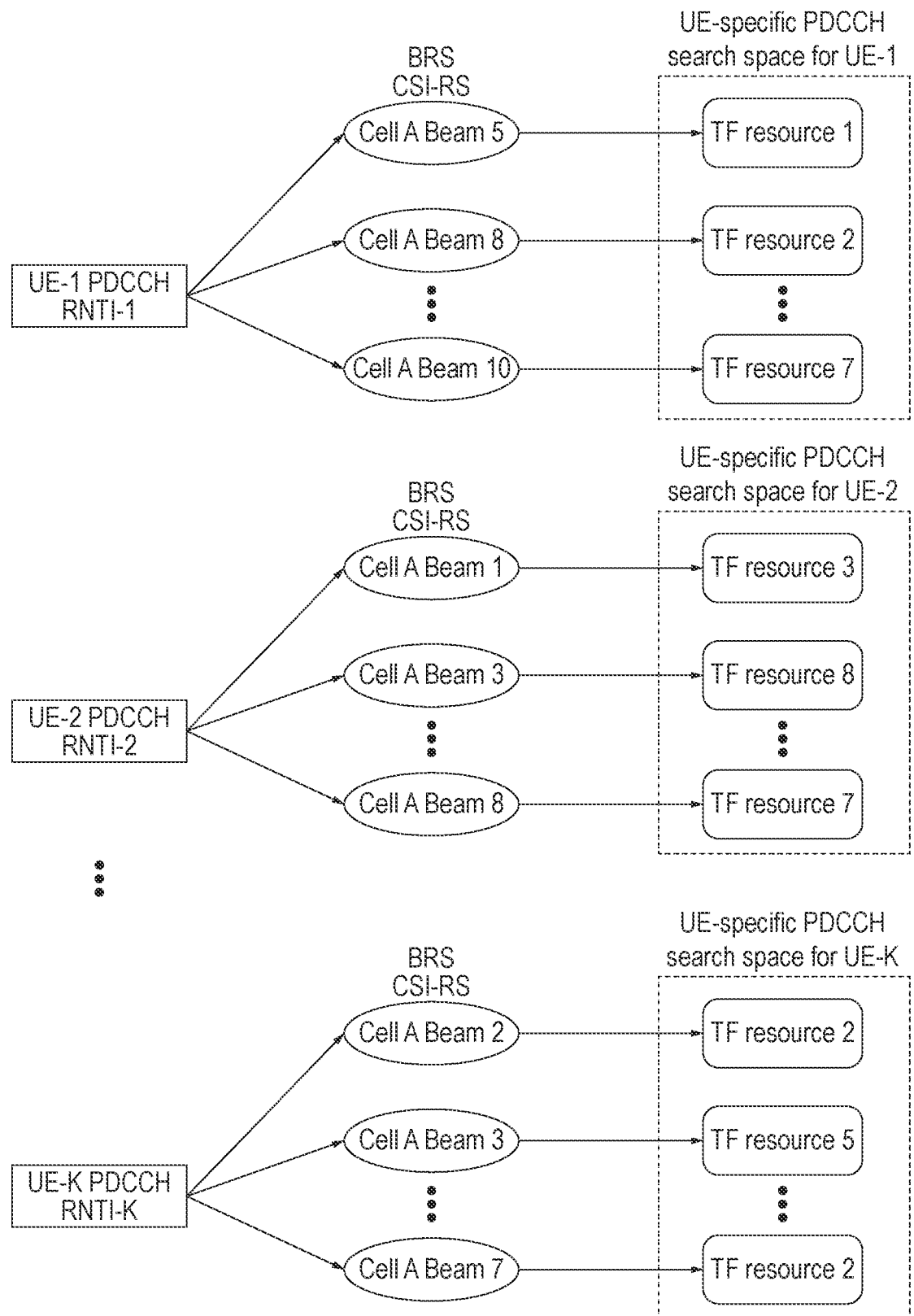
FIG. 46 illustrates an example mapping between time-frequency (TF) resources and UE and beam ID according to an aspect of the application.

In an example, the UE-specific search space consists of time-frequency (TF) resources for every beam in the beam candidate set, and each TF resource may contain one or more PDCCH candidates. The UE-specific search space configuration may be based on the UE's ID and the UE's current beam candidate set. As shown in FIG. 46, the TF resource may be mapped to the UE's ID and the candidate beam ID. The beam ID may be configured such that all the beams in the neighbor cells have different beam IDs. For the same UE, the TF resources for different beams may be overlapped, and different UEs may share the same TF resources. To take advantage of frequency diversity, the UE-specific search space configuration may also be determined by the slot index, so that the UE-specific search space may be assigned to different subcarriers at different slots.

Still referring to FIG. 46, in some cases, the UE performs blind decoding of the PDCCH only on the PDCCH candidates in the search space. For each PDCCH candidate, the receive beam may be selected according to the transmit beam mapped to the PDCCH candidate to reduce the complexity. For example, to decode the DCI in TF resource 7, the UE-1 selects the receive beam according to transmit beam 10 in Cell A.

The UE-specific PDCCH may be transmitted in a subband to reduce the complexity of the blind decoding. The configuration of the subband transmission may be signaled to the UE by RRC signaling. Multiple UEs may be configured to the same subband or overlapped subbands for PDCCH transmission, and to take advantage of frequency diversity, a hopping pattern may be assigned to the UE.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 47A:
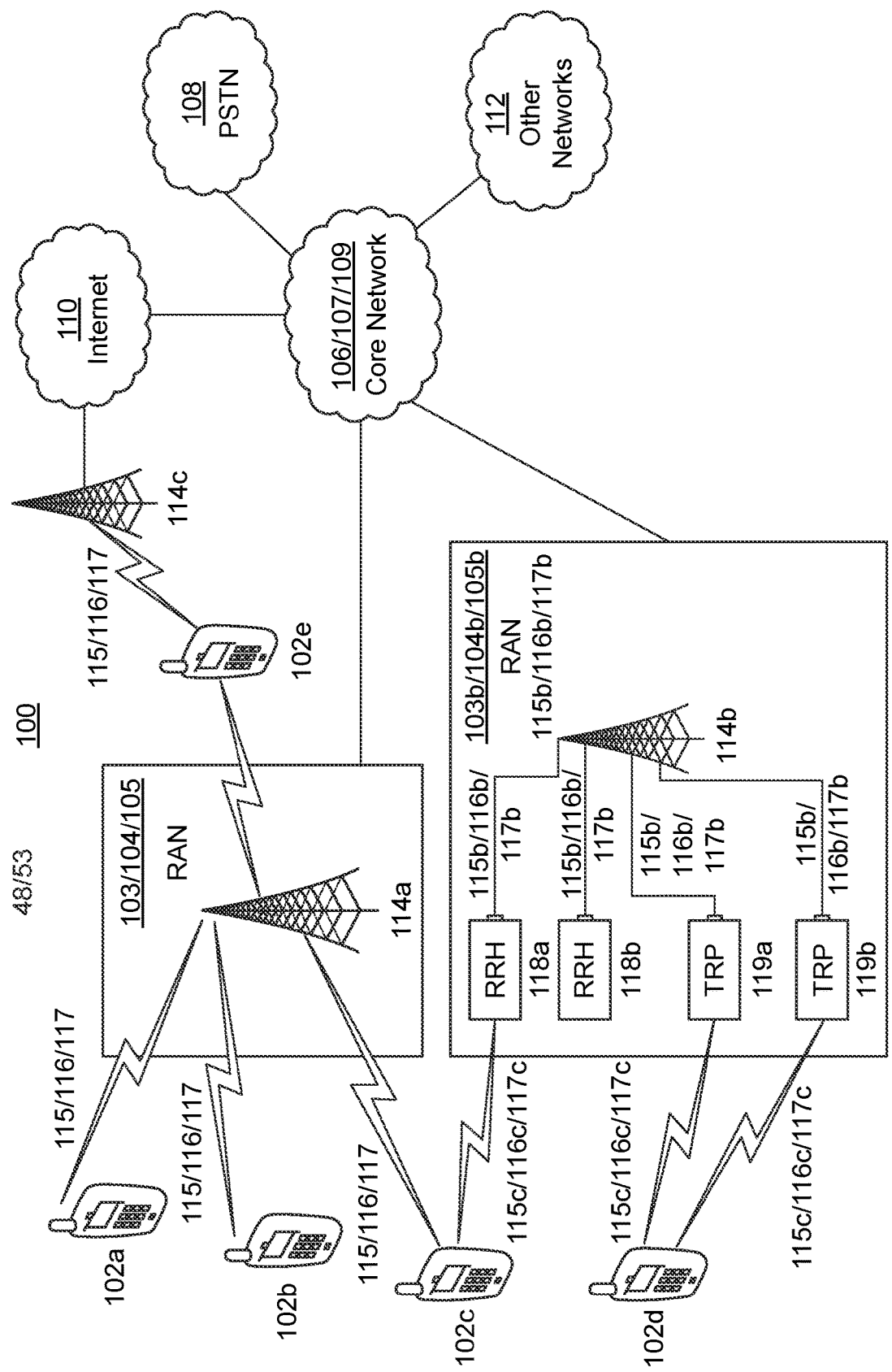
FIG. 47A illustrates one embodiment of an example communications system in which the methods and apparatuses described and claimed herein may be embodied.
Figure 47B:
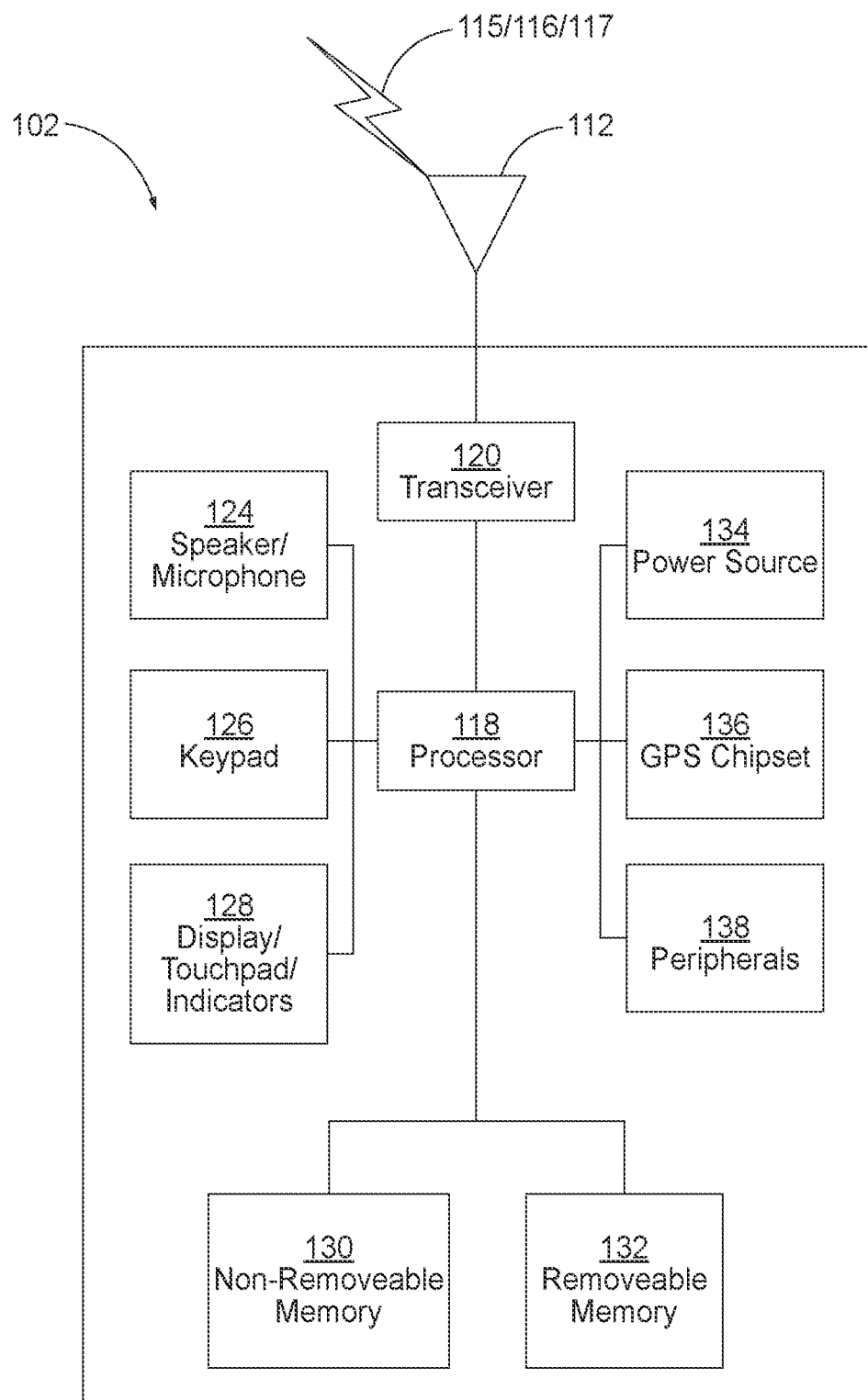
FIG. 47B is a block diagram of an example apparatus or device configured for wireless communications in accordance with the embodiments illustrated herein.

FIG. 47A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 47A-47E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 47A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 47A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 47A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 47A may be configured to communicate with the base station 114a, which may employ a cellular-based radio technology, and with the base station 114c, which may employ an IEEE 802 radio technology.

FIG. 47B is a block diagram of an example apparatus or device configured for wireless communications in accordance with the embodiments illustrated herein, such as for example, a WTRU 102. As shown in FIG. 47B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 47B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 47B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 47A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite.

The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 47A may be configured to communicate with the base station 114a, which may employ a cellular-based radio technology, and with the base station 114b, which may employ an IEEE 802 radio technology.

FIG. 47B is a block diagram of an example apparatus or device configured for wireless communications in accordance with the embodiments illustrated herein, such as for example, a WTRU 102. As shown in FIG. 47B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 47B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 47B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 47B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 47C:
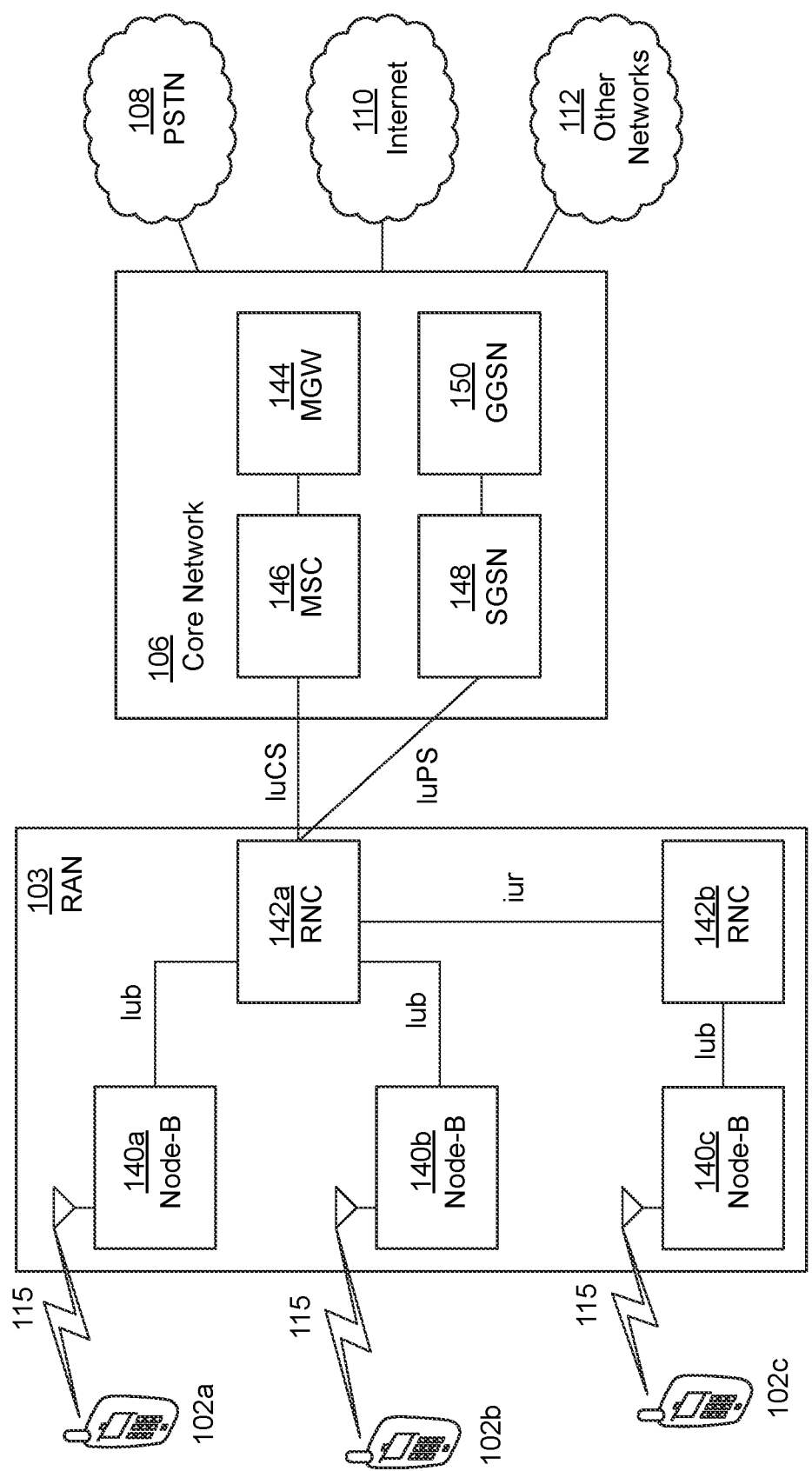
FIG. 47C is a system diagram of an example radio access network (RAN) and core network in accordance with an example embodiment.

FIG. 47C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 47C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 47C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 47C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 47D:
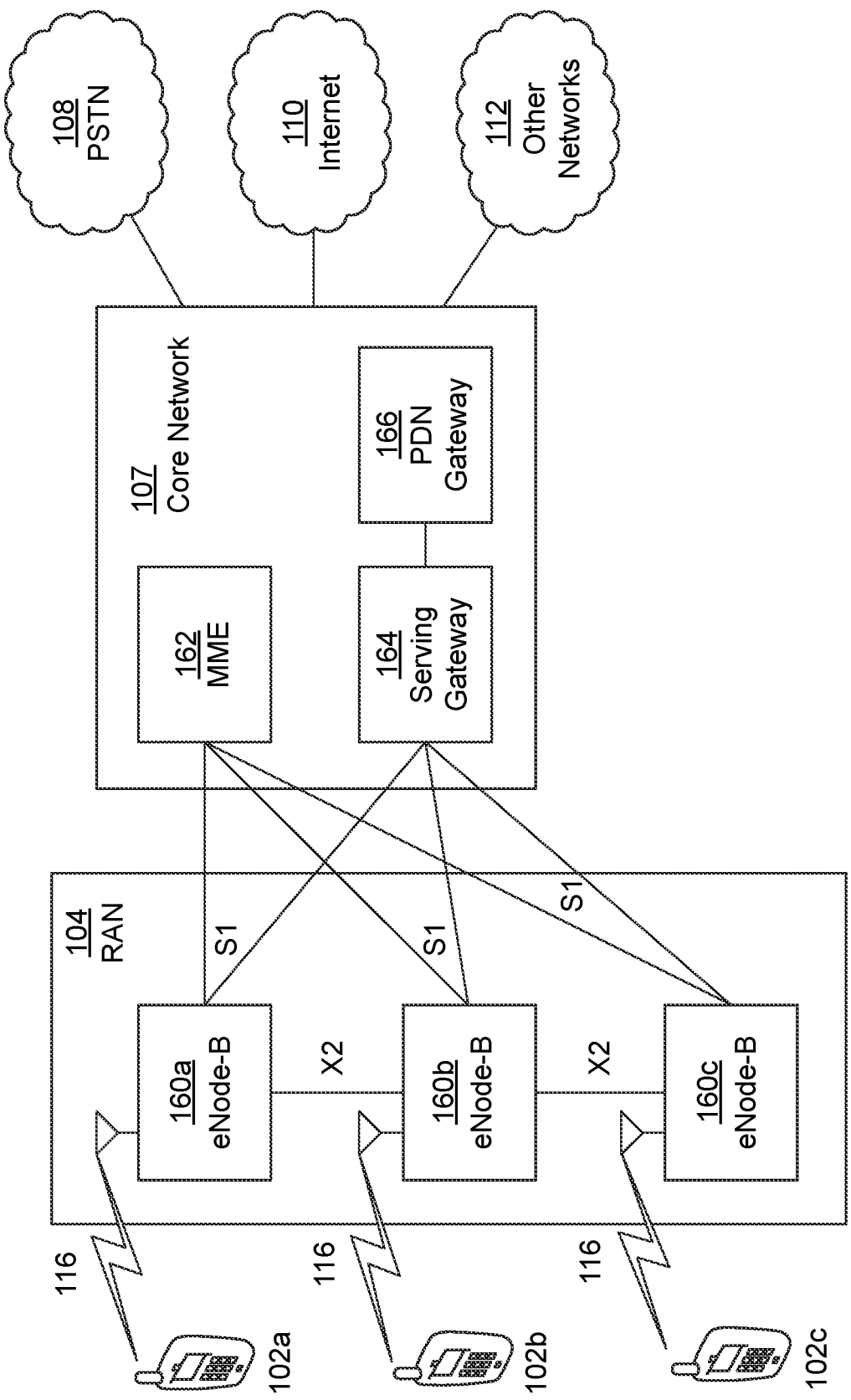
FIG. 47D is another system diagram of a RAN and core network according to another embodiment.

FIG. 47D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 47D, the eNode-Bs 160a, 160b, 160c may communicate with one another over an X2 interface.

The core network 107 shown in FIG. 47D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 47E:
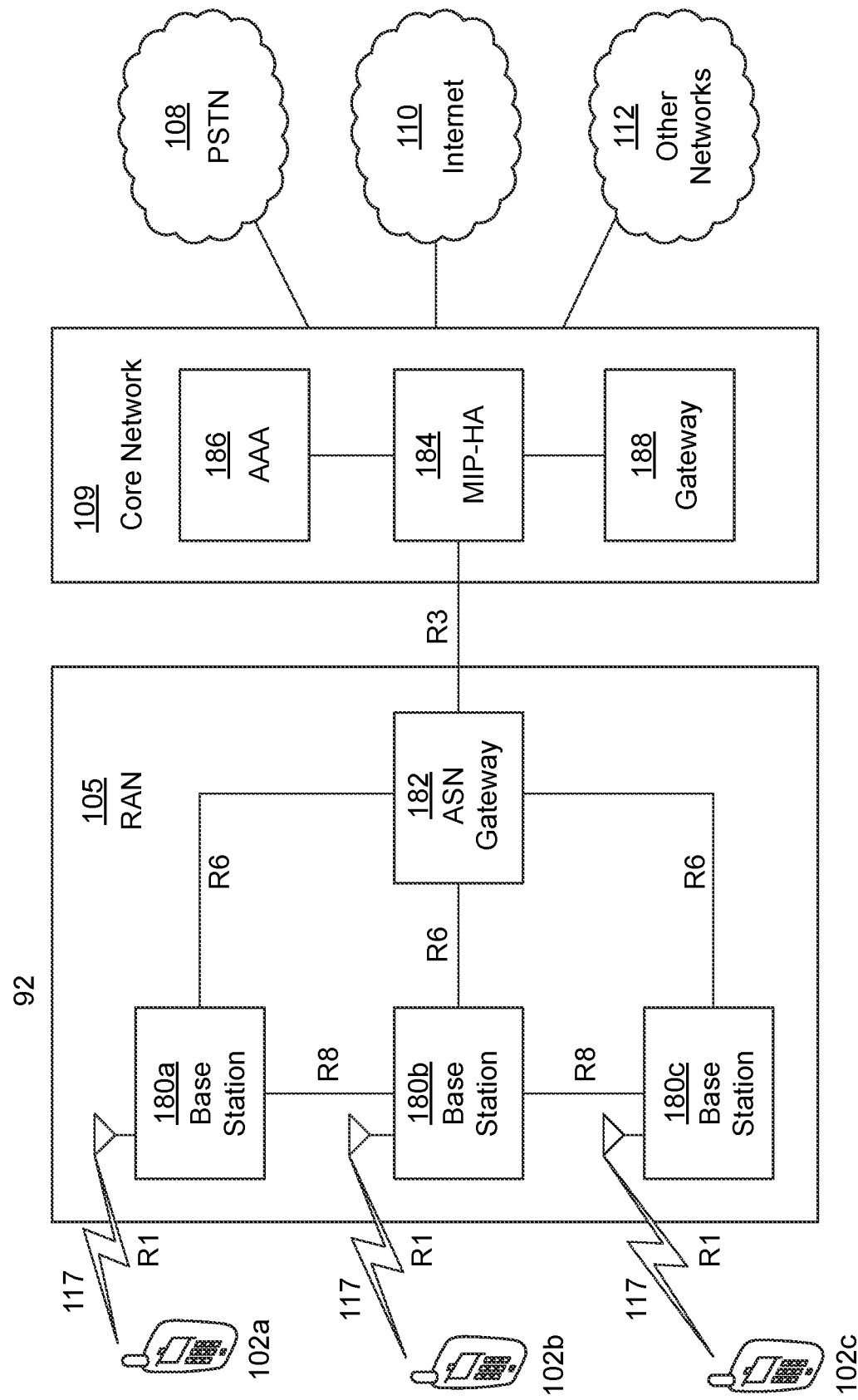
FIG. 47E is another system diagram of a RAN and core network according to another embodiment.

FIG. 47E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 47E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 47E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 47E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 47A, 47C, 47D, and 47E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 47A, 47B, 47C, 47D, and 47E are provided by way of example only, and it is understood that the subject matter disclosed and claimed herein may be embodied or implemented in any similar communication system, whether presently defined or defined in the future.

Figure 47F:
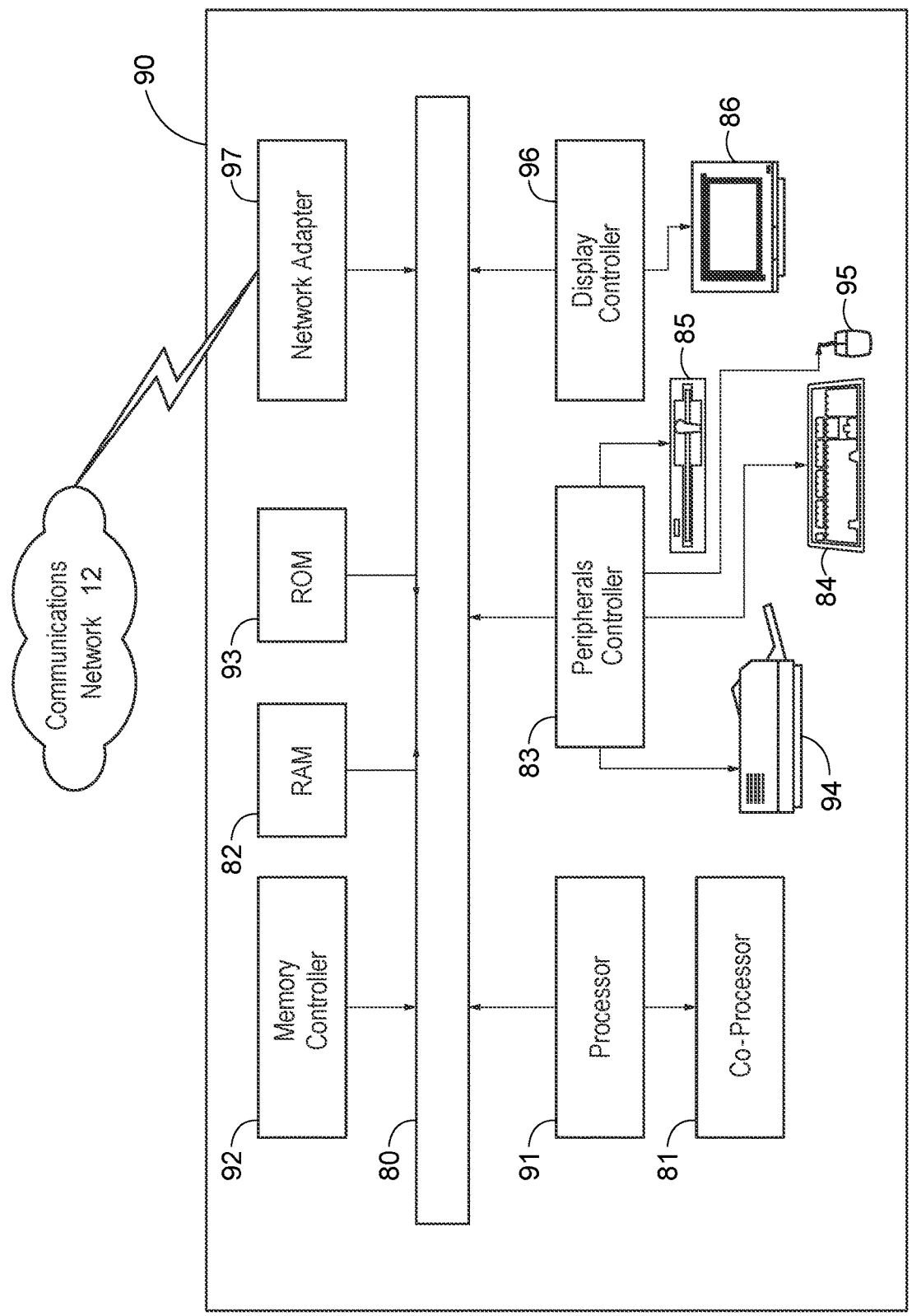
FIG. 47F is a block diagram of an exemplary computing system 90 in which one or more apparatuses of the communications networks illustrated in FIGS. 47A and 47C-E may be embodied.

FIG. 47F is a block diagram of an exemplary computing system 90 in which one or more apparatuses of the communications networks illustrated in FIGS. 47A, 47C, 47D and 47E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 47A, 47B, 47C, 47D, and 47E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to NR technologies that may appear in the above description. Unless otherwise specified, the acronyms used herein refer to the corresponding term listed below.

AR Augmented Reality
AS Access Stratum
BF-RS BeamForm Reference Signal
BT-RS Beamformed Training Reference Signal
CE Control Element
CoMP Coordinated Multipoint
CP Cyclic Prefix
CQI Channel Quality Indication
CRS Cell-specific Reference Signals
CSI Channel State Information
CSI-RS Channel State Information Reference Signals
DCI Downlink Control Information
DL DownLink
DM-RS Demodulation Reference Signals
eMBB enhanced Mobile Broadband
eNB evolved Node B
ePDCCH Enhanced Physical Downlink Control CHannel
FD Full-Dimension
FDD Frequency Division Duplex
FFS For Further Study
GUI Graphical User Interface
HARQ Hybrid Automatic Repeat Request
ID Identification
IMT International Mobile Telecommunications
KP Kronecker-Product
KPI Key Performance Indicators
LTE Long Term Evolution
MAC Medium Access Control
MCL Maximum Coupling Loss
MCS Modulation and Coding Scheme
MME Mobility Management Entity
MIMO Multiple-Input and Multiple-Output
NAS Non-Access Stratumn
NB Narrow Beam
NDI New Data Indicator
NEO NEtwork Operation
NR-Node New Radio-Node
OCC Orthogonal Cover Codes
OFDM Orthogonal Frequency Division Multiplexing
PDCCH Physical Downlink Control Channel
PDSCH Physical Downlink Shared Channel
PMI Precoder Matrix Indication
PRS Positioning Reference Signals
PUSCH Physical Uplink Shared Channel
PUCCH Physical Uplink Control Channel
RAT Radio Access Technology
RB Resource Block
RE Resource Element
RI Rank Indication
RRC Radio Resource Control
RRH Remote Radio Head
RS Reference Signal
RSSI Received Signal Strength Indicator
RSRP Reference Signal Received Power
RSRQ Reference Signal Received Quality
RV Redundancy Version
SC-FDMA Single Carrier-Frequency Division Multiple Access
SI System Information
SIB System Information Block
SISO Single-Input and Single-Output
SRS Sounding Reference Signal
2D Two-Dimensional
3D Three-Dimensional
TDD Time Division Duplex
TPC Transmit Power Control
TRP Transmission and Reception Point
TTI Transmission Time Interval
TXSS Transmit Sector Sweep
UAV Unmanned Aerial Vehicle
UE User Equipment
UL UpLink
URLLC Ultra-Reliable and Low Latency Communications
VR Virtual Reality
WB Wide Beam
WRC Wireless Planning Coordination This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A network node comprising:
 a non-transitory memory including instructions thereon; and
 a processor, operably coupled to the non-transitory memory, configured to execute the instructions of:
  determining first scheduling information associated with a first transmission;
  initiating the first transmission;
  determining second scheduling information associated with a second transmission which preempts one or more resources associated with the first transmission;
  sending the second transmission;
  sending a preemption indication through downlink control information (DCI); and
  receiving a Hybrid Automatic Repeat Request (HARQ) feedback,
 wherein the preemption indication indicates one or more resources associated with the first transmission is preempted for the second transmission, wherein the preemption indication is sent in a common control region, wherein the HARQ feedback is carried on a physical uplink control channel (PUCCH), and wherein the PUCCH is implicitly or explicitly allocated by the DCI.

2. The network node as recited in claim 1, wherein the common control region is associated with a group common Radio Network Temporary Identifier.

3. The network node as recited in claim 1, wherein the first transmission is related to a first latency or a first priority and the second transmission is related to a second latency or a second priority, and the second latency is less than the first latency and the second priority is higher than the first priority.

4. The network node as recited in claim 3, wherein the first transmission is related to enhanced mobile broadband (eMBB), and the second transmission is related to ultra-reliable low latency communication (URLLC).

5. The network node as recited in claim 1, wherein the preemption indication is transmitted at an allocation in time after the second transmission.

6. The network node as recited in claim 5, wherein the allocation of the preemption indication is configured in a common monitoring region, and the common monitoring region is for one or more UEs.

7. The network node as recited in claim 6, wherein the configuration of the common monitoring region is indicated by a Radio Resource Control message.

8. A wireless transmit/receive unit (WTRU) comprising:

a non-transitory memory including instructions thereon; and a processor, operably coupled to the non-transitory memory, configured to execute the instructions of:

receiving scheduling information associated with a first transmission;

receiving a preemption indication via downlink control information DCI);

detecting and decoding the preemption indication;

determining a Hybrid Automatic Repeat Request (HARQ) feedback based on the decoding; and sending, to a network node, the HARQ feedback, wherein the preemption indication indicates one or more resources associated with the first transmission is pre-empted for a second transmission, wherein the preemption indication is received in a common control region, wherein the HARQ feedback is carried on a physical uplink control channel (PUCCH), and wherein the PUCCH is implicitly or explicitly allocated by the DCI.

9. The WTRU as recited in claim 8, wherein the first transmission is related to a first latency or a first priority, the second transmission is related to a second latency or a second priority, the second latency is less than the first latency and the second priority is higher than the first priority.

10. The WTRU as recited in claim 9, wherein the first transmission is related to eMBB and the second transmission is related to URLLC.

11. The WTRU as recited in claim 8, wherein the preemption indication is received at an allocation in time after the second transmission, the allocation of the preemption indication is configured in a common monitoring region, and the common monitoring region is for one or more UEs.

12. The WTRU as recited in claim 11, wherein the configuration of the common monitoring region is indicated by a Radio Resource Control message.

13. The WTRU as recited in claim 8, wherein the HARQ feedback comprises one or multiple bits to indicate acknowledgement (ACK) or negative acknowledgement (NACK).

14. The WTRU as recited in claim 13, wherein the multiple bits to indicate ACK or NACK are associated to multiple code blocks respectively.

15. The WTRU as recited in claim 8, wherein the PUCCH is configured with a frequency hopping pattern.

16. A method comprising:

determining first scheduling information associated with a first transmission;

initiating the first transmission;

determining second scheduling information associated with a second transmission which preempts one or more resources associated with the first transmission;

sending the second transmission;

sending a preemption indication; through downlink control information (DCI); and receiving a Hybrid Automatic Repeat Request (HARQ) feedback, wherein the preemption indication indicates one or more resources associated with the first transmission is pre-empted for the second transmission, wherein the HARQ feedback is carried on a physical uplink control channel (PUCCH), and wherein the PUCCH is implicitly or explicitly allocated by the DCI.

17. The method of claim 16, wherein the preemption indication is sent in a common control region, and the common control region is associated with a group common Radio Network Temporary Identifier.

18. The method of claim 16, wherein the first transmission is related to a first latency or a first priority and the second transmission is related to a second latency or a second priority, and the second latency is less than the first latency and the second priority is higher than the first priority.

* * * * *